(12) United States Patent
Isobe et al.

(10) Patent No.: US 9,522,469 B2
(45) Date of Patent: Dec. 20, 2016

(54) LINK ACTUATION DEVICE

(71) Applicant: NTN CORPORATION, Osaka (JP)

(72) Inventors: Hiroshi Isobe, Iwata (JP); Yukihiro Nishio, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 24 days.

(21) Appl. No.: 14/385,931

(22) PCT Filed: Mar. 14, 2013

(86) PCT No.: PCT/JP2013/057233
§ 371 (c)(1),
(2) Date: Sep. 17, 2014

(87) PCT Pub. No.: WO2013/141138
PCT Pub. Date: Sep. 26, 2013

(65) Prior Publication Data
US 2015/0088308 A1     Mar. 26, 2015

(30) Foreign Application Priority Data

Mar. 23, 2012  (JP) .................................. 2012-066888
Mar. 28, 2012  (JP) .................................. 2012-073373
Jun. 27, 2012  (JP) .................................. 2012-144106

(51) Int. Cl.
*G06F 19/00*     (2011.01)
*B25J 9/00*      (2006.01)
(Continued)

(52) U.S. Cl.
CPC ................ *B25J 9/0048* (2013.01); *B25J 9/12* (2013.01); *B25J 9/1623* (2013.01)

(58) Field of Classification Search
USPC ..... 700/245, 258.3; 74/89.14, 89.16, 490.05, 74/99 R, 490.04, 480 R, 490.01, 479.01; 403/180; 901/19, 25, 28, 20, 49, 9, 27; 72/237
See application file for complete search history.

(56) References Cited

U.S. PATENT DOCUMENTS 5,857,815 A   1/1999 Bailey et al.
5,890,396 A   4/1999 Kaneko et al.
(Continued)

FOREIGN PATENT DOCUMENTS

CN   1836849        9/2006
EP   0 987 087 A2   3/2000
(Continued)

OTHER PUBLICATIONS

Chinese Office Action dated Jun. 3, 2015 in corresponding Chinese Patent Application No. 201380015207.X.
(Continued)

*Primary Examiner* — Ronnie Mancho

(57) ABSTRACT

A link actuation device includes a distal end side link hub connected with a proximal end side link hub through three or more sets of link mechanisms for alteration in orientation. By means of an actuator provided in the two or more set of the link mechanism, the distal end orientation, which is the orientation of the distal end side link hub relative to the proximal end link hub, is changed arbitrarily. The operating device includes an orientation designating unit for designating the distal end orientation aimed at by means of a coordinate position on the orthogonal coordinate system by an artificial manipulation, an orientation acquiring unit for acquiring the distal end orientation that is expressed by an angular coordinate system through calculation, and an orientation information applying unit for applying information on the distal end orientation so acquired to a control device for controlling the actuator.

30 Claims, 28 Drawing Sheets

(51) Int. Cl.
  *B25J 9/16*    (2006.01)
  *B25J 9/12*    (2006.01)

(56) References Cited

U.S. PATENT DOCUMENTS

| | | | |
|---|---|---|---|
| 5,893,296 A | 4/1999 | Rosheim | |
| 7,860,609 B2 | 12/2010 | Yanagita et al. | |
| 2005/0159075 A1* | 7/2005 | Isobe | B25J 17/0266 446/104 |
| 2005/0199085 A1* | 9/2005 | Isobe | B25J 9/0048 74/490.05 |
| 2006/0287769 A1 | 12/2006 | Yanagita et al. | |
| 2008/0028881 A1* | 2/2008 | Sone | B25J 17/0266 74/471 R |
| 2009/0095108 A1* | 4/2009 | Payandeh | A61B 19/22 74/480 R |
| 2011/0126660 A1* | 6/2011 | Lauzier | B25J 17/0208 74/490.05 |
| 2012/0043100 A1* | 2/2012 | Isobe | A61B 17/1631 173/42 |
| 2012/0053701 A1* | 3/2012 | Yi | B25J 9/0048 700/3 |
| 2013/0055843 A1* | 3/2013 | Isobe | F16C 1/02 74/490.04 |
| 2013/0192420 A1* | 8/2013 | Isobe | F16H 21/54 74/99 R |
| 2013/0239639 A1* | 9/2013 | Okahisa | B25J 9/0048 72/237 |
| 2014/0060230 A1* | 3/2014 | Nagayama | B25J 18/02 74/490.01 |
| 2014/0224046 A1* | 8/2014 | Isobe | B25J 9/0048 74/89.14 |
| 2014/0227023 A1* | 8/2014 | Sone | B25J 9/0048 403/180 |
| 2014/0311271 A1* | 10/2014 | Cao | B25J 9/0036 74/490.05 |

FOREIGN PATENT DOCUMENTS

| | | |
|---|---|---|
| JP | 4-53692 | 2/1992 |
| JP | 7-116983 | 5/1995 |
| JP | 10-138184 | 5/1998 |
| JP | 2000-94245 | 4/2000 |
| JP | 2001-290541 | 10/2001 |
| JP | 2002-96232 | 4/2002 |
| JP | 2002-273676 | 9/2002 |
| JP | 2002-337078 | 11/2002 |
| JP | 2003-184857 | 7/2003 |
| JP | 2005-226777 | 8/2005 |
| JP | 2007-272597 | 10/2007 |
| JP | 2009-148890 | 7/2009 |
| JP | 2009-214211 | 9/2009 |
| JP | 2009-255194 | 11/2009 |
| JP | 2011-240440 | 12/2011 |

OTHER PUBLICATIONS

International Search Report mailed May 14, 2013, in corresponding International Patent Application No. PCT/JP2013/057233.
Japanese Office Action (Decision of Grant) dated Dec. 8, 2015 in corresponding Japanese Patent Application No. 2012-066888.
PCT International Preliminary Report on Patentability mailed Oct. 2, 2014 in corresponding International Patent Application No. PCT/JP2013/057233.
Japanese Notice of Reason(s) of Rejection issued Feb. 9, 2016 in corresponding Japanese Patent Application No. 2012-144106.
Japanese Decision of Grant dated Jun. 28, 2016 from Japanese Patent Application No. 2012-073373, 3 pages.
Japanese Office Action dated Dec. 22, 2015 in corresponding Japanese Patent Application No. 2012-073373.
Extended European Search Report dated Sep. 23, 2015 from European Patent Application No. 13764312.8, 12 pages.

* cited by examiner

US 9,522,469 B2

LINK ACTUATION DEVICE

CROSS REFERENCE TO THE RELATED APPLICATION

This application is a U.S. National Stage Application, which claims the benefit under 35 U.S.C. 371 of PCT International Patent Application No. PCT/JP2013/057233, filed Mar. 14, 2013, which is based on and claims foreign priority benefit under 35 U.S.C. §119 of Japanese Patent Application No. 2012-066888, filed Mar. 23, 2012, Japanese Patent Application No. 2012-073373, filed Mar. 28, 2012, and Japanese Patent Application No. 2012-144106, filed Jun. 27, 2012, the entire disclosures of which are herein incorporated by reference as a part of this application.

BACKGROUND OF THE INVENTION

Field of the Invention

The present invention relates to a link actuation device used in, for example, a parallel link mechanism or a robot articular mechanism which speedily and precisely execute a work such as, for example, a complicate processing or handling of articles in a three dimensional space and, more particularly, to a link actuation device, an operating device therefor, a method of controlling it and a control device therefor, all of which require a precise and extensive operating range of, for example, medical instruments and industrial equipments.

Description of Related Art

The parallel link mechanism adopted in an actuating device is disclosed in the patent documents 1 and 2 listed below.

Although the parallel link mechanism disclosed in the patent document 1 is relatively simple in structure, the actuating angle of each of links is small. Therefore, setting of the operating range of a traveling plate to a large value tends to result in increase of the link length and, also, the dimensions of the mechanism in its entirety is rendered to be so large, and as a result, the device tends to become bulky. Also, if the link length is increased, the rigidity of the mechanism in its entirety decreases. For this reason, there has been such a problem that the weight of tools that are mounted on the traveling plate, that is, the weight capacity of the traveling plate is limited to a small value. In view of those problems, it has been difficult to utilize the parallel link mechanism of the patent document 1 in, for example, a medical equipment of a compact structure that requires a precise and wide and extensive operating range.

In contrast thereto, the link actuation device disclosed in the patent document 2 is so designed and so configured that a distal end side link hub is connected with opposite to a proximal end side link hub through three or more sets of link mechanisms of a triple link chain type so that distal end side link hub can be altered in orientation. Accordingly, despite that the link actuation device is compact in structure, the operation is possible in the precise and extensive operating range. The distal end orientation, which is the orientation of the distal end side link hub relative to the proximal end side link hub, is determined by regulating the status of two or more sets of the link mechanisms out of the three or more link mechanisms. It is to be noted that the wording "to regulate the status of the link mechanism" referred to above and hereinafter or a similar wording to that effect is intended to speak, for example, the definition of the angle of rotation of one of the links of the link mechanism, which is connected with the distal end side link hub relative to the proximal end side link hub.

PRIOR ART LITERATURE

Patent Document 1: JP Laid-open Patent Publication No. 2000-94245
Patent Document 2: U.S. Pat. No. 5,893,296

In the link actuation device including three or more sets of the link mechanisms of the triple link chain type, the distal end orientation is determined by the bending angle and the angle of traverse, the angle of rotation of the link is calculated from such bending angle and angle of traverse, and the operating position of the actuator used to rotatively drive the link is determined. For this reason, when the distal end orientation is to be altered, the designation of the distal end orientation aimed at has been accomplished by inputting the bending angle and the angle of traverse. It is to be noted that the bending angle is the vertical angle in which the center axis of the distal end side link hub is inclined relative to the center axis of the proximal end side link hub whereas the angle of traverse is the horizontal angle in which the center axis of the distal end side link hub is inclined relative to the center axis of the proximal end link hub.

On the other hand, when the link actuation device is practically used with an end effecter installed on the distal end side link hub, the coordinate position of a work to be processed, on which the end effecter works, is often handled in the orthogonal coordinate system. For this reason, the designation of the distal end orientation with the bending angle and the angle of traverse has made it difficult to operate the link actuation device viscerally. For example, in the case that the distal end side link hub has been positioned with a certain distal end orientation and the distal end orientation is changes so that the end effecter might move by an amount of movement designated in the orthogonal coordinate system from the distal end orientation so positioned, the operator has to determine the amount of operation of the actuator by converting the movement on the orthogonal coordinate system into the movement on the angle coordinate system in which the movement is expressed by the bending angle and the angle of traverse. For this reason, the operation of the link actuation device is difficult to achieve, and the skill and special training have been necessitated.

In the case that the parallel link disclosed in any one the above mentioned patent documents 1 and 2 is so installed that one side where a working device is fitted may be oriented downwards, the lubricant such as, for example, grease falls from gears of a drive transmitting mechanism (speed reducing unit) and the fall of the lubricant onto the work to be processed which is located downwards must be avoided. Ideally, the sealability of a bearing mounting portion and/or a gear mounting portion has to be increased to avoid the possibility that the lubricant may leak from the bearing and/or the gears, but this leads to the increase in size of the bearing mounting portion and/or the gear mounting portion, which in turn leads to the increase in size of the mechanism as a whole and to the cost increase. Also, although it may be contemplated to install a covering to cover the parallel link mechanism in its entirety, it has been difficult to install such a covering without interfering the operation of the parallel link mechanism.

Also, since the link actuation device disclosed in the above mentioned patent document 2 is such that the position and the orientation of the distal end side member relative to the proximal end side member are changed through a link mechanism, particularly where the position and orientation of the distal end side member are changed at a high speed, the problem has arisen that the stabilization time, which is the length of time required to complete the positioning of the distal end side member, tends to be increased due to the rigidity of the link mechanism.

SUMMARY OF THE INVENTION

In view of the foregoing, the present invention has for its essential object to provide an operating device for the link actuation device of a type in which the control of the actuator to change the distal end orientation is dealt with by the angle coordinate system, wherein the distal end orientation aimed at is designated in the orthogonal coordinate system so as to accomplish teaching viscerally.

Another important object of the present invention is to provide a link actuation device having a large working range and a capability of accomplishing the highly accurate positioning operation at a high speed, which is compact and inexpensive, and in which, even when the parallel link mechanism is installed so as to face downwards, the lubricant falling from the parallel link mechanism and others can be prevented from falling onto the work to be processed.

A further important object of the present invention is to provide a control method and a control device for executing the control method, which is applied to the link actuation device that is compact in structure and can operate in a large working range, wherein the high speed and high accurate positioning operation of the distal end side member can be accomplished.

The operating device for the link actuation device of the present invention is an operating device to operate a link actuation device through an actuator, in which a distal end side link hub is connected with a proximal end side link hub through three or more sets of link mechanisms for alteration in orientation, each of the link mechanisms includes proximal side and distal side end link members which are rotatably connected at one end with the proximal end side link hub and the distal end side link hub, respectively, and an intermediate link member having its opposite ends rotatably connected with the other ends of the proximal end side and distal side end link members, and a geometric model of the link mechanism depicted in line is a parallel link mechanism in which a proximal end side portion and a distal end side portion represent a symmetric shape relative to an intermediated portion of the intermediate link member. In addition, an actuator is provided in two or more sets of link mechanism of the three or more sets of the link mechanisms of the parallel link mechanism and is operable to arbitrarily change a distal end orientation, which is an orientation of the distal end side link hub relative to the proximal end side link hub, and the link actuation device includes a control device to control the actuator.

The control device referred to above is operable to stipulate the distal end orientation in terms of a bending angle, which is a vertical angle in which a center axis of the distal end side link hub is inclined relative to a center axis of the proximal end side link hub, and an angle of traverse which is a horizontal angle in which the center axis of the distal end side link hub is inclined relative to the center axis of the proximal end side link hub. The operating device referred to above includes an orientation designating unit to designate the distal end orientation, which is aimed at, by an artificial manipulation at a coordinate position of a two dimensional orthogonal coordinate system that intersects an extended axis of the center axis of the proximal end side link hub with a position of origin lying on the extended axis of the center axis, an orientation acquiring unit to acquire from the coordinate position, designated by the orientation designating unit, the distal end orientation that is expressed by the bending angle and the angle of traverse by means of a calculation, and an orientation information applying unit to apply information on the distal end orientation, which has been acquired by the orientation acquiring unit, to the control device.

According to the above described construction of the present invention, by means of an artificial manipulation by the use of the orientation designating unit, the distal end orientation aimed at is designated in terms of a coordinate position on the orthogonal coordinate system. The orientation acquiring unit acquires the distal end orientation, from the designated coordinate position, the distal end orientation expressed by the bending angle and the angle of traverse which have been calculated. The information on this distal end orientation is subsequently applied by the orientation information applying unit to the control device. The control device, using the information on the distal end orientation that is expressed by the bending angle and the angle of traverse, controls the actuator. In this way, the designation of the distal end orientation aimed at is carried out with the coordinate position on the orthogonal coordinate system, and therefore, even when the coordinate position of the work to be processed is handled on the orthogonal coordinate system, the link actuation device can be viscerally manipulated.

The orientation acquiring unit referred to above may make use of a convergence calculation based on the least squares method as the calculation for acquiring the distal end orientation that is expressed by the bending angle and the angle of traverse. According to the least squares method, the bending angle and the angle of traverse, which are proper to represent the distal end orientation, can be obtained with a simple calculation.

The control device referred to may calculate the commanded operation amount of each of the actuators in the following manner. That is to say, assuming that the angle of rotation of the proximal side end link member relative to the proximal end side link hub is expressed by $\beta n$, the angle formed between a first connecting end shaft of the intermediate link member, rotatably connected with the proximal side end link member, and a second connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, by executing an inverse transformation of the following formula;

$$\cos(\theta/2)\sin \beta n - \sin(\theta/2)\sin(\phi+\delta n)\cos \beta n + \sin(\gamma/2) = 0$$

the angle of rotation of the proximal side end link member in the distal end orientation, which is aimed at, is determined and the commanded operation amount of each of the actuators is calculated from the difference between the angle of rotation, which has been so determined, and the angle of rotation of each of the proximal side end link member in the current distal end orientation. According to the foregoing manner, the commanded operation amount can be easily determined and the control of the actuator becomes simplified.

Also, the control device referred to may calculate the commanded operation amount of each of the actuators in the following manner. That is to say, assuming that the angle of rotation of the proximal side end link member relative to the proximal end side link hub is expressed by $\beta n$, the angle formed between a first connecting end shaft of the intermediate link member, rotatably connected with the proximal side end link member, and a second connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, by executing an inverse transformation of the following formula;

$$\cos(\theta/2)\sin \beta n - \sin(\theta/2)\sin(\phi+\delta n)\cos \beta n + \sin(\gamma/2) = 0$$

the a table descriptive of relations between the distal end orientation and the angle of rotation of each of the proximal side end link members is formulated and, using this table, the angle of rotation of the proximal side end link member in the distal end orientation, which is aimed at, is determined and the commanded operation amount of each of the actuators is calculated from a difference between the angle of rotation, which has been so determined, and the angle of rotation of each of the proximal side end link member in the current distal end orientation. According to this manner, by tabulating beforehand the relation between the distal end orientation and the angle of rotation of each of the proximal side end link member, the length of time required to calculate the commanded operation amount with the use of the above formula can be shortened, and as a result, the control of the actuator can be accomplished at further high speed.

By way of example, the orientation designating unit executes a designation of the coordinate position on the orthogonal coordinate system by means of a numerical value input.

In such case, the coordinate position on the orthogonal coordinate system may be designated by a numerical value input of an absolute coordinate relative to a predetermined reference or by means of a numerical value input of the difference between the current coordinate position and a coordinate position which is aimed at.

Also, the orientation designating unit may designate a coordinate position on the orthogonal coordinate system by means of an operating amount determined in dependence on an operating time or an operating number. In such case, the relation between the operation and the coordinate position can be sensuously grasped.

A link actuation device of the present invention may include a decelerating unit or a speed reducing unit to transmitting a driving force of the actuator to a corresponding link mechanism, in which case the distal end side link hub is positioned below the proximal end side link hub, and a lubricant recovery member is provided in the parallel link mechanism or the decelerating unit to receive a lubricant falling downwardly from at least one of the parallel link mechanism and the decelerating unit.

The parallel link mechanism, which is a movable part of the link actuation device, includes the proximal end side link hub, the distal end side link hub and three or more sets of the link mechanism and is constructed as the double freedom degree mechanism in which the distal end side link hub is movable relative to the proximal end side link hub in two orthogonal axial directions. In other words, it is a mechanism in which the distal end side link hub is variable in orientation relative to the proximal end side link hub with the double freedom degrees of rotation. This double freedom degree mechanism is, though compact in size, effective to secure a large movable range for the distal end side link hub to be movable relative to the proximal end side link hub. For example, the bending angle between the center axis of the proximal end side link hub and the center axis of the distal end side link hub is about ±90° at maximum and the angle of traverse of the distal end side link hub relative to the proximal end side link hub can be set to a value within the range of 0 to 360°.

Due to the provision of the lubricant recovery member in the parallel link mechanism or the decelerating unit, even when the parallel link mechanism is oriented downwardly so that the distal end side link hub may be positioned below the proximal end side link hub, the lubricant falling from the parallel link mechanism and/or the decelerating unit is received by the lubricant recovery member. More specifically, the lubricant recovery member receives the lubricant leaking from the bearing, provided in the parallel link mechanism, and/or gears, provided in the decelerating unit, and subsequently falling along the parallel link mechanism or directly falling from the bearing and/or the gears. For this reason, the undesirable fall of the lubricant onto the work to be processed which is positioned therebelow can be avoided. Since the lubricant recovery member is of a structure so simplified as to merely receive the lubricant falling from the parallel link mechanism and/or the decelerating unit, it can be manufactured inexpensively. Also, the lubricant receiving member is sufficient if provided at a lower position of the parallel link mechanism and/or the decelerating unit and is not required to cover the parallel link mechanism in its entirety and, therefore, it is compact in size.

In other words, if the lubricant recovery member is employed, the lubricant in a small quantity is permitted to leak from the bearing of the parallel link mechanism and/or the gears of the decelerating unit. Therefore, the sealing structure of the bearing mounting portion and/or the gear mounting portion can be simplified. Accordingly, with the dimension of the bearing and others being reduced the mechanism can be compactized and the high speed positioning of the parallel link mechanism can be enabled. Also, replacement of the lubricant in the bearing mounting portion and/or the gear mounting portion can be accomplished easily and the maintenance is excellent. Further, it leads to the cost reduction.

In the link actuation device of the present invention, the lubricant recovery member may be a dish-like member including a plate shaped portion and a projecting portion projecting from an outer peripheral edge of the plate shaped portion in one direction intersecting a surface of the plate shaped portion, the projecting portion being arranged in the distal end side link hub so as to project towards the proximal end side link hub. The provision of the dish-like lubricant recovery member in the distal end side link hub, which is a distal end portion of the parallel link mechanism, is effective to receive all of the lubricant, falling from the parallel link mechanism and/or the decelerating unit. For this reason, it is possible to effectively avoid the falling of the lubricant onto the work to be processed that is positioned downwards. The lubricant recovery member has the projecting portion at the outer peripheral edge of the plate shaped portion and, therefore, the lubricant received by the plate shaped portion does not droop down from the outer peripheral edge of the plate shaped portion.

The projecting portion of the lubricant recovery member referred to above may be inclined towards a center axis of the distal end side link hub. In this case, the angle of inclination of the projecting portion of the lubricant recovery member is preferably set to be greater than a maximum value of the bending angle within an operating range of the parallel link mechanism. The bending angle is the vertical angle in which the center axis of the link hub is inclined relative to the center axis of the proximal end side link hub. In such case, even in a condition in which the distal end side link hub, where the lubricant recovery member is installed, tilts, the lubricant recovery member is effective to prevent the lubricant from flowing over the projecting portion and then drooping downwards. In particular, if the angle of tile of the projecting portion is set to a value greater than the maximum value of the bending angle, a projecting end side of the projecting portion is kept at all times in a condition tilted towards the center. Therefore, it is possible to assuredly avoid the downward fall of the lubricant, which has been once received by the lubricant recovery member, over the projecting portion and then drooping downwards therefrom.

The lubricant recovery member referred to above may include an upper plate connected with a projecting end of the projecting portion and arranged in parallel relation to the plate shaped portion, with the upper plate being formed with a throughhole. If the lubricant recovery member has the upper plate, even in a condition in which the distal end side link hub is tilted 90° (which is the maximum bending angle of the parallel link mechanism), the upper portion confronts in the vertical direction relative to the ground surface. Therefore, even when a substantial amount of the lubricant has already pooled within the lubricant recovery member, the drooping of the lubricant down from the lubricant recovery member can be assuredly avoided.

The link actuating device may include a base member having the proximal end side link hub and the actuator mounted thereon, and a fixing member supported by the base member and arranged in parallel relation to the base member, with the fixing member being formed with a throughhole, in which case the lubricant recovery member includes a plate shaped portion fixed to the distal end side link hub and an expandable connecting portion which covers an entire periphery between the plate shaped portion and the fixing member and which connects them together. According to this construction, the entire periphery between the fixing member and the plate shaped portion of the lubricant recovery member can be covered by the connecting member. Accordingly, a distal end side portion beyond the fixing member in the parallel link mechanism is broadly covered by the lubricant recovery member, and therefore, the lubricant also scattering from the parallel link mechanism and/or the decelerating unit during the operation can be received by the lubricant recovery member. Since the connecting portion is flexible, even though the orientation of the distal end side link hub relative to the proximal end side link hub changes, the connecting portion of the lubricant recovery member can correspondingly deform.

The connecting portion of the lubricant recovery member may be of a bellows shape and may be incorporated in the plate shaped portion and the fixing member in a condition compressed smaller than that in the natural state in which no external force acts and, alternatively, may be made of a sheet shaped elastic material. In either case, while the connecting portion of the lubricant recovery member has a flexible function, the entire periphery between the fixing member and the plate shaped portion of the lubricant recovery member can be covered with this connecting portion.

The fixing member referred to above may have its outer peripheral portion formed with a projecting portion protruding towards the base member. In this case, even though the lubricant falls onto the fixing member, the lubricant so falling will not fall towards the outside of the fixing member. Therefore, it is possible to avoid the falling of the lubricant onto the work to be processed.

The link actuation device may include a base member having the proximal end side link hub and the actuator mounted thereon, in which case, the lubricant recovery member may be of a dish-like shape having a plate shaped portion and a projecting portion protruding from an outer peripheral edge of the plate shaped portion in one direction intersecting a surface of the plate shaped portion, and the plate shaped portion may be installed on the base member or a fixing portion of the decelerating unit so as to cover an area below the decelerating unit with the projecting portion projecting towards the base member. The provision of such lubricant recovery member is effective to avoid the falling of the lubricant from the decelerating unit. For this reason, a sealing structure for the gears provided in the decelerating unit can be simplified.

The present invention in accordance with another aspect thereof provides a control method for controlling the operation of the actuator employed in the link actuation device of the type herein provided in accordance with the present invention. According to the control method for the link actuation device, by means of a synchronization control for controlling to start the operation of all of the actuators simultaneously and to complete such operation simultaneously, the operation of each of the actuators is controlled so that an orientation control is performed to change the distal end side link hub to an arbitrary orientation, and by setting a deceleration time of all of the actuators to a value in the vicinity of one cycle of a resonant frequency peculiar to the link actuation device, the synchronization control and the orientation control is performed. It is to be noted that the term "resonant frequency" referred to above and hereinafter is to be understood as synonymous to the resonant frequency appearing in a condition with a load mounted on the distal end side link hub.

By implementing the synchronization control, the operations of all of the actuators terminate at a time. Therefore, the balance of the force acting from each of the link mechanism to the distal end side link hub at the time of completion of the operation is rendered to be good, and the stabilization time of the distal end side link hub is shortened. It is to be noted that the stabilization time referred to above and hereinafter is to be understood as synonymous to the length of time passed from the termination of the operation of the actuator to the complete halt of the distal end side link hub.

Also, the distal end side link hub vibrates in a direction required to counterbalance the acceleration during about half the cycle of the resonant frequency. Therefore, if the deceleration time of the actuator is set to a value in the vicinity of one cycle of the resonant frequency peculiar to the link actuation device, the vibration of the distal end side link hub after a stepwise acceleration, in which the acceleration takes place cyclically, is rendered to be small particularly in the case of the stepwise acceleration. As a result thereof, the vibration of the distal end side link hub after the termination of the operation of the actuator is rendered to be small even during a high speed operation, and therefore, it is possible to allow the distal end side link hub to be operated to position at a high speed with a high accuracy. It is to be noted that since the orientation changes with the change of the position of the distal end side link hub relative to the proximal end side link hub, the positioning operation is synonymous to the orientation changing operation.

In the control method of the present invention, the deceleration time may be set to a value within the range of 0.8 to 1.2 cycle of the resonant frequency peculiar to the link actuation device. The timing at which the sine wave attains the maximum amplitude is 0.75 cycle and 1.25 cycle. Accordingly, in order to avoid the condition in which after the termination of the deceleration the vibration at the maximum amplitude occurs, the deceleration time is set to a value within the range of 0.8 to 1.2 cycle of the resonant frequency peculiar to the link actuation device.

In the control method of the present invention, by setting the acceleration time of all of the actuators to a value in the vicinity of one cycle of the resonant frequency peculiar to the link actuation device, the synchronization control and the orientation control may be performed. The distal end side link hub vibrates in a direction required to counterbalance the acceleration during about half the cycle of the resonant frequency. Accordingly, if the acceleration time of the actuator is set to a value in the vicinity of one cycle of the resonant frequency peculiar to the link actuation device, the vibration of the distal end side link hub after a stepwise acceleration, in which the acceleration takes place cyclically, is rendered to be small particularly in the case of the stepwise acceleration. As a result thereof, the vibration of the distal end side link hub tending to be generated at the time of start is rendered to be small, and therefore, it is possible to allow the distal end side link hub to be operated to position at a high speed with a high accuracy.

In the control method of the present invention, the acceleration time may be set to a value within the range of 0.8 to 1.2 cycle of the resonant frequency peculiar to the link actuation device. The timing at which the sine wave attains the maximum amplitude is 0.75 cycle and 1.25 cycle. Accordingly, in order to avoid the condition in which after the termination of the acceleration the vibration at the maximum amplitude occurs, the acceleration time is set to a value within the range of 0.8 to 1.2 cycle of the resonant frequency peculiar to the link actuation device.

In the control method of the present invention, the orientation control may be operable to determine the commanded operation amount for each of the actuators from the orientation of the distal end side link hub, which is aimed at, and the synchronization control may be operable to determine the operating velocity of each of the actuators in reference to a ratio of the commanded operation amounts of all of the actuators. During the orientation control of the link actuation device, since the commanded operation amounts of the respective actuators are different from each other, setting the command velocity by means of the ratio thereof is effective to enable the synchronization control to be accomplished easily.

The commanded operation amount of each of the actuators can be determined in the following manner. Namely, when the angle of rotation of the proximal side end link member relative to the proximal end side link hub is expressed by $\beta n$, the angle formed between a first connecting end shaft of the intermediate link member, rotatably connected with the proximal side end link member, and a second connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, by the inverse transformation of the following formula;

$$\cos(\theta/2)\sin \beta n - \sin(\theta/2)\sin(\phi+\delta n)\cos \beta n + \sin(\gamma/2) = 0$$

the angle of rotation, which is aimed at, of each of the proximal side end link members in the orientation control is determined, and the commanded operation amount of each of the actuators is calculated by the difference between the angle of rotation, which is aimed at, and the current angle of rotation of each of the proximal side end link member. According to this manner, the commanded operation amount can be easily determined and the orientation control is rendered to be simplified.

Also, the commanded operation amount of each of the actuator may be determined in the following manner: Namely, when the angle of rotation of the proximal side end link member relative to the proximal end side link hub is expressed by $\beta n$, the angle formed between a connecting end shaft of the intermediate link member, rotatably connected with the proximal side end link member, and a connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, by the inverse transformation of the following formula;

$$\cos(\theta/2)\sin \beta n - \sin(\theta/2)\sin(\phi+\delta n)\cos \beta n + \sin(\gamma/2) = 0$$

a table descriptive of relations between the orientation of the distal end side link hub relative to the proximal end side link hub and the angle of rotation of each of the proximal side end link members is formulated, and, using this table, the angle of rotation, which is aimed at, of each of the proximal side end link members in the orientation control is determined, and the commanded operation amount of each of the actuators is calculated by the difference between the angle of rotation, which is aimed at, and the current angle of rotation of each of the proximal side end link member.

According to this manner, by tabulating beforehand the relation between the orientation of the distal end side link hub relative to the proximal side end link hub and the angle of rotation of each of the proximal side end link members, the length of time required to complete the calculation of the commanded operation amount using the above formula can be shortened, and the further high speed orientation control can be enabled.

The operating velocity of each of the actuators may be calculated with the use of the following formula;

$$V_n = \frac{V(\beta'_n - \beta_n)}{\sqrt{(\beta'_1 - \beta_1)^2 + (\beta'_2 - \beta_2)^2 + (\beta'_3 - \beta_3)^2}} \quad (n = 1, 2, 3)$$

when the operating velocity is expressed by Vn, the base velocity is expressed by V, the current angle of rotation of the proximal side end link member is expressed by $\beta n$, and the angle of rotation, which is aimed at, of the proximal side end link member in the orientation control is expressed by $\beta n'$. When the above formula is used, the base velocity V is a composite velocity of the operating velocity Vn of each actuator, and under any circumstances the control can be accomplished so that the velocity of movement of the proximal end side link hub may be substantially constant.

Also, the operating velocity of each of the actuators may be calculated with the use of the following formula;

$$Vn = V\max(\beta n' - \beta n)/\Delta\beta\max$$

when the operating velocity is expressed by Vn, the maximum velocity is expressed by Vmax, the current angle of rotation of the proximal side end link member is expressed by $\beta n$, the angle of rotation, which is aimed at, of the proximal side end link member in the orientation control is expressed by $\beta n'$ and the maximum value of $(\beta n'-\beta n)$ is expressed by $\Delta\beta max$. In this case, at least one of the actuators can be driven and positioned at the highest speed at all times, and therefore, the control can be accomplished so as to maximize the velocity of movement of the proximal end side link hub.

In the control method of the present invention, all of the three or more sets of the link mechanisms may include an actuator to arbitrarily change the orientation of the distal end side link hub relative to the proximal end side link hub, in which case each of those actuators is controlled under a redundancy control. With the redundancy control executed, even though the distal end side link hub is held in any orientation, the driving balance of each of the actuators can be bettered, and the stabilization time of the distal end side link hub can be shortened. Also, since the control can be accomplished to suppress the rattling motions of the actuator and its peripheral portions and the rattling motions of the link mechanism, the vibration of the distal end side link hub resulting from the rattling motions occurring after the halt of the actuator can be suppressed and the stabilization time can be shortened.

In the control method of the present invention, a resonant frequency detecting sensor to detect the resonant frequency peculiar to the link actuation device may be provided in the distal end side link hub, in which case, from a signal of the resonant frequency detecting sensor, the resonant frequency is calculated by use of a resonant frequency measuring instrument, and from the result of such calculation, respective preset values of the acceleration time and the deceleration time in the actuator are updated. Even though the distal end load and the rigidity of the link actuation device change, the acceleration time and the deceleration time can be easily updated. Therefore, under any circumstances, the vibration of the distal end side link hub is rendered to be small after the actuator is brought to a halt, thus enabling the highly accurate positioning to be accomplished at the high speed.

It is recommended to use an acceleration pickup as the resonant frequency detecting sensor and also to use an FFT analyzer as the resonant frequency measuring instrument. The acceleration pickup is compact and easy to install, and with the FFT analyzer the acceleration time and the deceleration time can be easily set.

The control device for the link actuation device of the present invention is operable to control the operation of the actuator referred to above, and may include a synchronization and orientation control unit. The synchronization and orientation control unit may be operable to control the operation of each of the actuators by means of a synchronization control for controlling to start the operation of all of the actuators simultaneously and to complete such operation simultaneously so that an orientation control is performed to change the distal end side link hub to an arbitrary orientation. The synchronization and orientation control unit may be operable to perform the synchronization control and the orientation control by setting the deceleration time of all of the actuators to a value in the vicinity of one cycle of the resonant frequency peculiar to the link actuation device.

By implementing the synchronization control, the operations of all of the actuators terminate at a time. Therefore, the balance of the force acting from each of the link mechanism to the distal end side link hub at the time of completion of the operation is rendered to be good, and the stabilization time of the distal end side link hub is shortened.

In addition, the distal end side link hub vibrates in a direction required to counterbalance the acceleration during about half the cycle of the resonant frequency. Therefore, if the deceleration time of the actuator is set to a value in the vicinity of one cycle of the resonant frequency peculiar to the link actuation device, the vibration of the distal end side link hub after a stepwise acceleration, in which the acceleration takes place cyclically, is rendered to be small particularly in the case of the stepwise acceleration. As a result thereof, the vibration of the distal end side link hub after the termination of the operation of the actuator is rendered to be small even during a high speed operation, and therefore, it is possible to allow the distal end side link hub to be operated to position at a high speed with a high accuracy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will readily and clearly be understood from the following detailed description herein set forth in connection with preferred embodiments thereof with reference to the accompanying drawings. It is, however, to be noted that the preferred embodiments of the present invention herein set forth and the accompanying drawings showing such preferred embodiments are only for the purpose of illustration and should not be used to limit the scope of the present invention in any way whatsoever. The scope of the present invention are to be understood as defined by the appended claims. In the accompanying drawings, like component parts shown in the accompanying drawings are designated by like reference numerals throughout the several views thereof, and:

DESCRIPTION OF PREFERRED EMBODIMENTS

Figure 1:
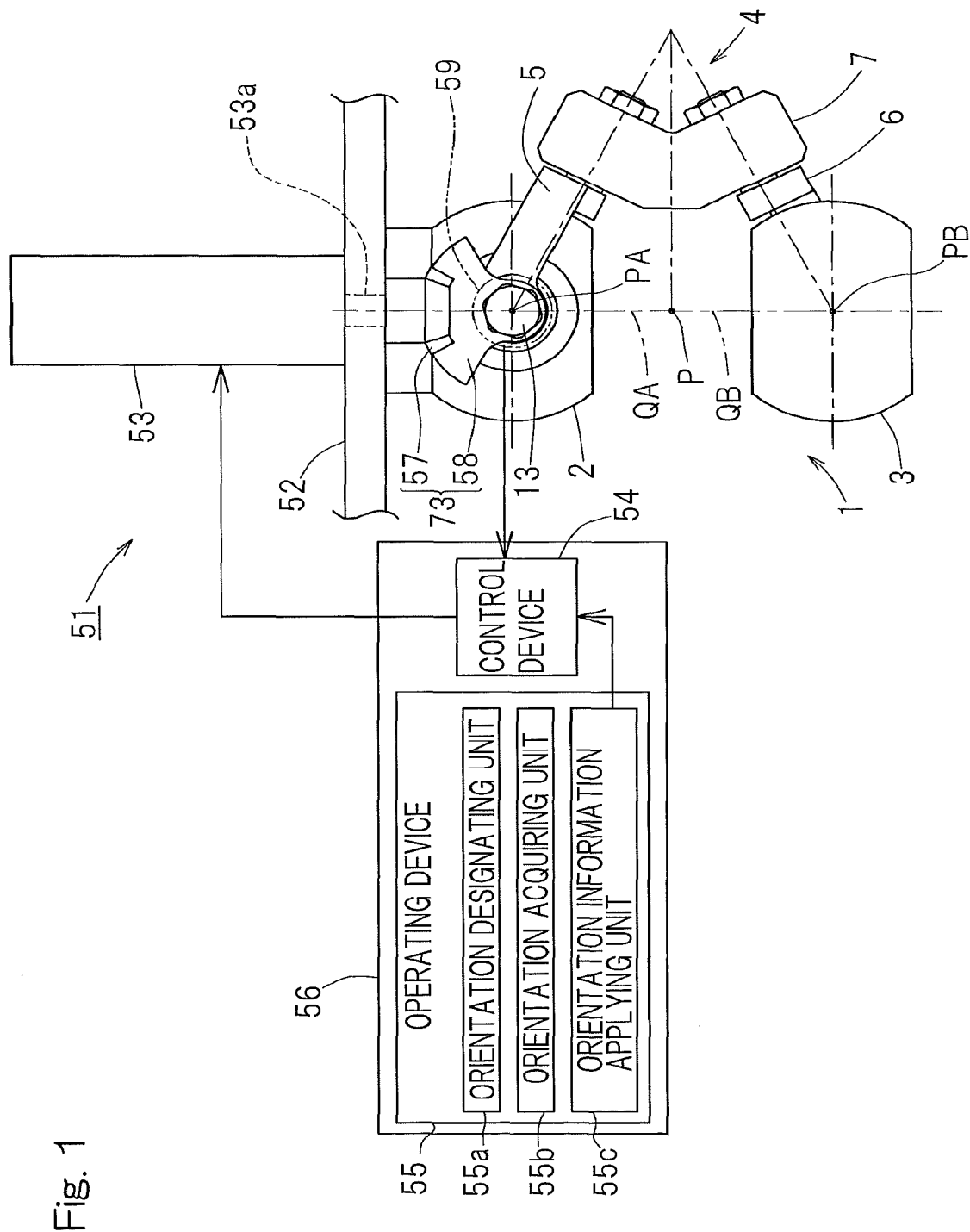
FIG. 1 is a front elevational view showing a first preferred embodiment of a link actuation device equipped with an operating device of the present invention, with a portion thereof omitted.

The first preferred embodiment of the link actuation device equipped with an operating device designed in accordance with the present invention will be described in detail with particular reference to FIGS. 1 to 6. As shown in FIG. 1, the link actuation device, identified generally by 51, includes a parallel link mechanism 1, a plurality of actuators 53 (equal in number to the number of link mechanisms 4 as will be described later) for actuating the parallel link mechanism 1, a control device 54 for controlling those actuators 53 and the operating device, identified by 55, for inputting an operating command to the control device 54. Although in the embodiment as shown, the control device 54 and the operating device 55 are both provided in a controller 56, the control device 54 may be provided separate from the controller 56. In the embodiment as shown, the parallel link mechanism 1 is mounted on a base member 52 in a fashion suspended downwardly from such base member 52.

Figure 2:
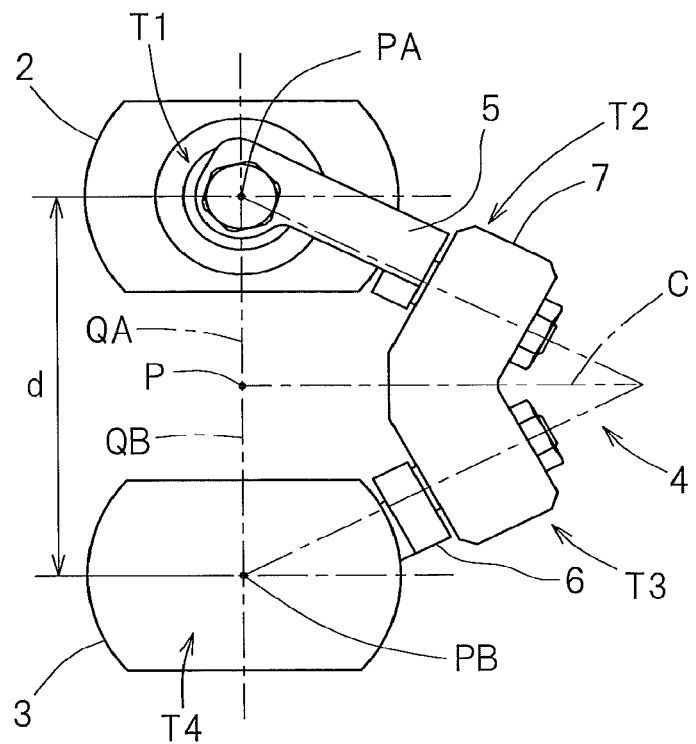
FIG. 2 is a front elevational view showing a parallel link mechanism of the link actuation device in one operating condition, with a portion thereof to omitted.
Figure 3:
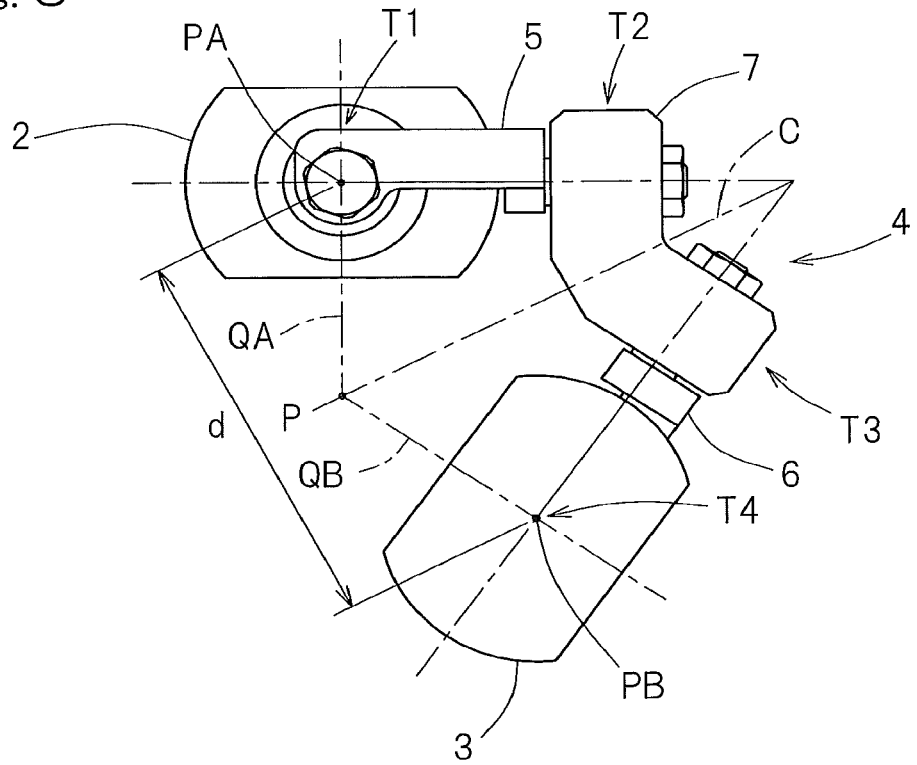
FIG. 3 is a front elevational view showing a parallel link mechanism of the link actuation device in a different operating condition, with a portion thereof omitted.

The details of the parallel link mechanism 1 will now be described. FIGS. 2 and 3 illustrate respective front elevational views of the parallel link mechanism 1 in different operative conditions. The parallel link mechanism 1 is of a structure in which a distal end side link hub 3 is connected with a proximal end side link hub 2 through three sets of link mechanisms 4 for alteration in orientation. It is, however, to be noted that only one set of the link mechanism 4 is shown in FIGS. 2 and 3.

Figure 4:
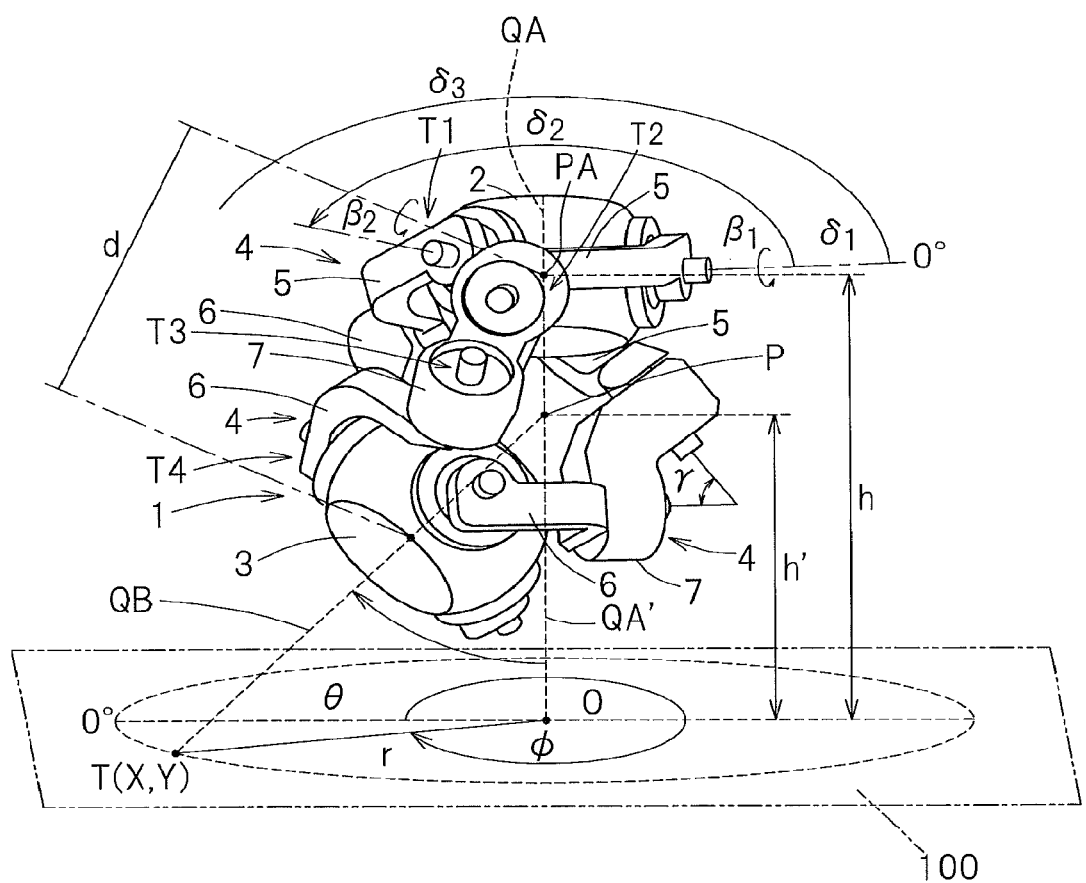
FIG. 4 is a perspective view showing the parallel link mechanism of the link actuation device in a three dimensional representation.

FIG. 4 illustrates a perspective view showing the parallel link mechanism 1 in a three dimensional representation. Each of the link mechanism 4 includes a proximal side end link member 5, a distal side end link member 6 and an intermediate link member 7, and forms a triple link chain type link mechanism utilizing four revolve pairings. The revolute pairing and its peripherals are shown as revolute pairing portions T1 to T4. The proximal side and distal side end link members 5 and 6 represent an L-shaped configuration and have proximal ends connected rotatably with the proximal end side link hub 2 and the distal end side link hub 3, respectively. The intermediate link member 7 has opposite ends rotatably connected with respective distal ends of the proximal side and distal side end link members 5 and 6.

The proximal side and distal side end link members 5 and 6 are of a spherical link structure. Specifically, respective spherical link centers PA and PB (best shown in FIGS. 2 and 3) in the three sets of the link mechanisms 4 coincide with each other and, also, respective distances d between the spherical link centers PA and PB are equal to each other. Center axes of the respective revolve pairings between the end link members 5 and 6 and the intermediate link 7 may lie at a certain crossing angle or may be parallel to each other.

Figure 5:
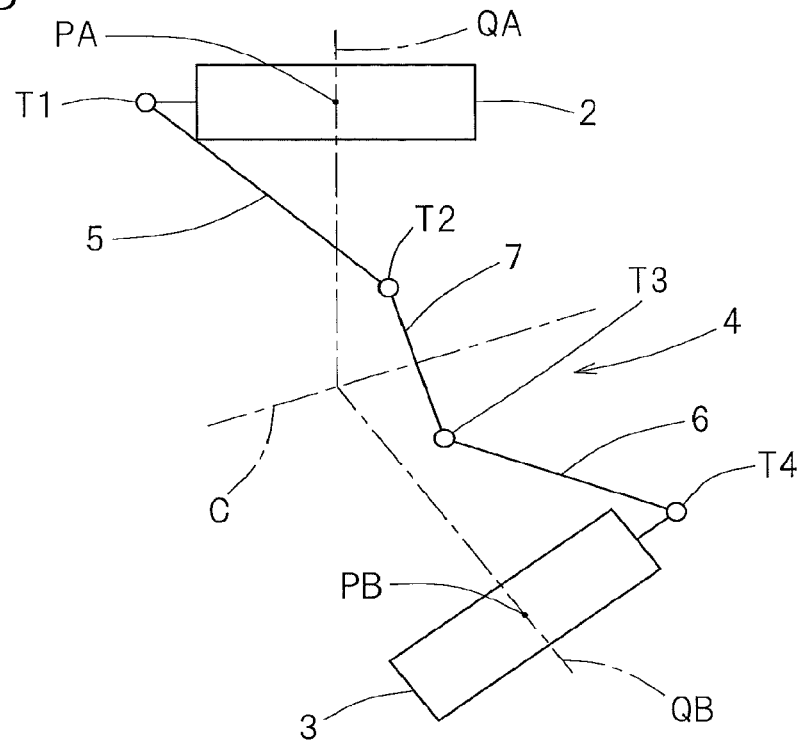
FIG. 5 is a diagram, in the form of a line drawing, showing one of the link mechanisms of the link actuation device.

In other words, the three sets of the link mechanisms 4 represent a geometrically identical shape. The geometrically identical shape means that a geometrical model, in which the link members 5, 6 and 7 are shown by line, that is, a model expressed by lines that connect between the revolve pairing portions T1 to T4 and respective lines connecting those revolve pairing portions T1 to T4 represent such a shape that a proximal end side portion and a distal end side portion assumes a symmetry relative to an intermediate portion of the intermediate link member 7. FIG. 5 is a diagram showing one set of the link mechanisms 4 expressed by rectilinear lines.

As shown in FIG. 5, the link mechanism 4 employed in the practice of this embodiment is a rotation symmetric type. Specifically, respective positional relations between both of the proximal end side link hub 2 and the proximal side end link member 5 and both of the distal end side link hub 3 and the distal side end link member 6 are a rotation symmetry with respect to a center line C of the intermediate link member 7. FIG. 2 illustrates a condition in which a center axis QA of the proximal end side link hub 2 and a center axis QB of the distal end side link hub 3 lie on the same line, whereas FIG. 3 illustrates a condition in which the center axis QB of the distal end side link hub 3 assumes a predetermined operating angle relative to the center axis QA of the proximal end side link hub 2. Even though the orientation of each of the link mechanisms 4 changes, the distance d between the proximal end side spherical link center PA and the distal end side spherical link center PB does not change.

The proximal end side link hub 2, the distal end side link hub 3 and the three sets of the link mechanisms 4 cooperate with each other to define a double freedom degree mechanism in which the distal end side link hub 3 are movable in two axis directions perpendicular to each other relative to the proximal end side link hub 2. In other words, it is a mechanism in which the distal end side link hub 3 can be altered in orientation relative to the proximal end side link hub 2 with its rotation taking place in double freedom degrees. This double freedom degree mechanism allows the distal end side link hub 3 to change its orientation relative to the proximal end side link hub 2 about the crossing point P at which the center axis QA of the proximal end side link hub 2, the center axis QB of the distal end side link hub 3 and the center line C of the intermediate link member 7 intersect.

This double freedom degree mechanism, despite of its structure being compact, can secure the range of movement of the distal end side link hub 3 relative to the proximal end side link hub 2. By way of example, as shown in FIG. 4, it is possible to set the maximum value of the bending angle $\theta$ (the maximum bending angle) between the center axis QA of the proximal end side link hub 2 and the center axis QB of the distal end side link hub 3 to about ±90°. Also, the angle of traverse $\phi$ of the distal end side link hub 3 relative to the proximal end side link hub 2 can be set to the range of 0 to 360°. The bending angle $\theta$ stands for the vertical angle in which the center axis QB of the distal end side link hub 3 is inclined relative to the center axis QA of the proximal end side link hub 2, whereas the angle of traverse $\phi$ stands for the horizontal angle in which the center axis QB of the distal end side link hub 3 is inclined relative to the center axis QA of the proximal end side link hub 2.

In this parallel link mechanism 1, when the angles and lengths of shaft members 13 (shown in FIG. 6) of the end link members 5 and 6 of each of the link mechanisms 4 are equal to each other, geometric shapes of the proximal side end link member 5 and the distal side end link member 6 are equal to each other, and the shape of the intermediate link member 7 is also identical on the proximal end side and the distal end side, the angular positional relation between the intermediate link member 7 and the end link members 5 and 6 with respect to the plane of symmetry of the intermediate link member 7 is made identical on the proximal end side. By so doing, the distal end side, both of the proximal end side link hub 2 and the proximal side end link member 5 and both of the distal end side link hub 3 and the distal side end link member 6 move similarly due to geometric symmetry. For example, when rotary shafts are provided in the proximal end side and distal end side link hubs 2 and 3 in a fashion coaxial with the center axes QA and QB and transmission of the rotary motion takes place from the proximal end side to the distal end side, a constant velocity universal joint is formed in which the proximal end side and the distal end side rotate synchronously at equal angles of rotations and at the constant speed. The place of symmetry of the intermediate link member 7, when undergoing a constant velocity rotation, is called a uniform bisecting plane.

Because of that, when the plurality of the link mechanisms 4 of the same geometric shape, which commonly share the proximal end side link hub 2 and the distal end side link hub 3, are disposed on the circumference, the intermediate link member 7 is limited to the movement on the uniform bisecting plane as the position in which the plurality of the link mechanisms 4 can move without contradiction. Accordingly, even though the proximal end side and the distal end side take any arbitrary operating angle, the proximal end side and the distal end side undergo a constant velocity rotation.

Figure 6:
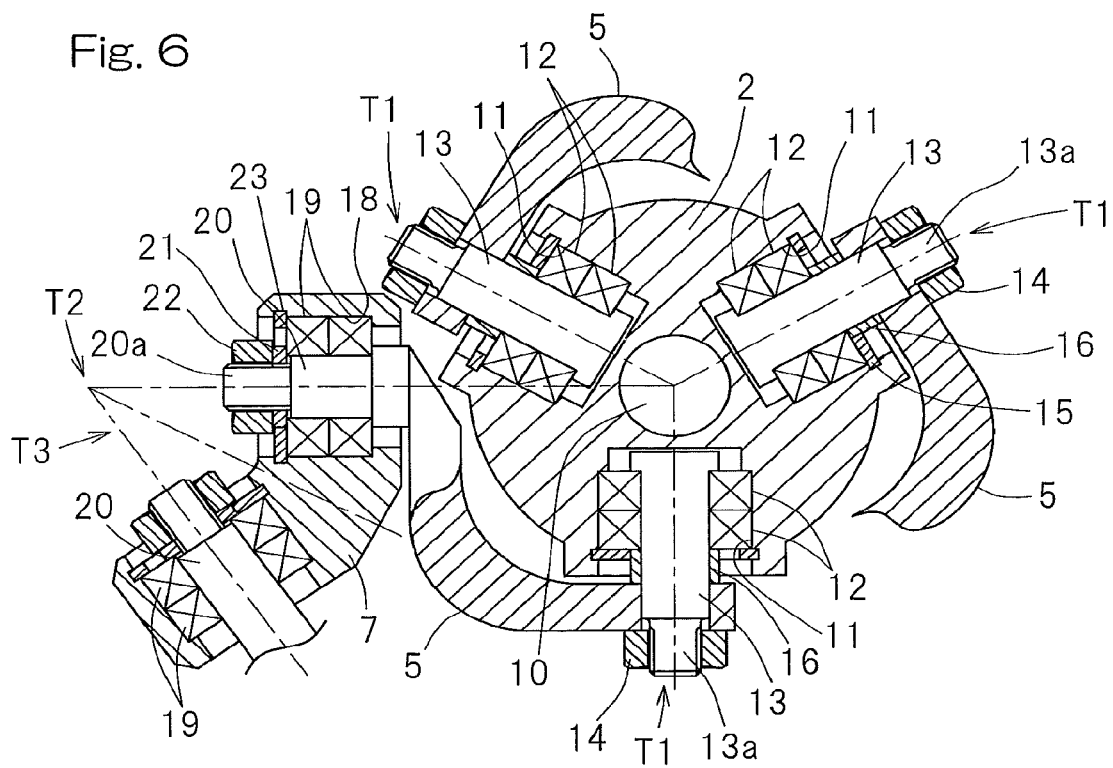
FIG. 6 is a fragmentary sectional view showing the parallel link mechanism of the link actuation device.

As shown in FIG. 6 as will be described later, the proximal end side link hub 2 and the distal end side link hub 3 have respective center portions in which throughholes 10 are defined therein so as to extend in an axial direction, an outer shape of each of which represents a ring form. Respective centers of the throughholes 10 coincide with the center axes QA and QB of the link hubs 2 and 3. At positions equidistantly spaced in a circumferential direction of outer peripheral surfaces of the proximal end side link hub 2 and distal end side link hub 3, the proximal side end link member 5 and the distal side end link member 6 are rotatably connected with each other, respectively.

FIG. 6 is a fragmentary sectional view showing the revolve pairing portion T1 between the proximal end side link hub 2 and the proximal side end link member 5 and the revolve pairing portion T2 between the proximal side end link member 5 and the intermediate link member 7. The proximal end side link hub 2 has a convene portion 11 defined therein at three circumferential locations so as to dent radially inwardly from an outer peripheral surface thereof, and the shaft member 13 is rotatably supported via two bearings 12 provided inside each of the concave portions 11. An outer side end portion of the shaft member 13 protrudes outwardly from the proximal end side link hub 2, and to a projecting threaded portion 13a thereof, the proximal side end link member 5 is connected and fixedly fastened in position by use of a nut 14.

The bearing 12 is in the form of a rolling bearing such as, for example, a deep groove ball bearing or the like, and includes an outer ring (not shown) engaged with an inner periphery of the concave portion 11 and an inner ring (also not shown) engaged with an outer periphery of the shaft member 13. The outer ring is constrained in position by a stop ring 15 so that it will not be detached. Also, a spacer 16 is interposed between the inner ring and the proximal side end link member 5, and a fastening force of the nut 14 is transmitted to the inner ring through the proximal side end link member 5 and the spacer 16 to thereby apply a predetermined preload to the bearing 12.

The revolve pairing portion T2 between the proximal side end link member 5 and the intermediate link member 7 is such that two bearings 19 are provided in communicating holes 18 defined in opposite ends of the intermediate link member 7 and, by those bearings 19, a shaft portion 20 at a distal end of the proximal side end link member 5 is rotatably supported. The bearings 19 are fastened by respective nuts 22 through associated spacers 21.

The bearing 19 is in the form of, for example a rolling bearing such as, for example, a deep groove ball bearing or the like, and includes an outer ring (not shown) engaged in an inner periphery of the communicating hole 18 and an inner ring (not shown) engaged with an outer periphery of the shaft portion 20. The outer ring is constrained in position by a stop ring 23 so that it will not be detached. A fastening force of the nut 22 threadingly mounted on a distal end threaded portion 20a of the shaft portion 20 is transmitted to the inner ring through the spacer 21 to thereby apply a predetermined preload to the bearing 19

In the foregoing description, reference has been made to the revolve pairing portion T1 between the proximal end side link hub 2 and the proximal side end link member 5 and also to the revolve pairing portion T2 between the proximal side end link member 5 and the intermediate link member 7, but the revolve pairing portion T4 between the distal end side link hub 3 and the distal side end link member 6 and the revolve pairing portion T3 between the distal side end link member 6 and the intermediate link member 7 are also similarly identical (although they are not shown).

As discussed above, the provision of the bearings 12 and 19 in the four revolve pairing portions T1 to T4 in each of the link mechanisms 4, that is, the revolve pairing portion T1 between the proximal end side link hub 2 and the proximal side end link member 5, the revolve pairing portion T4 between the distal end side link hub 3 and the distal side end link member 6, the revolve pairing portion T2 between the proximal side end link member 5 and the intermediate link member 7 and the revolve pairing portion T3 between the distal side end link member 6 and the intermediate link member 7 makes it possible to design the reduction of the rotational resistance while suppressing the frictional resistance occurring at each of the revolve pairing portions T1 to T4 so that a smooth power transmission can be achieved, and also the durability can be increased.

In the structure in which the bearings 12 and 19 are employed, application of the preload to the bearings 12 and 19 is effective to eliminate both of a radial gap and a thrust gas to enable suppression of rattling motions in the revolve pairing portion. Accordingly, the rotational phase difference between the side of the proximal end side link hub 2 and the side of the distal end side link hub 3 can be eliminated to enable the isokinetic property to be maintained along with the suppression of generation of vibrations and obnoxious noises. In particular, when the bearing gap in each of the bearings 12 and 19 referred to above is rendered to be a negative gap, the backlash occurring between input and output can be minimized.

Since the bearing 12 is provided in the proximal end side link hub 2 and the distal end side link hub 3 in an embedded fashion, the contour of the proximal end side link hub 2 and the distal end side link hub 3 can be expanded without increasing the contour of the parallel link mechanism 1 in its entirety. For this reason, securement of a mounting space for fitting the proximal end side link hub 2 and the distal end side link hub 3 to other members can be facilitated.

Referring to FIG. 1, the parallel link mechanism 1 is of a structure in which the proximal end side link hub 2 is secured to an undersurface of the base member 52 and the distal end side link hub 3 is in a fashion suspended downwardly. A plurality of actuators 53 in the form of a rotary actuator, equal in number to the number of the link mechanism 4, say, three actuators 53, are installed on an upper surface of the base member 52. The actuator 53 has an output shaft 53a protruding downwardly after having passed through the base member 52, and a bevel gear 57 fitted to the output shaft 53a and a sector shaped bevel gear 58 fitted to the shaft member 13 (best shown in FIG. 6) of the proximal end side link hub 2 are meshed with each other. The bevel gear 57 and the bevel gear 58 cooperate with each other to define a gear type decelerating unit 73.

When the actuator 53 is rotated, the rotation thereof is transmitted to the shaft member 13 through a pair of bevel gears 57 and 58 and the angle of the proximal side end link member 5 relative to the proximal end side link hub 2 changes accordingly. By controlling the amount of operation of each of the actuators 53 to adjust the angle of the proximal side end link member 5 for each of the link mechanisms 4, the orientation of the distal end side link hub 3 (hereinafter referred to "distal end orientation") relative to the proximal end side link hub 2 is determined. The operation of each of the actuators 53 is controlled by the control device 54 on the basis of an operation command of the operating device 55.

The operating device 55 includes an orientation designating unit 55a, an orientation acquiring unit 55b and an orientation information applying unit 55c. The orientation designating unit 55a is operable to designate the distal end orientation, which is aimed at, by means of an artificial manipulation and designates the distal end orientation in coordinate position on the two dimensional orthogonal coordinate system. The orthogonal coordinate system is an XY orthogonal coordinate system 100, which traverses an extended axis QA' of the center axis QA of the proximal end side link hub 2, in which the point of origin O is defined at an arbitrary position on the extended axis QA' as shown in FIG. 4. The distal end orientation which is aimed at, that is, the target distal end orientation is expressed by a target coordinate T(X, Y), which is the coordinate at the point at which the center axis QB of the distal end side link hub 3 intersects the XY orthogonal coordinate system 100. The manner in which the target coordinate T is designated will be described later.

The orientation acquiring unit 55b referred to above is operable to convert the distal end orientation, which is expressed by the coordinate position on the XY orthogonal coordinate system 100 designated by the orientation designating unit 55a, into the distal end orientation, which is expressed by the bending angle θ and the angle of traverse φ of the angular coordinate system. The principle of such conversion will now be discussed.

The distance r between the point of origin O and the target coordinate T on the XY coordinate system 100 can be determined with the use of the following formula (1):

$$r=\sqrt{X^2+Y^2} \quad (1)$$

Also, the distance r' between the point of origin O and the target coordinate T on the angular coordinate system can be determined with the use of the following formula (2):

$$r'=h'\times\tan\theta \quad (2)$$

In the formula (2) above, the parameter h' represents the height from the point of intersection P, which is the center of rotation for the change of the orientation of the distal end side link hub 3, to the target coordinate T. When the distance between the spherical links PA and PB is expressed by d and the height from the spherical link center PA of the proximal end side link hub 2 to the target coordinate T is expressed by h, the height h' can be determined from the formula (3) described below. Substituting the height h', so determined by the formula (3), into the formula (2) above results in the distance r' between the point of origin O and the target coordinate T on the angular coordinate system. It is to be noted that the parameters d and h represent respective fixed values determined by the dimension of the parallel link mechanism 1 and a device having the link actuation device 51 mounted thereon.

$$h'=[h-d/(2\times\cos\theta/2)] \quad (3)$$

The distance r between the point of origin O and the target coordinate T on the XY coordinate system 100 so determined and the distance r' between the point of origin O and the target coordinate T on the angle coordinate system so determined are compared with each other and the bending angle θ at which the difference becomes minimal is searched. The search of the bending angle θ is carried out with the use of the convergence calculation based on the least squares method as shown by, for example, the following formula (4):

$$dr=(r-r')^2 \quad (4)$$

Figure 7:
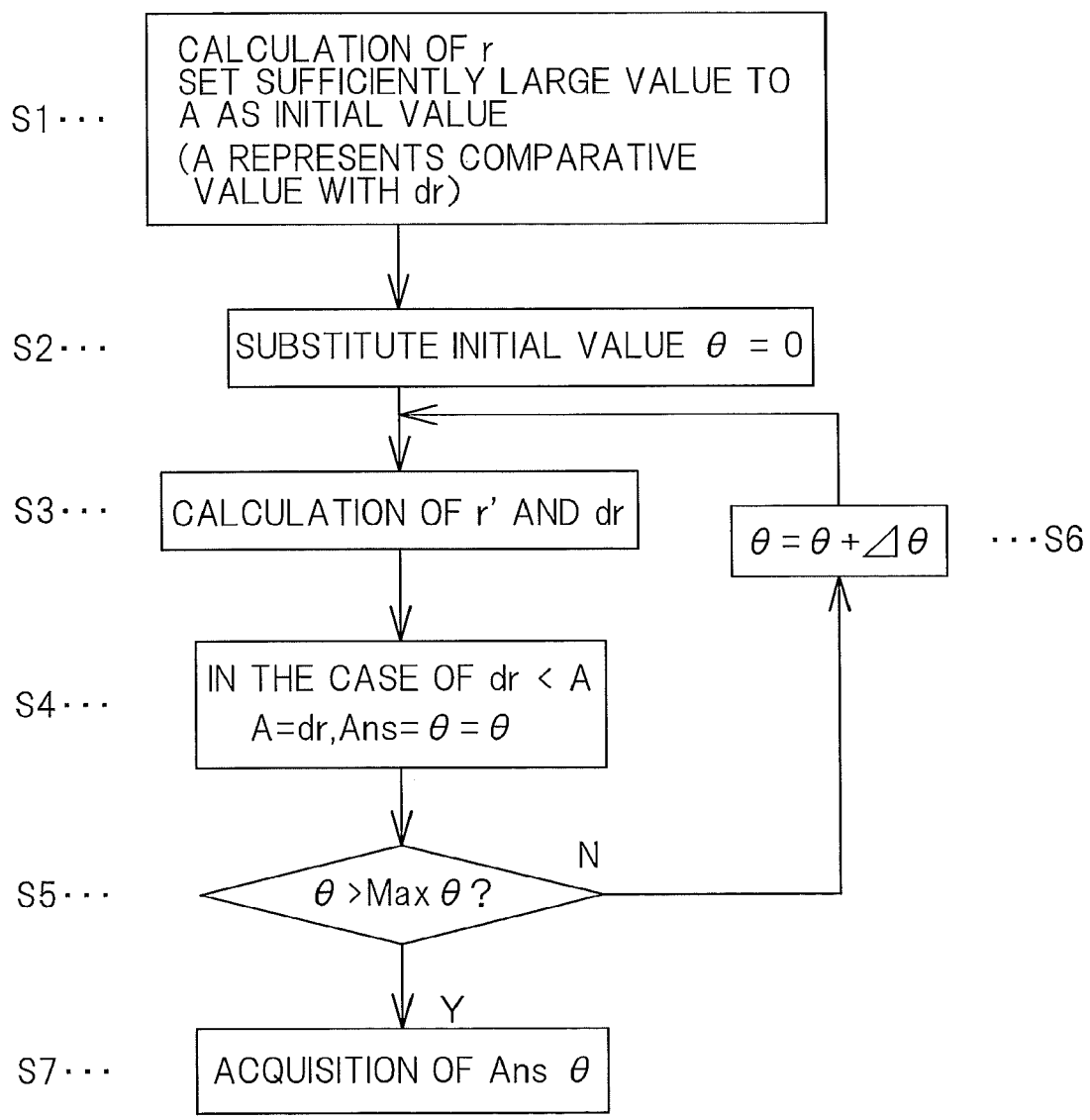
FIG. 7 is a flowchart of convergence calculation according to the least squares method for the determination of the bending angle.

The convergence calculation based on the least squares method is performed in such a sequence as shown in the flowchart in FIG. 7. At the outset, at step S1, calculation of the distance r according to the formula (1) and setting of the initial value of a comparison value A are carried out. The comparison value A is a value of comparison with the parameter dr, and a value sufficiently larger than the value of the parameter dr calculated during the search step is set as the initial value.

With θ=0° substituted at the subsequent step S2, the parameters $r^2$ and dr are calculated at step S3. Also, at step S4, if the parameter dr is smaller than the parameter A, the parameter dr is substituted into the parameter A and the parameter θ at that time is substituted into Ans θ. Conversely, if the parameter dr is larger than the parameter A, A and Ans are left unchanged. At step S5, the parameter θ is compared with the maximum value Max θ within a preset angle range. If the parameter θ is smaller than the maximum value Max θ, the parameter θ is rendered to be θ+Δθ at step S6, followed by addition of a certain predetermined value.

The cycle of steps S3, S4 and S6 is repeated until the parameter θ attains the maximum value Max θ of the certain preset angle range. Then, at step S7, the finally obtained parameter Ans θ is rendered to be the bending angle θ.

Using the bending angle θ so determined through the above described search, the angle of traverse φ is determined. If at this time θ=0;

$$\phi=0 \quad (5)$$

but if θ≠0;

$$\phi=\tan^{-1}(Y/X) \quad (6)$$

By the bending angle θ, determined by the manipulation shown in the flowchart of FIG. 7, and the angle of traverse φ determined by the formula (5) or the formula (6), the target distal end orientation is prescribed. As discussed above, if the bending angle θ is determined by sequentially searching from the neighbor of the current coordinate position, taken as reference, according to the convergence calculation based on the least squares method, the number of calculations can be reduced.

The orientation information applying unit 55c referred to above applies to the control device 54, information on the distal end orientation acquired by the orientation acquiring unit 55b, that is the bending angle θ and the angle of traverse φ.

The control device 54 is capable of performing a numerical control by means of a computer. The control device 54 determines the angle of rotation βn (best shown in FIG. 4) of each of the proximal side end link member 5, which is aimed at, and controls each of the actuators 53 on a feedback basis so that the actual angle of rotation βn, which is detected by an orientation detecting unit 59 (best shown in FIG. 1), approaches the angle of rotation βn, which is aimed at.

The angle of rotation βn can be determined by, for example, the inverse transform of the following equation (7). The inverse transform is a conversion to calculate the angle of rotation βn from the bending angle θ and the angle of traverse φ. The bending angle θ and the angle of traverse φ have an interrelationship with the angle of rotation βn and, hence, one value can deliver the other value.

$$\cos\theta/2\cdot\sin\beta n-\sin\theta/2\cdot\sin(\phi+\delta n)\cos\beta n+\sin\gamma 2=0 \quad (7)$$

wherein n=(1, 2, 3).

In the formula (7) above, γ represents the angle γ (shown in FIG. 4), which is formed between a first connecting end axis of the intermediate link member 7, rotatably connected with the proximal side end link member 5, and a second connecting end axis of the intermediate link member 7 connected rotatably with the distal side end link member 6. The angle βn (δ1, δ2, δ3 shown in FIG. 4) represents the angle of separation of each of the proximal side end link member 5 relative to the proximal side end link member 5, which forms the reference, in the circumferential direction.

While the angle of rotation βn may be determined by the inverse transformation of the formula (7) for each command, such a table as shown in Table 1 below, which illustrates relations between the distal end position orientation and the angle of rotation βn, may be beforehand prepared. If they are tabulated, the target angle of rotation βn can be instantly determined with the use of the table in the event of a command to alter the distal end orientation. For this reason, a further high speed control of the actuator 53 can be accomplished. Also, where command patterns are before registered so that the operation can take place in the order of registration, the storage area of the table can be saved if the table descriptive of the relations between the distal end position orientation and the angle of rotation βn are registered at the time the patterns are registered as shown in Table 2 below.

TABLE 1

| Bending Angle | Angle of Traverse | | | | | | | |
|---|---|---|---|---|---|---|---|---|
| | 0 | 0.5 | 1.0 | 1.5 | 2.0 | 2.5 | 3.0 | 3.5 |
| 0 | β1 β2 β3 | β1 β2 β3 | β1 β2 β3 | β1 β2 β3 | β1 β2 β3 | β1 β2 β3 | β1 β2 β3 | β1 β2 β3 |
| 0.5 | β1 β2 β3 | β1 β2 β3 | β1 β2 β3 | β1 β2 β3 | β1 β2 β3 | β1 β2 β3 | β1 β2 β3 | β1 β2 β3 |
| 1.0 | β1 β2 β3 | β1 β2 β3 | β1 β2 β3 | β1 β2 β3 | β1 β2 β3 | β1 β2 β3 | β1 β2 β3 | β1 β2 β3 |
| 1.5 | β1 β2 β3 | β1 β2 β3 | β1 β2 β3 | β1 β2 β3 | β1 β2 β3 | β1 β2 β3 | β1 β2 β3 | β1 β2 β3 |
| 2.0 | β1 β2 | β1 β2 | β1 β2 | β1 β2 | β1 β2 | β1 β2 | β1 β2 | β1 β2 |

TABLE 2

| Reg. No. | Bending Angle | Angle of Traverse | β1 | β2 | β3 |
|---|---|---|---|---|---|
| 1 | 0 | 0 | ■■■ | ■■■ | ■■■ |
| 2 | 10 | 0 | ■■■ | ■■■ | ■■■ |
| 3 | 12 | 20 | ■■■ | ■■■ | ■■■ |
| 4 | 3 | 100 | ■■■ | ■■■ | ■■■ |
| 5 | 25 | 50.2 | ■■■ | ■■■ | ■■■ |
| 6 | 1.4 | 19 | ■■■ | ■■■ | ■■■ |
| ⋮ | ⋮ | ⋮ | ⋮ | ⋮ | ⋮ |

Figure 8:
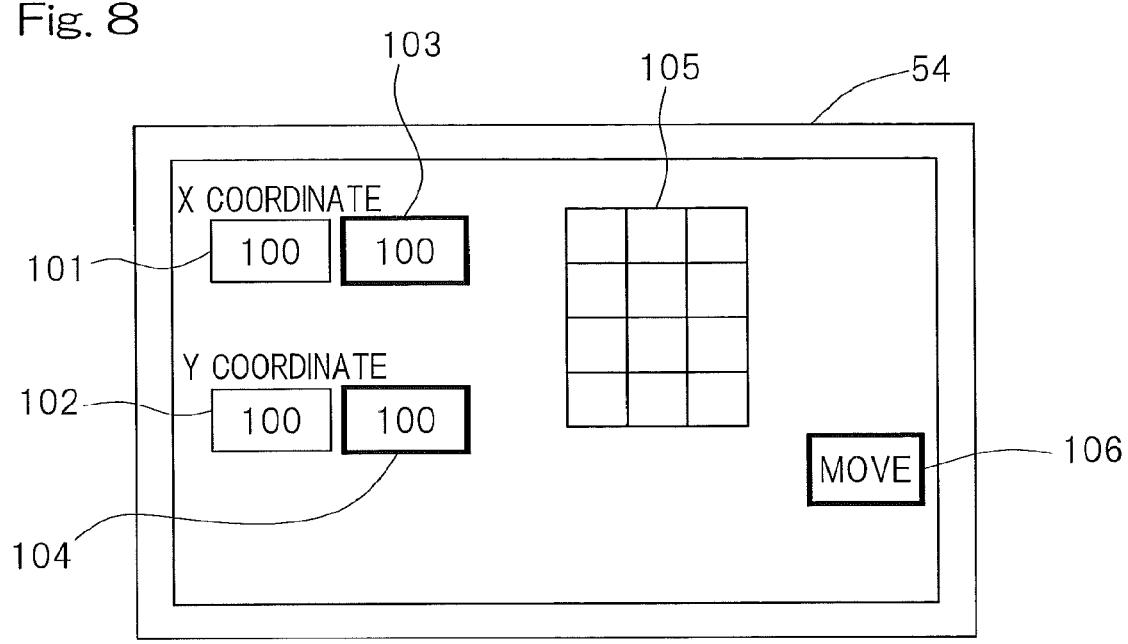
FIG. 8 is a diagram showing one example of an operating unit of the operating device.

FIG. 8 illustrates one example of an operating unit of the operating device 55. This operating unit is of a type that may designate the coordinate position by means of a numerical input. The operating unit includes current value display areas 101 and 102 for displaying respectively the X coordinate value and the Y coordinate value of the current coordinate position, target value display areas 103 and 104 for displaying respectively the target X coordinate value and the target Y coordinate value, numerical input buttons 105 comprised of, for example, ten keys for inputting respectively the target X coordinate value and the target Y coordinate value into the target display areas 103 and 104, and an operation execution button 106. Designation of the coordinate position on the XY orthogonal coordinate system may be accomplished by either a manner of numerical inputting of the absolute coordinate relative to a predetermined reference point (for example, the point of origin O) or a manner of numerical inputting of the difference from the current coordinate position to the target coordinate position.

When using the numerical input buttons 105 the target X coordinate value and the target Y coordinate value are inputted, the respective values thereof are displayed on the target value display areas 103 and 104. Along therewith, based on such parameters as, for example, the inputted X coordinate value and the Y coordinate value, the distance from the distal end side link hub 3 to a working plane of a work (not shown) to be processed, dimensions of various parts of the parallel link mechanism 1 or the like, the bending angle θ and the angle of traverse φ, which are aimed at, are calculated. Also, from this distal end orientation, the amount of operation of each of the actuators 53 is calculated. Upon depression of the operation execution button 106, each of the actuators 53 is driven and the distal end orientation is so changed as to assume the inputted X coordinate value and the inputted Y coordinate value. As described above, since the designation of the target distal end orientation is carried out in terms of the coordinate position on the XY orthogonal coordinate system 100, the link actuation device 51 (best shown in FIG. 1) can be viscerally operated even though the coordinate position of the work to be processed is dealt with in the orthogonal coordinate system.

Figure 9:
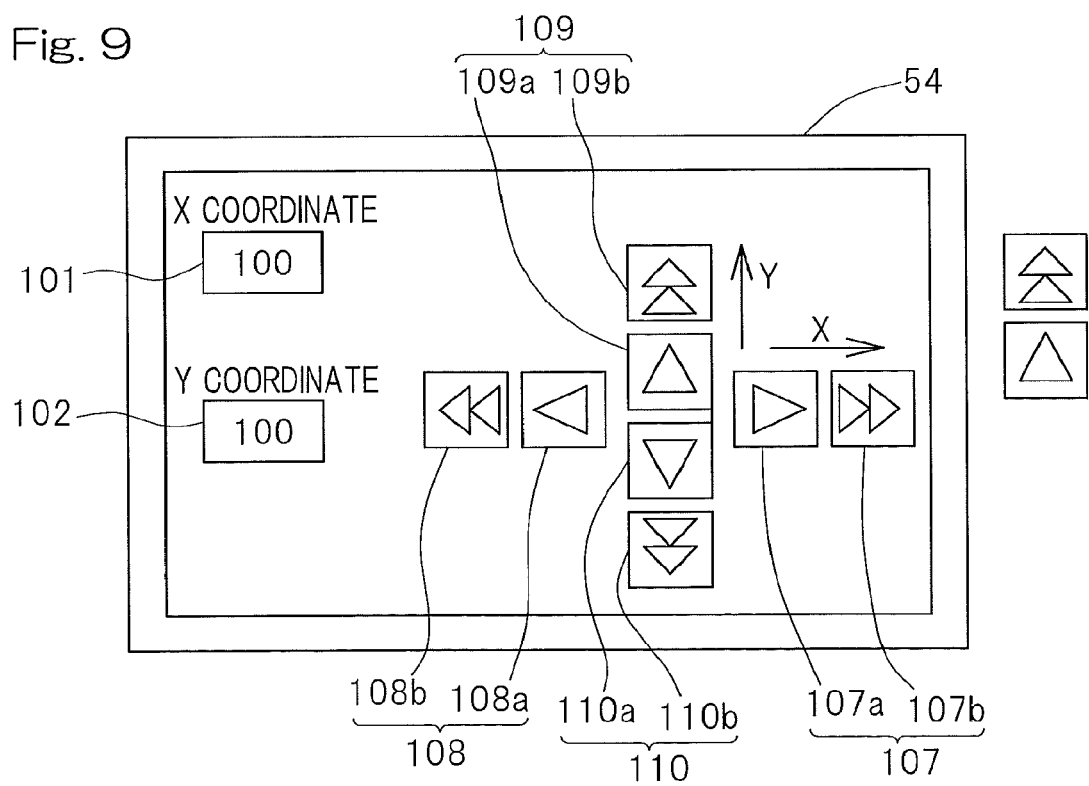
FIG. 9 is a diagram showing a different example of the operating unit of the operating device.

FIG. 9 illustrates another example of the operating unit of the operating device 55. This operating unit is of a type capable of designating the coordinate position by means of the amount of operation. The operating unit of FIG. 9 includes current value display areas 101 and 102 for displaying respectively the X coordinate value and the Y coordinate value of the current coordinate position, and push buttons 107 to 110 for effecting a change of the distal end orientation. When the push button 107 is depressed, the orientation is changed so that the X coordinate value becomes large; when the push button 108 is depressed, the orientation is changed so that the X coordinate value becomes small; when the push button 109 is depressed, the orientation is changed so that the Y coordinate value become large; and when the push button 110 is depressed, the orientation is changed so that the Y coordinate value become small.

The extent to which the orientation is changed varies depending on the length of time, in which the push buttons 107 to 110 are depressed, or the number of time over which the push buttons 107 to 110 are depressed. Also, in this example, the push buttons 107 to 110 are comprised of low speed buttons 107a, 108a, 109a and 110a, with which the change of the orientation takes place at a low speed, and high speed buttons 107b, 108b, 109b and 110b, at which the change of the orientation takes place at a high speed, and the change of the orientation is therefore accomplished in two stages of low speed and high speed.

In the case of this operating device 55, the system is employed in which the X coordinate value and the Y coordinate value are sequentially changed by the manipulation of the push buttons 107 to 110 and, each time it takes place, the bending angle θ and the angle of traverse φ, which are aimed at, are calculated and the amount of operation of the actuator 53 in dependence therewith is determined. In other words, only during the time in which the push buttons 107 to 110 are pressed, the change of the distal end orientation continues to take place. For this reason, the relation between the operation and the coordinate position is sensuously grasped.

The control device 54, which is used in combination with the above described operating device 55, converts information on the distal end orientation, which is given from the orientation designating unit 55c of the operating device 55, into the amount of operation of the actuator 53 according to a predetermined transformation and then controls the actuator 53 by that amount of operation so converted. More specifically, when the distal end orientation represented by the bending angle θ and the angle of traverse φ, both given from the orientation designating unit 55c, are applied, the control device 54 makes use of the previously discussed formula (7) to effect the inverse transformation of the bending angle θ and the angle of traverse φ to thereby determine the angle of rotation βn of each of the proximal side end link members 5. Then, the control device 54 calculates the amount of operation Rn of each of the actuator 53 by calculating the following formula (8) with the use of the angle of rotation βn so determined:

$$Rn = \beta n \times k, \text{ (wherein } n=1,2,3) \quad (8)$$

In this formula (8), the parameter k represents a coefficient that is determined by the gear ratio of a decelerating unit affixed to the actuator 53. When the information on the distal end orientation is thus converted into the amount of operation according to the formula, the control of the actuator 53 can be easily accomplished.

Arrangement may be that the amount of operation of the actuator 53 and the speed of change of the distal end orientation are not made changeable stepwise, but the amount of operation of the actuator per one push of the push buttons 107 to 110 and the speed of change of the distal end orientation may be arbitrarily given. Also, arrangement may be made that not by operating the plurality of push buttons 107 to 110 as is the case with this example, the operation may be done by means of a single operating unit such as, for example, a joystick.

Figure 10:
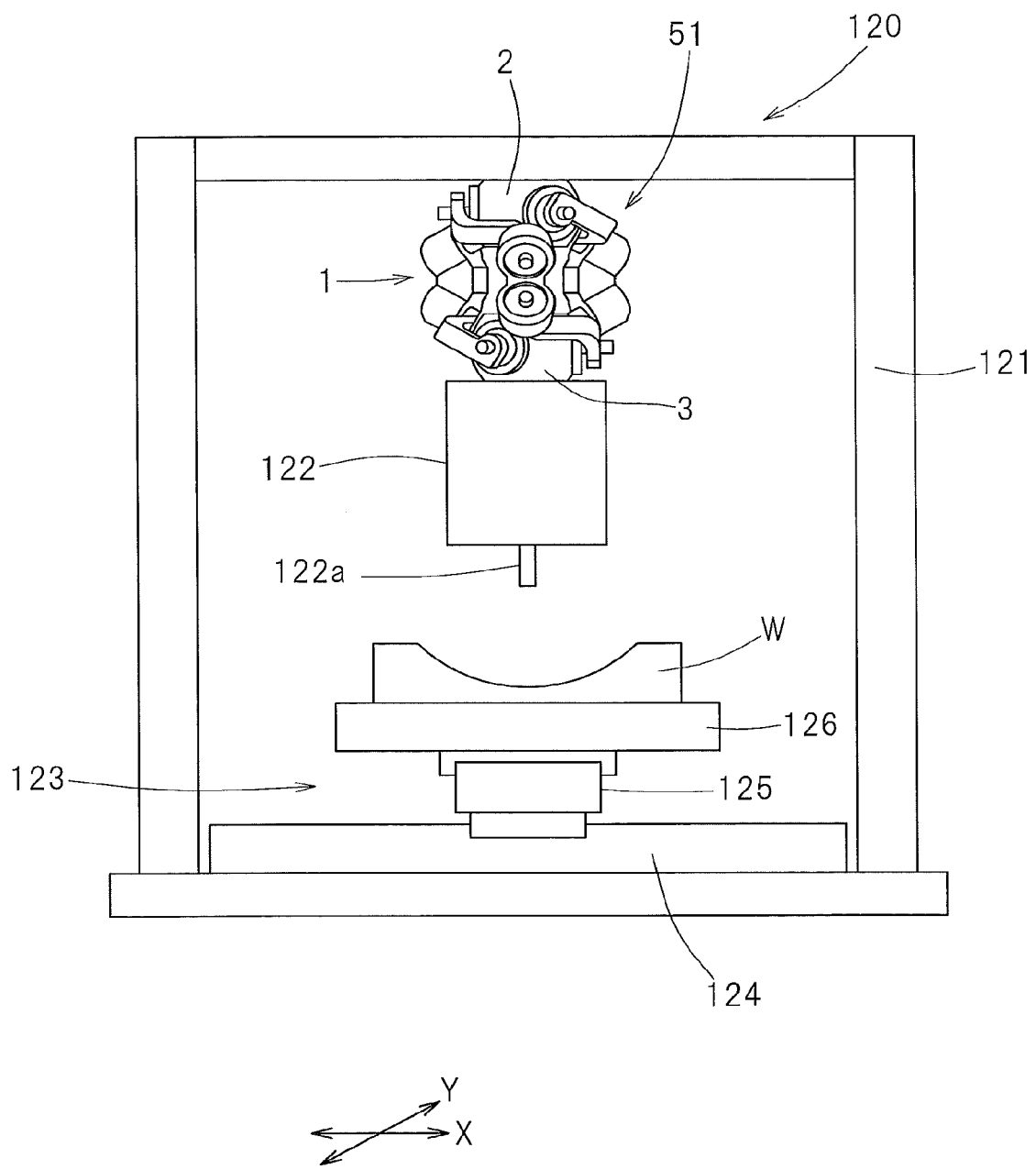
FIG. 10 is a diagram showing a schematic structure of a working device equipped with the link actuation device.

FIG. 10 illustrates a working device 120 equipped with the above described link actuation device 51. This working device 120 is such that the parallel link mechanism 1 is installed in a suspended fashion with the proximal end side link hub 2 fixed to the base member 52 which forms a ceiling area of a work chamber 121 and an end effecter 122 is mounted on the distal end side link hub 3 of the parallel link mechanism 1. The end effecter 122 is, for example, a painting machine.

A moving mechanism 123 for moving the work W to be processed in X and Y axial directions is disposed below the end effecter 122. This moving mechanism 123 includes a long X-axis rail 124 fixed on a floor so as to extend in an X-axis direction, a long Y-axis rail 125 retractable along the X-axis rail 124 and extending in a Y-axis direction, and a work bench 126 retractable along the Y-axis rail 125 and having an upper surface on which the work to be processed is placed. The Y-axis rail 125 and the work bench 126 are driven in the X-axis direction and the Y-axis direction, respectively, by the drives of corresponding drive sources not shown.

Where the end effecter 122 is a painting machine, the work bench 126 is advanced and retracted in the X-axis direction and the Y-axis direction by the moving mechanism 123 to position a portion of the work W to be processed, where a paint is applied, in front of a paint spraying port 122a of the painting machine. Also, with the orientation of the end effecter 122 being changed by changing the distal end orientation of the link actuation device 51, the paint spraying port 122a referred to above is so adjusted as to face that portion of the work W, where the paint is applied.

In the description that follows, the second to twelfth preferred embodiments of the present invention will be described. It is, however, to be noted that in the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments. It is also to be noted that it is possible not only to combine components specifically described in connection with each of the foregoing and following embodiments of the present invention, but also to partially combine two or more of the foregoing and following embodiments of the present invention.

Figure 11:
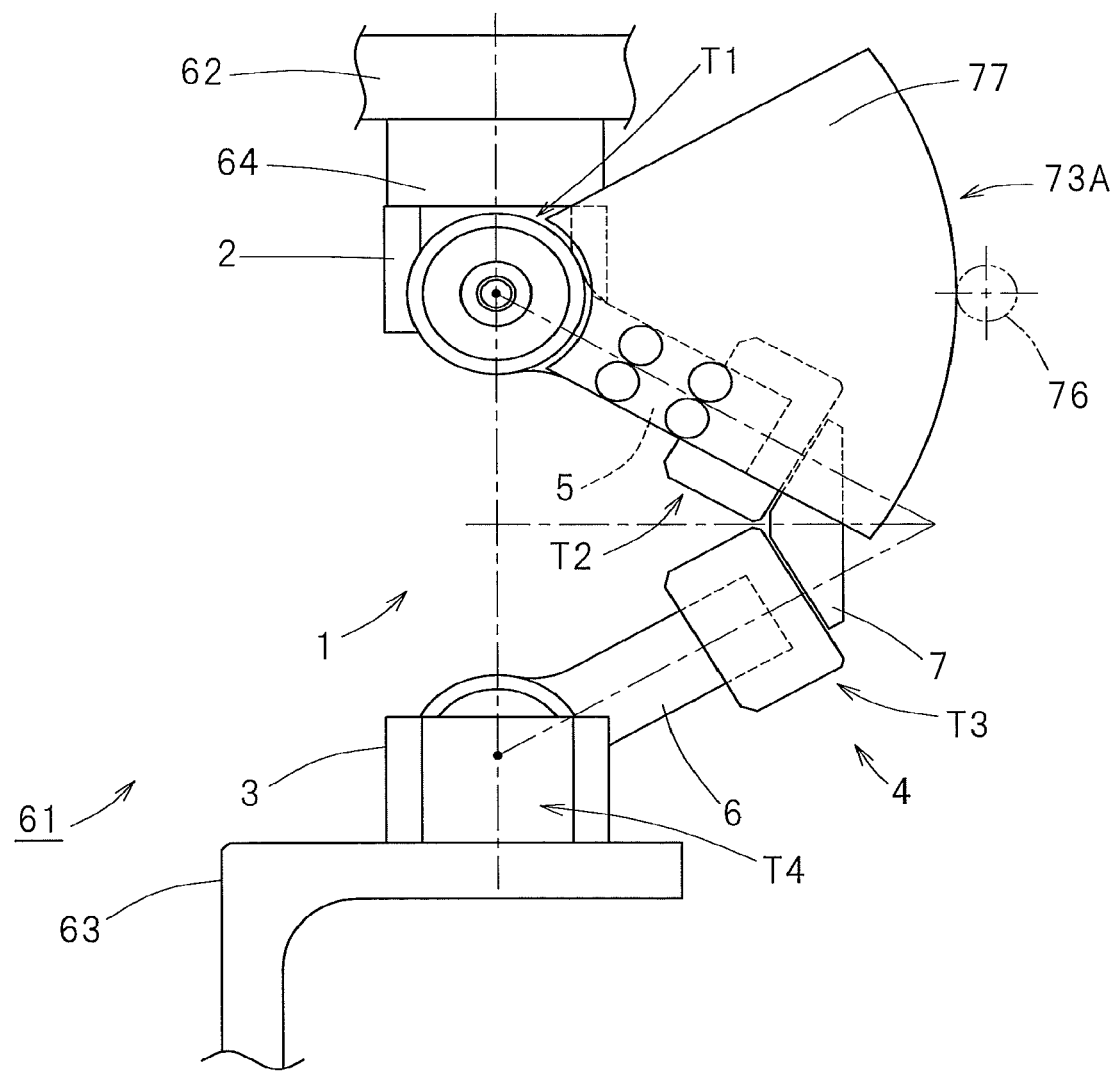
FIG. 11 is a front elevational view showing a second preferred embodiment of the link actuation device equipped with the operating device of the present invention, with a portion thereof omitted.
Figure 12:
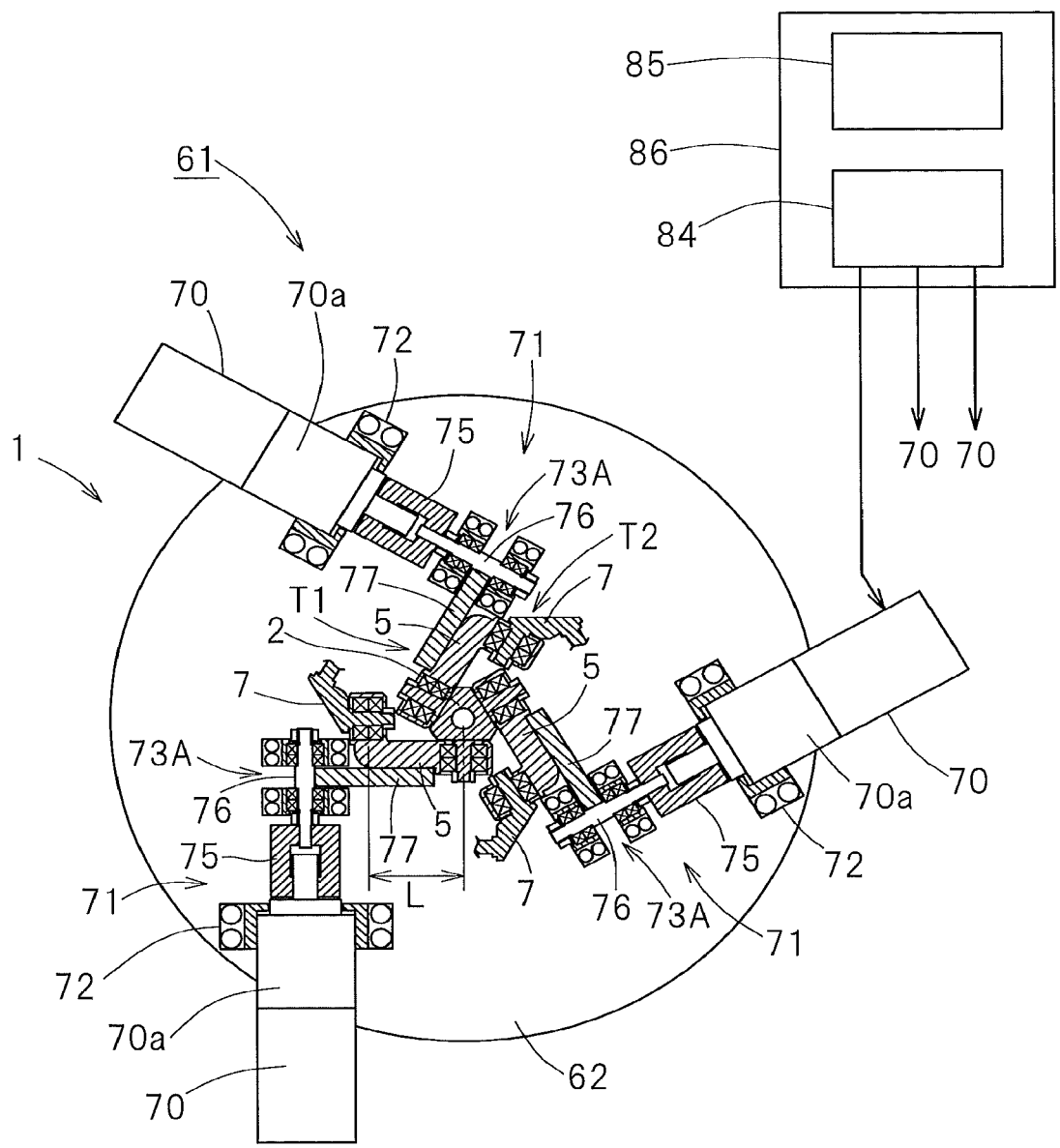
FIG. 12 is a fragmentary sectional view showing the parallel link mechanism of the link actuation device.
Figure 13:
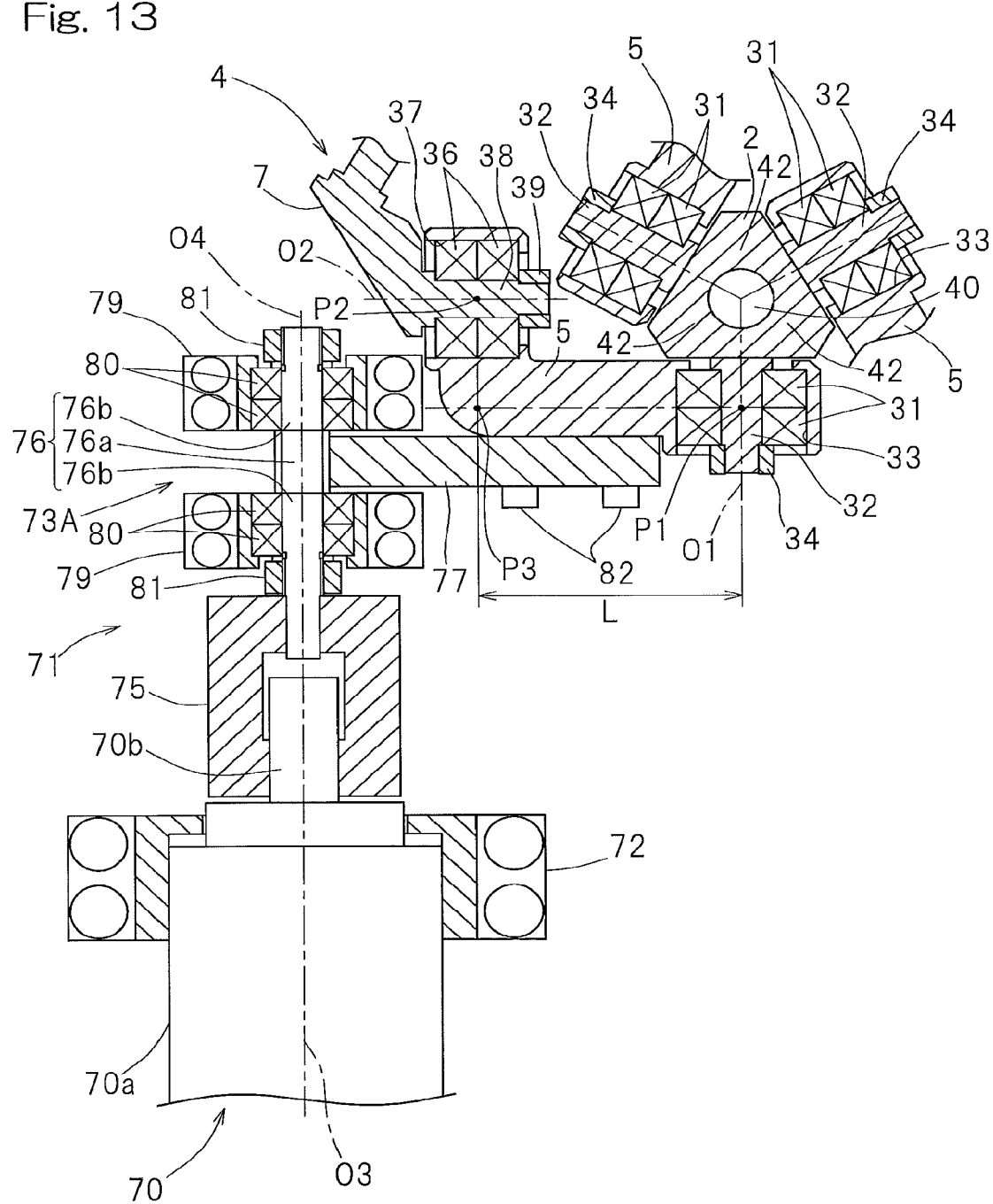
FIG. 13 is a fragmentary enlarged view of FIG. 12.

FIGS. 11 to 13 illustrate showing the link actuation device according to the second preferred embodiment of the present invention. This link actuation device, now identified by 61, has the parallel link mechanism 1 mounted on a base member 62 in a fashion suspended therefrom as shown in FIG. 11. In other words, the parallel link mechanism 1 is such that the proximal end side link hub 2 is fixed to the base member 62 through a proximal end mounting member 64 and the distal end side link hub 3 is mounted on a distal end mounting members 63 to which, for example, various machine tools or the like are fitted.

As shown in FIGS. 12 and 13, the parallel link mechanism 1 includes outer ring rotating type bearings 31 used to rotatably support the end link members 5 and 6 relative to the proximal end side link hub 2 and the distal end side link hub 3. To describe the revolve pairing portion T1 between the proximal end side link hub 2 and the proximal side end link member 5 by way of example, shaft portions 32 are formed at three circumferential locations of the proximal end side link hub 2, inner rings (not shown) of the two bearing 31 are engaged with an outer periphery of those shaft portion 32 and outer rings (not shown) of the bearing 31 are engaged with an inner periphery of a communicating hole 33 that is formed in the proximal side end link member 5. The bearings 31 are in the form of ball bearings such as, for example, deep groove ball bearings or angular contact ball bearing, and are fixed in position with a predetermined amount of preload applied by the fastening of nuts 34. The revolve pairing portion T4 between the distal end side link hub 3 and the distal side end link member 6 is of a structure similar to that described above.

Also, a bearing 36 provided in the revolve pairing portion T2 between the proximal side end link member 5 and the intermediate link member 7 includes an outer ring (not shown) engaged with an inner periphery of a communicating hole 37 formed in a distal end of the proximal side end link member 5 and an inner ring (not shown) engaged with an outer periphery of a shaft portion 38 integral with the intermediate link member 7. The bearing 36 is in the form of a ball bearing such as, for example, a deep groove ball bearing or an angular contact ball bearing and is fixed in position with a predetermined amount of preload applied by the fastening of nuts 39. The revolve pairing portion T3 between the distal end side link hub 6 and the intermediate link member 7 is of a structure similar to that described above.

All of the three sets of the link mechanisms 4 of the parallel link mechanism 1 include an actuator 70 for arbitrarily changing the distal end position orientation by rotating the proximal side end link member 5, and a decelerating mechanism 71 for reducing and transmitting the amount of operation of the actuator 70 to the proximal side end link member 5. The actuator 70 is in the form of a rotary actuator, more specifically, a servomotor with a decelerating unit 70a built therein, and is fixed to the base member 62 by means of a motor fixing member 72. The decelerating mechanism 71 is made up of a decelerating unit 70a for the actuator 70 and a gear type decelerating unit 73A.

The gear type decelerating unit 73A includes a small gear 76, which is connected with an output shaft 70b of the actuator 70 through a coupling 75 in a rotation transmittable fashion, and a large gear 77 fixed to the proximal side end link member 5 and meshed with the small gear 76. In the second embodiment, each of the small gear 76 and the large gear 77 is in the form of a spur gear, and the large gear 77 is a sector shaped gear having teeth formed in a peripheral surface of the sector shape. The large gear 77 has the pitch circle radius that is greater than that of the small gear 76, and the rotation of the output shaft 70b of the actuator 70 is reduced to a rotational axis O1 of the revolve pairing portion T1 between the proximal end side link hub 2 and the proximal side end link member 5 and then transmitted to the proximal side end link member 5. The gear ratio thereof is rendered to be larger than 10.

The pitch circle radius of the large gear 77 is equal to or greater than ½ of the arm length L of the proximal side end link member 5. The arm length L is the distance from an axial center point P1 of the center axis O1 of the revolve pairing portion T1 between the proximal end side link hub 2 and the proximal side end link member 5 to a point P3 in which an axial center point P2 of the center axis O2 of the revolve pairing portion T2 between the proximal side end link member 5 and the intermediate link member 7 is projected on a plane traverses the center axis O1 of the revolve pairing portion T1 between the proximal end side link hub 2 and the proximal side end link member 5 while the projected plane passing through the axial center point P1. In the case of this preferred embodiment now under discussion, the pitch circle radius of the large gear 77 is equal to or greater than the arm length L referred to above. For this reason, it is particularly advantageous in securing a high gear ratio.

The small gear 76 referred to above has a toothed portion 76a meshed with the large gear 77 and shaft portions 76b protruding outwardly from opposite sides of the toothed portion 76a, and those shaft portions 76b are rotatably supported by two bearings 80 provided on a rotation support member 79 that is disposed on the base member 62. The bearings 80 are in the form of ball bearings such as, for example, deep groove ball bearings or angular contact ball bearings. Alternative to the arrangement of the double row ball bearings as is the illustrated example, a roller bearing or a slide bearing may be used. A structure is employed in which a shim (not shown) is provided between the outer rings of the double row bearings 80 and a preload is applied to the bearings 80 by fastening a nut 81 engaged with the shaft portion 76b. The outer ring of the bearing 80 is press-fitted to the rotation support member 79.

In the case of this embodiment, the large gear 77 is a member separate from the proximal side end link member 5 and is detachably fitted to the proximal side end link member 5 by means of a connecting member 82 such as, for example, a bolt or the like. This large gear 77 may, however, be integral with the proximal side end link member 5.

The rotational axis O3 of the actuator 70 and the rotational axis O4 of the small gear 76 coaxially positioned with each other. Those rotational axes O3 and O4 are parallel to the revolve pairing axis O1 between the proximal end side link hub 2 and the proximal side end link member 5 and have the same height from the base member 62.

Even the link actuation device 61 includes a control device 84 for controlling the actuator 70 and an operating device 85 for inputting an operating command to the control device 84, the both being built in a controller 86. The control device 84 and the operating device 85 are of the same structures, respectively, as those employed in the practice of the previously described embodiment and, therefore, functions and effects similar to those afforded by the previously described embodiment can be obtained. The operating device 85 includes, in a manner similar to those employed in the previously described embodiment, the orientation designating unit 55a, the orientation acquiring unit 55b and the orientation information applying unit 55, those being, however, not shown.

The link actuation device 61 referred to above is able to control so as to suppress a backlash of the parallel link mechanism 1 and the decelerating mechanism 71 thanks to the use of the actuator 70 and the decelerating mechanism 71 in the three sets of the link mechanisms 4. As a result, the positioning accuracy of the distal end side link hub 3 can be increased, and also a high rigidity of the link actuating device 61 itself can be realized.

Also, the gear type decelerating unit 73A of the decelerating mechanism 71 includes a combination of the small gear 76 and the large gear 77 and a high gear ratio in excess of 10 or higher can be obtained. If the gear ratio is high, the positioning resolution in an encoder or the like become high. Therefore, the positioning resolution of the distal end side link hub 3 increases, and also, the actuator 70 of a low output can be used. In the embodiment now under discussion, the actuator 70 equipped with the decelerating unit 70a is used, but if the gear ratio of the gear type decelerating unit 70A is high, the actuator 70 having no decelerating unit can come to be used and the actuator 70 can be reduced in size.

Since the pitch circle radius of the large gear 77 is chosen to be equal to or greater than ½ of the arm length L of the proximal side end link member 5, the bending moment of the proximal side end link member 5 brought about by the distal end load can be reduced. For this reason, there is no need to increase the rigidity of the link actuation device 61 in its entirety to a value higher than necessary and the weight of the proximal side end link member 5 can be reduced. By way of example, material for the proximal side end link member 5 can be changed from stainless steel (SUS) to aluminum. Also, since the pitch circle radius of the large gear 77 is relatively large, the surface pressure of a toothed portion of the large gear 77 decreases and the rigidity of the link actuation device 61 in its entirety becomes high. Further, if the pitch circle radius of the large gear 77 is equal to or greater than ½ of the arm length L referred to above, the large gear 77 comes to have a diameter sufficiently greater than the outer diameter of the bearing 31 disposed at the revolve pairing portion T1 between the proximal end side link hub 2 and the proximal side end link member 5. Therefore, since a space is made available between the toothed portion of the large gear 77 and the bearing 31, installation of the large gear 77 is easy to accomplish.

Particularly in the case of this second preferred embodiment, since the pitch circle radius of the large gear 77 is equal to or greater than the arm length L as discussed above, the pitch circle radius of the large gear 7 becomes further large and the functions and effects both described hereinbefore appear further conspicuously. In addition, it is possible to install the small gear 76 on an outer diametric side of the link mechanism 4. As a result thereof, the space for installation of the small gear 76 can be easily secured and the degree of freedom of designing can be increased. Also, the interference between the small gear 76 and other members will hardly occur and the range of movement of the link actuation device 61 expands accordingly.

Since each of the small gear 76 and the large gear 77 is a spur gear, manufacture is easy to achieve and the transmission efficiency of the rotation is high. Since the small gear 76 is supported by the bearing 80 at each of the axial opposite sides, the support rigidity of the small gear 76 is high. In view of this, the angle retention rigidity of the proximal side end link member 5 brought about by the distal end load is rendered to be high, which leads to the increase of the rigidity of and the positioning accuracy of the link actuation device 61. Also, since the rotational axis O3 of the actuator 70, the rotational axis O4 of the small gear 76, and the center axis O1 of the revolve pairing portion T1 between the proximal end side link hub 2 and the proximal side end link member 5 lie on the same plane, the overall balance is good and the assemblability is also good.

Since the large gear 77 is detachable relative to the proximal side end link member 5, change of the specification such as, for example, the gear ratio of the gear type decelerating unit 73A and the range of movement of the distal end side link hub 3 relative to the proximal end side link hub 2 is rendered to be easy, and therefore, the mass productivity of the link actuation device 61 increases. In other words, merely by changing the large gear 77, the same link actuation device 61 can be used in various applications, and accordingly, the maintenance is also good. For example, in the event of any trouble occurring in the gear type decelerating unit 73A, such trouble can be eliminated merely by replacing the decelerating unit 73A.

The link actuation device according to the third preferred embodiment of the present invention will now be described with particular reference to FIG. 14 and also to FIGS. 2 to 6 which are also used in describing the first embodiment. It is, however, to be noted that in the description that follows, component parts similar to those shown and described in connection with the first embodiment are shown by like reference numerals and, therefore, the details thereof are not reiterated for the sake of brevity, noting that only the difference between the first and third embodiments is described. The third embodiment differs from the previously described first embodiment, particularly that shown in FIG. 1, lies in that the link actuation device 51 shown in FIG. 14 makes use of a lubricant recovery member 200 for receiving lubricant falling dropwise from the parallel link mechanism 1 and the decelerating unit 73.

The lubricant recovery member 200 is a dish-like member having a plate shaped portion 201 and a projecting portion 202 protruding from an outer peripheral edge of the plate shaped portion 201 in one direction intersecting a surface of the plate shaped portion 201. The lubricant recovery member 200 is installed with a center area of the plate shaped portion 201 fixed to a distal end surface of the distal end side link hub 3 so that the projecting portion 202 may protrude towards the proximal end side link hub 2. The fixture of the plate shaped portion 201 to the distal end side link hub 3 is carried out with the use of, for example, a bolt (not shown). The lubricant recovery member 200 is simple in structure, and therefore, it can inexpensively be produced. Since this lubricant recovery member 200 may be satisfactorily provided only at a lower position of the parallel link mechanism 1 and the decelerating unit 73 and does not cover the entirety of the parallel link mechanism 1, it is compact.

Figure 14:
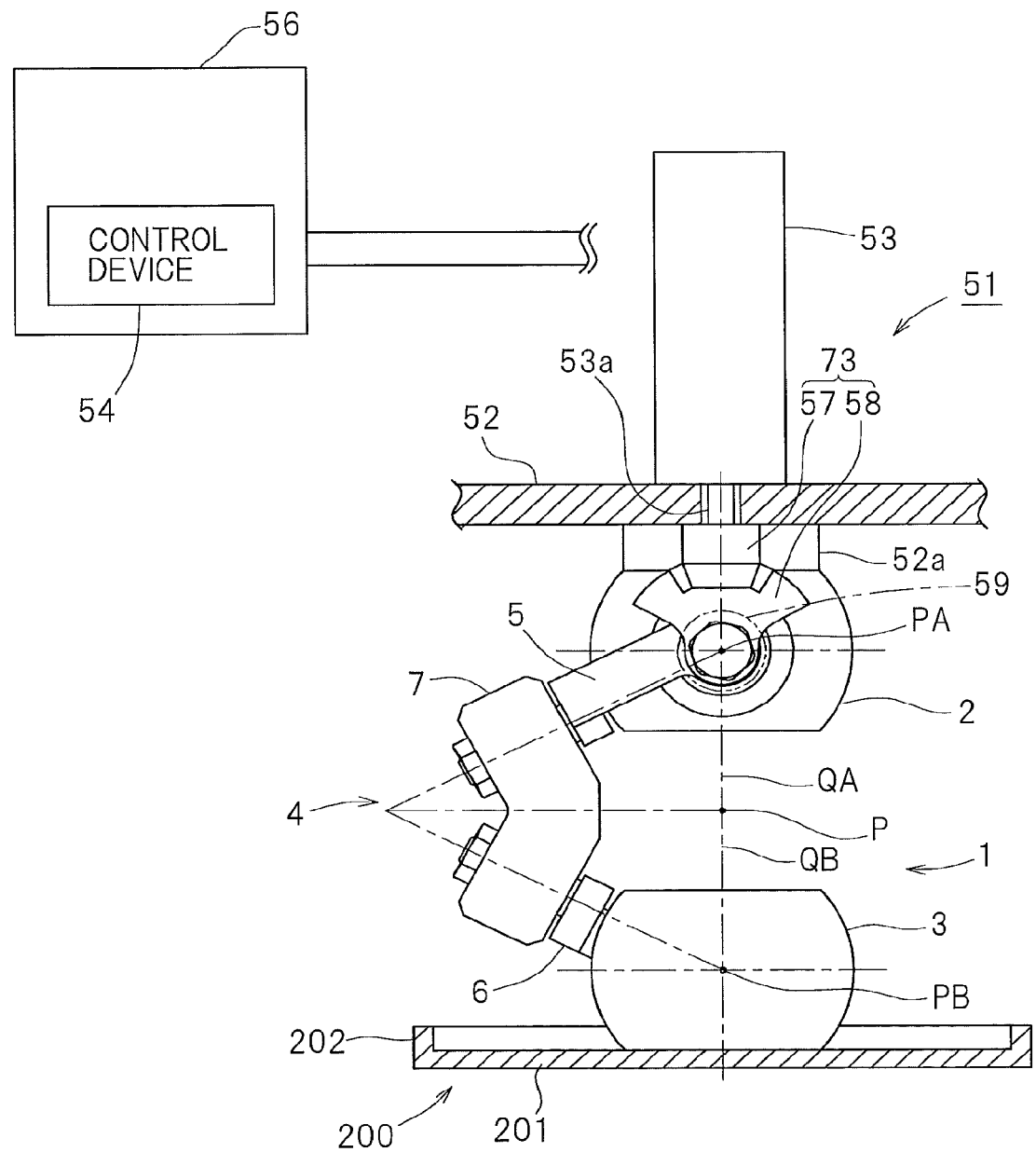
FIG. 14 is a front elevational view showing the link actuation device according to a third preferred embodiment of the present invention, with a portion of such link actuation device being omitted.

Since the lubricant recovery member 200 is used, even when the parallel link mechanism 1 is installed so as to face downwards so that the distal end side link hub 3 may be positioned downwardly relative to the proximal end side link hub 2 as shown in FIG. 14, a lubricant leaking from the bearings 12 and 19 of the parallel link mechanism 1 and/or the bevel gears 57 and 58 of the decelerating unit 73 and then falling downwardly along the parallel link mechanism 1 or falling directly downwardly from a gear portion and/or a bearing portion can be received by the lubricant recovery member 200. Since the lubricant recovery member 200 is so shaped as to represent a dish having the projecting portion 202 protruding from the outer peripheral edge of the plate shaped portion 201, even though the lubricant recovery member 200 tilts as a result of the change in orientation of the distal end side link hub 3, the lubricant so recovered does in no way fall over the outer peripheral edge of the plate shaped member 201. For this reason, there is no possibility that the lubricant may fall onto the work to be processed (not shown) which is positioned therebelow.

In other words, when the lubricant recovery member 200 is used, the leak of the lubricant from the bearings 12 and 19 and/or the bevel gears 57 and 58 if in a little quantity can be permitted, and therefore, sealing structures for the bearings 12 and 19 and/or the bevel gears 57 and 58 can be simplified. Thereby, the mechanism can be compactized by reducing respective dimensions of the bearings 12 and 19, and as a result, the high speed positioning of the parallel link mechanism 1 is made possible. Also, since the lubricant for the bearings 12 and 19 and/or the bevel gears 57 and 58 can be easily replaced, the maintenance is excellent, and in addition, it leads to the cost reduction.

In the case of the above described third embodiment, since the use is made of the lubricant recovery member 200 in the distal end side link hub 3 and the lubricant recovery member 200 moves in response to the change in orientation of the distal end side link hub 3, in the event that the bending angle θ (best shown in FIG. 4) of the parallel link mechanism 1 is large, it may occur that the lubricant recovery member 200 will not come to a position immediately below a portion of the bevel gears 57 and 58 and/or the bearings 12 and 19 and will not receive the lubricant falling downwardly from the bevel gears 57 and 58 and/or the bearings 12 and 19 accordingly. Therefore, the construction according to the third embodiment is particularly effectively used where the bending angle of the parallel link mechanism 1 is smaller than ±45°.

Figure 15:
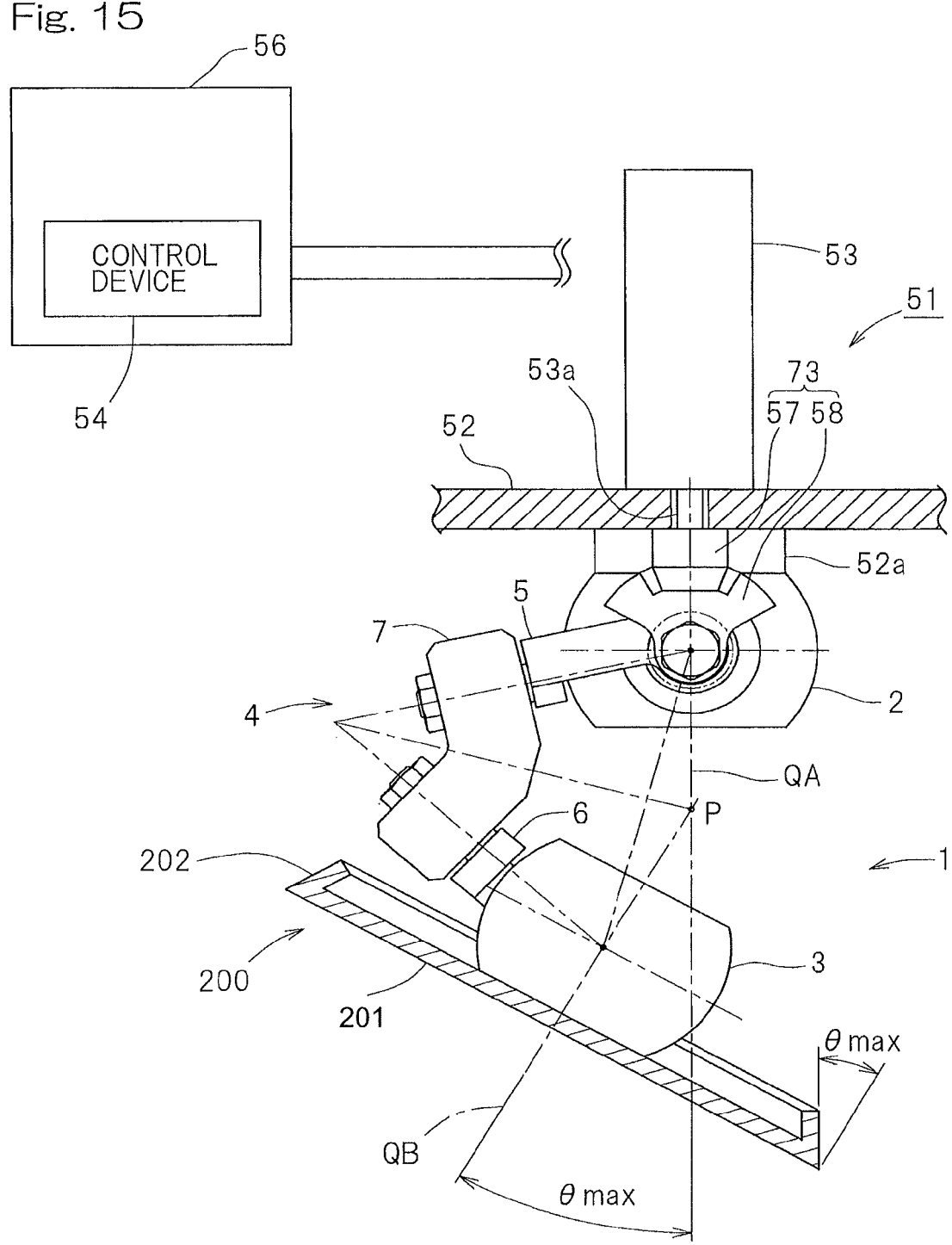
FIG. 15 is a front elevational view showing the link actuation device according to a fourth preferred embodiment of the present invention, with a portion of such link actuation device being omitted.

If, as is the case with the link actuation device 51 according to the fourth preferred embodiment as shown in FIG. 15, the projecting portion 202 of the lubricant recovery member 200 is so shaped as to be inclined towards the center axis OB of the distal end side link hub 3, even when the distal end side link hub 3 is tilted considerably, fall of the lubricant out of the lubricant recovery member 200 can be prevented. In such case, the angle of inclination of the projecting portion 202 of the lubricant recovery member 200 is preferably so chosen as to be equal to or greater than the maximum value (the maximum bending angle) θmax within the operating range of the parallel link mechanism 1. If the angle of inclination of the projecting portion 202 is so defined as described above, the projecting end of the projecting portion 202 is at all times inclined towards the center, and therefore, it is possible to assuredly prevent the fall of the lubricant over and downwardly of the projecting portion 202.

Figure 16:
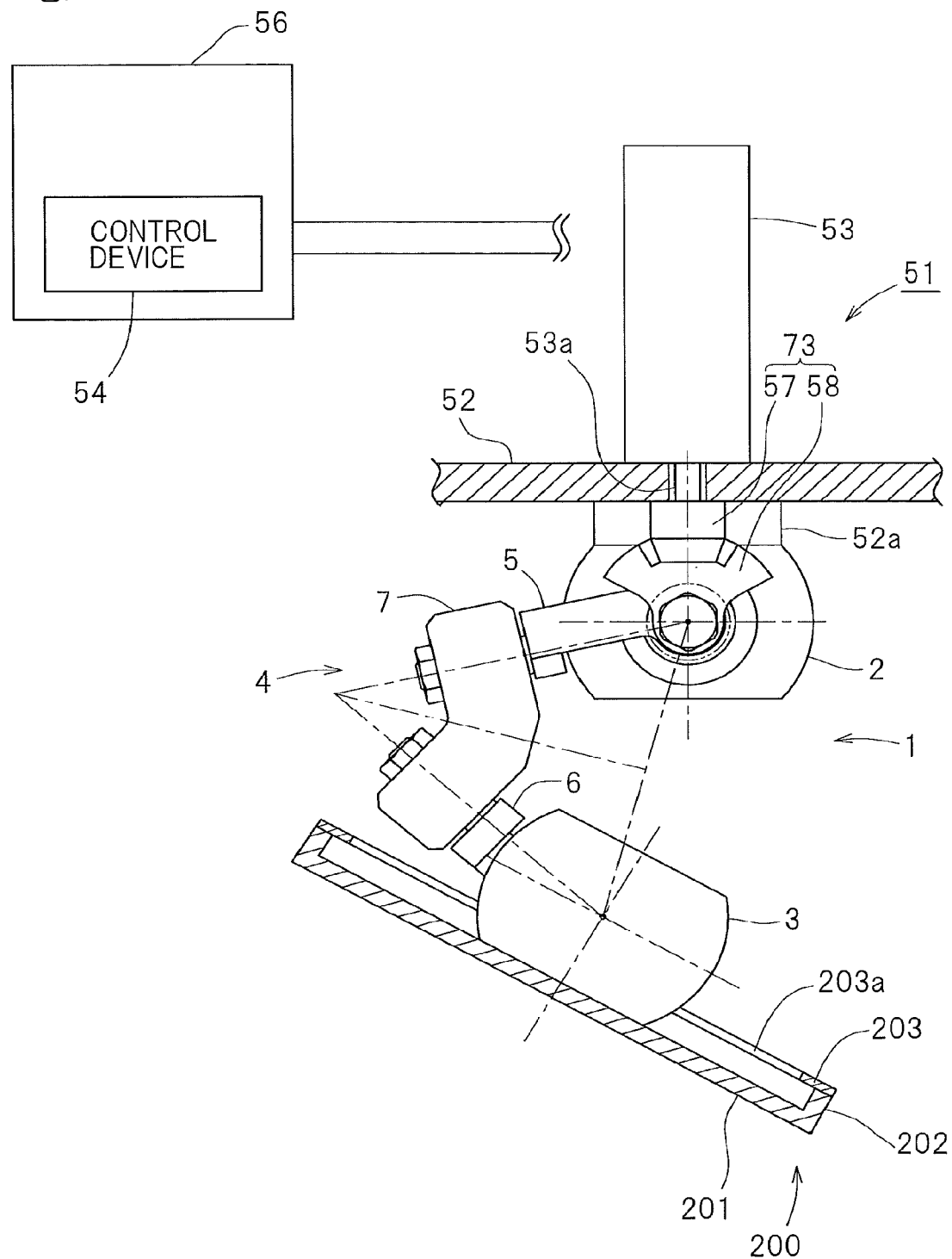
FIG. 16 is a front elevational view showing the link actuation device according to a fifth preferred embodiment of the present invention, with a portion of such link actuation device being omitted.

Also, as is the case with the link actuation device 51 according to the fifth preferred embodiment shown in FIG. 16, the lubricant recovery member 200 may be so designed as to have an upper plate 203 coupled with a projecting end of the projecting portion 202 and lying parallel to the plate shaped portion 201. The upper plate 203 is provided with a throughhole 203a. If the lubricant recovery member 200 has the upper plate 203 such as described above, even when the distal end side link hub 3 of the parallel link mechanism 1 is tilted 90° (the maximum bending angle), the upper plate 203 is oriented in a vertical direction with respect to the ground surface. Therefore, even though a substantial amount of lubricant is pooled within the lubricant recovery member 200, it is possible to assuredly prevent the fall of the lubricant over from the lubricant recovery member 200.

Figure 17:
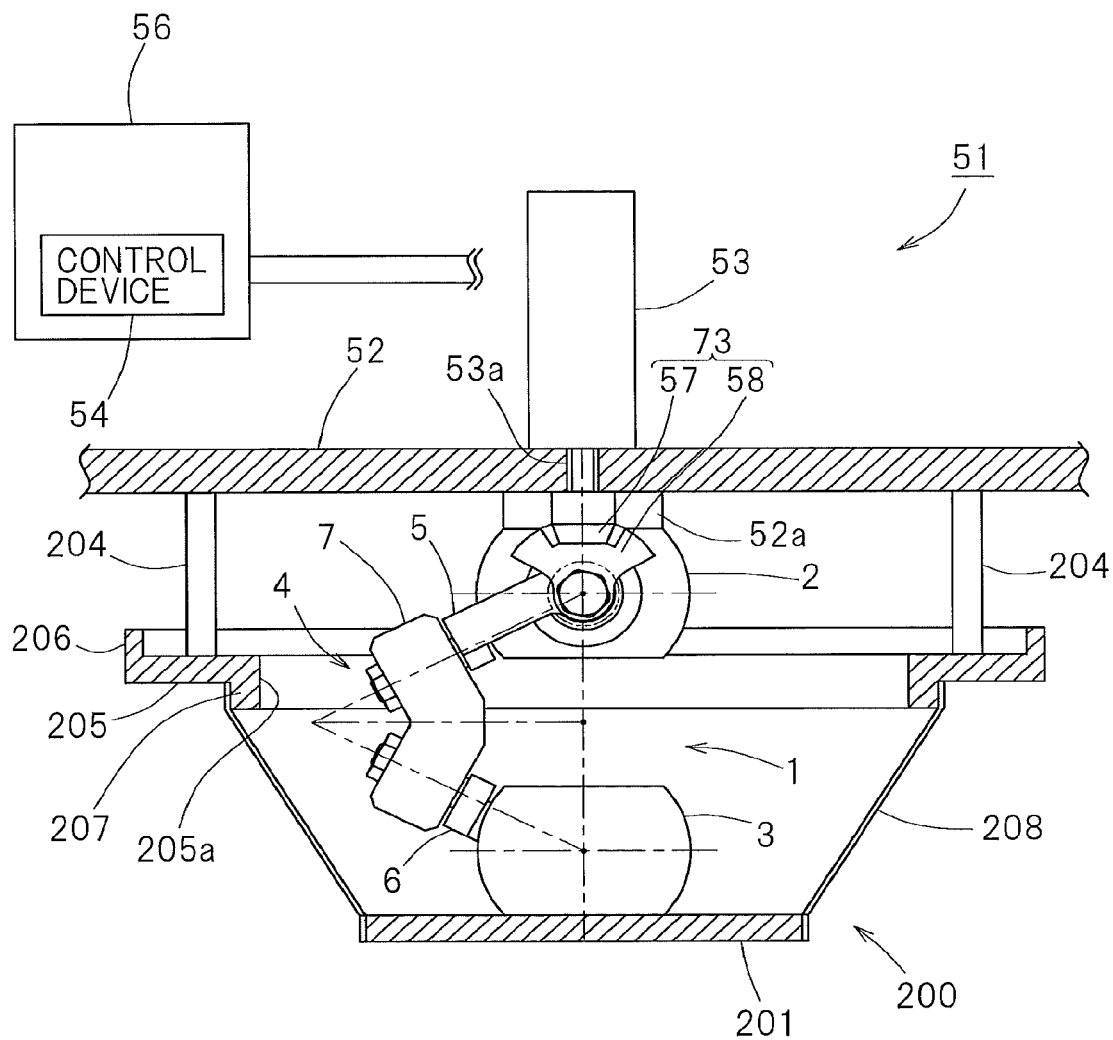
FIG. 17 is a front elevational view showing the link actuation device according to a sixth preferred embodiment of the present invention, with a portion of such link actuation device being omitted.

FIG. 17 illustrates the sixth preferred embodiment of the present invention. This link actuation device 51 includes a ring shaped fixing member 205 supported by the base member 52 through pillars 204 and lying parallel to the base member 52. The fixing member 205 is formed with a throughhole 205a. The fixing member 205 has its outer peripheral end formed with a projecting portion 206 projecting towards the base member 52 and the inner peripheral end is formed with an inner peripheral upright edge portion 207 so as to protrude in a direction counter to the base member 52. The lubricant recovery member 200 includes a plate shaped portion 201, fixed to the distal end side link hub 3, and a stretchable connecting portion 208 which covers the entire periphery between the plate shaped portion 201 and the fixing member 205. More specifically, the connecting portion 208 is made of a sheet shaped elastic material and is so installed with its opposite ends mounted on an outer peripheral surface of the plate shaped portion 201 and an outer peripheral surface of the inner peripheral upright edge portion 207 of the fixing member 205. It is recommended to fix the connecting portion 208 to the outer peripheral surface of the plate shaped portion 201 and the outer peripheral surface of the inner peripheral upright edge portion 207 of the fixing member 205 with the use of respective fixing bands.

According to the above described construction in accordance with the sixth embodiment, since a portion on one side of the fixing member 205 in the parallel link member 1 adjacent the distal end side is extensively covered by the lubricant recovery member 200, the lubricant then scattered from the parallel link mechanism 1 and the decelerating unit 73 during the operation can be received by the lubricant recovery member 200. Since the projection 206 is provided in an outer peripheral end on the fixing member 205, even though the lubricant falls onto the fixing member 205, such lubricant will not fall outside the fixing member 205 and, therefore, the possibility of the work to be processed being wetted with the lubricant can be avoided. Since the connecting portion 208 is stretchable, even though the orientation of the distal end side link hub 3 relative to the proximal end side link hub 2 changes, the connecting portion 208 of the lubricant recovery member 200 can deform in response to the change of the orientation.

Figure 18:
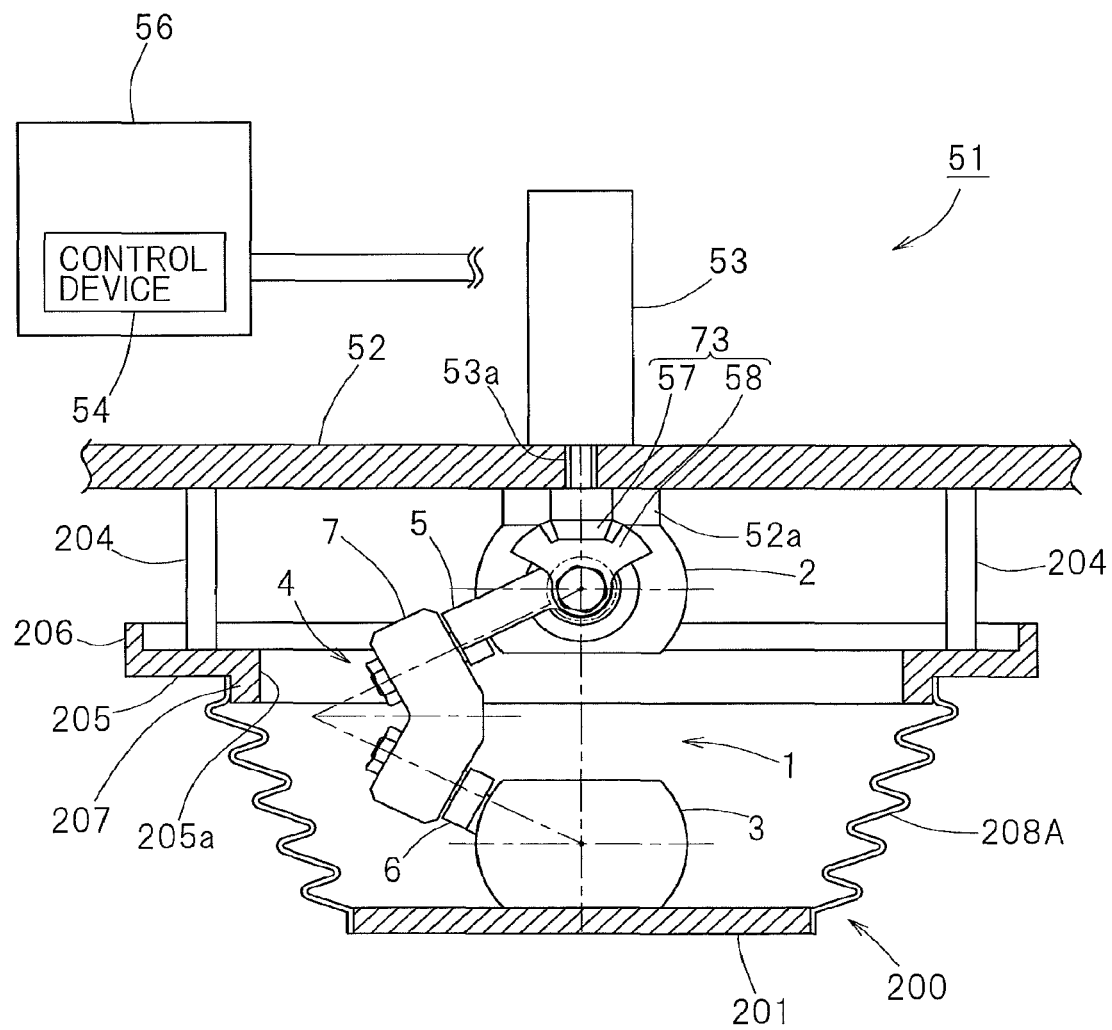
FIG. 18 is a front elevational view showing the link actuation device according to a seventh preferred embodiment of the present invention, with a portion of such link actuation device being omitted.

As is the case with the seventh embodiment of the present invention as shown in FIG. 18, the connecting portion 208A of the lubricant recovery member 200 may be of a shape similar to the shape of a bellows covering the entire periphery between the plate shaped portion 201 and the fixing member 205. In such case, the connecting portion 208A is fitted to the plate shaped portion 201 and the fixing member 205 while in a condition compressed to an extent smaller than the natural state in which no external force acts. Even in this case, in a manner similar to the described above sixth embodiment, even though the orientation of the distal end side link hub 3 relative to the proximal end side link hub 2 changes, the connecting portion 208A of the lubricant recovery member 200 can deform in response to the change of the orientation.

Figure 19:
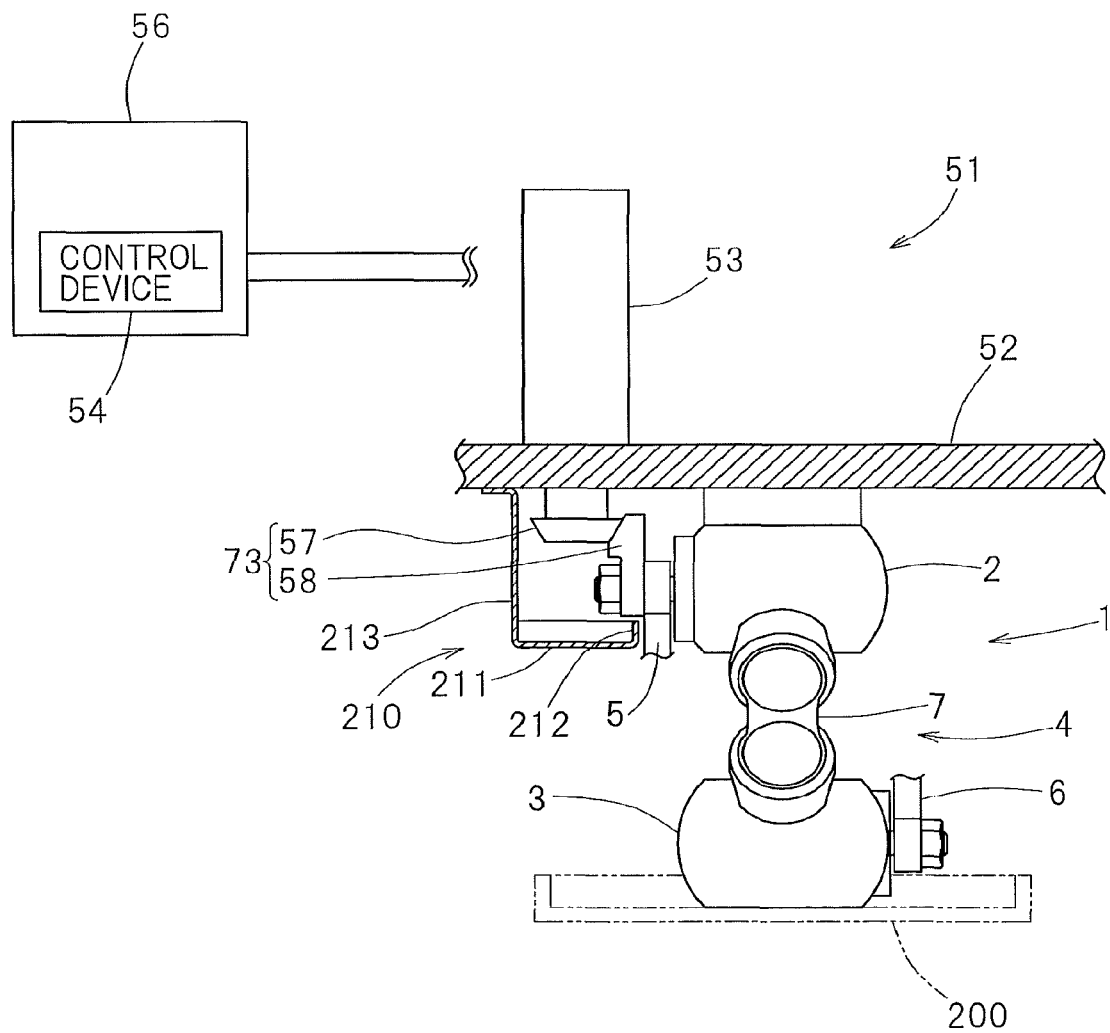
FIG. 19 is a front elevational view showing the link actuation device according to an eighth preferred embodiment of the present invention, with a portion of such link actuation device being omitted.

FIG. 19 illustrates the eighth preferred embodiment of the present invention. The link actuation device 51 of the eighth embodiment includes a lubricant recovery member 210 for receiving the lubricant falling downwardly from the bevel gears 57 and 58 of the decelerating unit 73. The lubricant recovery member 210 is of a dish-like member having a plate shaped portion 211, positioned immediately below the decelerating unit 73, and a projecting portion 212 protruding from an outer peripheral edge of the plate shaped portion 211 towards the base member 52. The lubricant recovery member 210 is fitted to the base member 52 by means of a bolt (not shown) through a mounting portion 213 linked with a portion of the projecting portion 212. This lubricant recovery member 210 is prepared from, for example, sheet metal.

The use of the lubricant recovery member 210 of such a structure as hereinabove described is effective to avoid the possibility that the lubricant falling from the decelerating unit 73 will fall onto the work to be processed. It is, however, to be noted that it is not possible to avoid the falling of the lubricant, falling from the parallel link mechanism 1, from falling onto the work to be processed. For this reason, as shown by the double dotted lines, it is desirable to concurrently use the lubricant recovery member 200 of the structure shown in any one of FIGS. 14, 15 and 16. Alternatively, the bearings 12 and 19 may be employed in the form of seal equipped bearings or of a structure in which a bearing mounting portion is provided with a sealing function.

Figure 20:
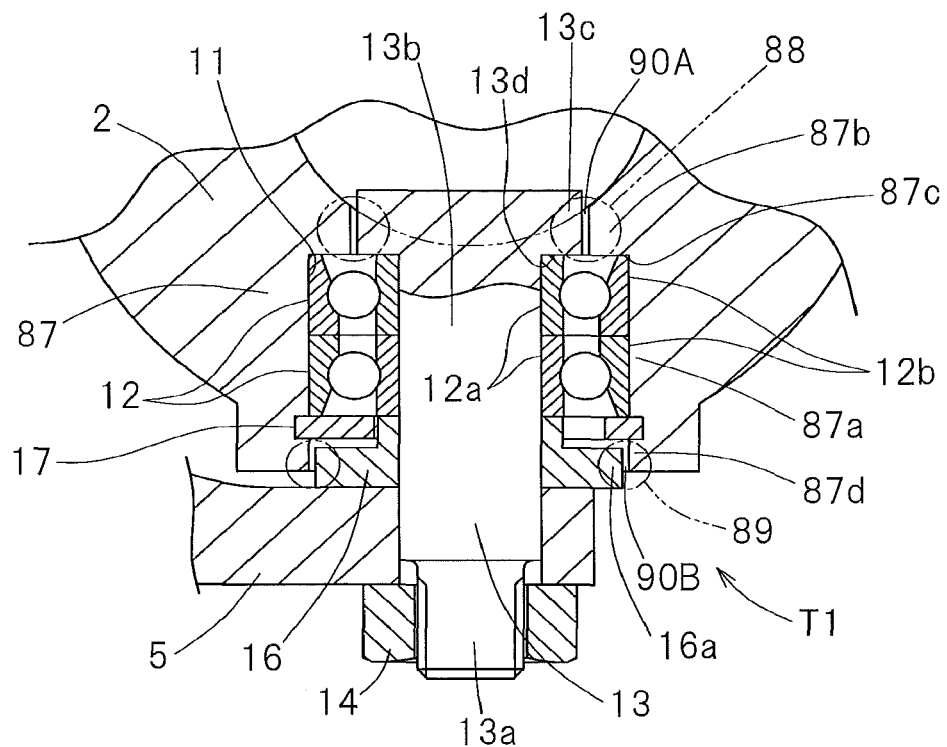
FIG. 20 is a sectional view showing a revolve pairing between a proximal end side link hub and a proximal side end link member.

One example of the structure of the bearing mounting portion provided with the sealing function will now be described. FIG. 20 illustrates the revolve pairing portion T1 between the proximal end side link hub 2 and the proximal side end link member 5. The two bearings 12 are employed in the form of angular contact ball bearings, which are disposed in, for example, back-to-back relation to each other. An inner end portion of the shaft member 13 is provided with a stepped portion 13c having an outer diameter greater than that of a portion 13b that is engaged with an inner periphery of an inner ring 12a of the bearing 12. With a stepped face 13d of this stepped portion 13c held in contact with an end face of the inner ring 12a of the inner bearing 12, the inner ring 12a is axially positioned. Also, between the inner ring 12a of the outer bearing 12 and the proximal side end link member 5, a spacer 16 is disposed with opposite end faces of the spacer 16 held in contact with the inner ring 12a and the proximal side end link member 5, respectively. Accordingly, with the nut 14 fastened, the inner ring 12a is urged against the stepped face 13d through the proximal end side link member 5 and the spacer 16 to thereby firmly fasten the inner ring 12a and also to apply the preload to the bearing 12.

A portion of the proximal end side link hub 2 adjacent the communicating hole 11 is rendered to be an annular inner face defining portion 87. In the example as shown, although the annular inner face defining portion 87 is a part of the proximal end side link hub 2, the annular inner face defining portion 87 may be a member separate from the proximal end side link hub 2. Also, in the example as shown, although the shaft member 13, which is a shaft portion, is a member separate from the proximal side end link member 5, the shaft portion may be provided integrally with the proximal side end link member 5.

The annular inner face defining portion 87 is provided with a stepped portion 87b having an inner diameter smaller than a portion of the annular inner face defining portion 87 engaged with an outer periphery of the outer ring 12b of the bearing 12, that is, an outer ring engaging portion 87a. With a stepped face 87c of this stepped portion 87b held in contact with an end face of the outer ring 12b of the bearing 12, the outer ring 12b is axially positioned. Also, the outer ring 12b of the outer bearing 12 is non-detachably retained by a stop ring 17 provided in the annular inner face defining portion 87.

An outer peripheral surface of the stepped portion 13c of the shaft member 13 and an inner peripheral surface of the stepped portion 87b of the annular inner face defining portion 87 confront each other in a non-contact fashion through a slight gap 90A intervening therebetween. Accordingly, while the stepped portion 13c of the shaft member 13 and the stepped portion 87b of the annular inner face defining portion 87 are mutually rotatable, a sealing structure 88 for regulating the flow of the lubricant or the like between the interior and the outside of the bearing 12 is constructed. In other words, with the gap 90A so formed as to be narrow, leakage of the lubricant within the bearing 12 to the outside and ingress of foreign matter from the outside into the interior of the bearing 12 are both prevented. The narrower the gap 90A, the higher the sealing effect.

A portion of the spacer 16 on the side of the proximal side end link member 5 is formed with a collar shaped portion 16a extending towards an outer diametric side while detouring the stop ring 17. An outer peripheral surface of this collar shaped portion 16a and an outer end portion 87b, which is a part of the annular inner face defining portion 87, confront each other in a non-contact fashion with a slight gap 90B intervening therebetween. Accordingly, the collar shaped portion 16a of the spacer 16 and the outer end portion 87d of the annular inner face defining portion 87 are mutually rotatable, and the sealing structure 89 is thus constructed in a manner similar to that described hereinbefore. The narrower the gap 90B, the higher the sealing effect.

As described above, in the revolve pairing portion T1 (T4) between the proximal end side link hub 2 (distal end side link hub 3) and the proximal side end link member 5 (distal side end link member 6), the sealing structure 88 is formed on one axial side of the bearing 12 by the shaft member 13, which is provided in the proximal side end link member 5 (distal side end link member 6) that is one revolve pairing forming member of the revolve pairing portion T1 (T4), and the annular inner face defining portion 87, which is provided in the proximal end side link hub 2 (distal end side link hub 3) that is the other revolve pair forming member, and additionally the sealing structure 89 is formed on the other axial side by the spacer 16, engaged with the outer periphery of the shaft member 13, and the annular inner face defining portion 87.

The proximal end side link hub 2 (distal end side link hub 3) and the proximal side end link member 5 (distal side end link member 6) are respective parts of the parallel link mechanism 1. Also, the spacer 16 is arranged generally between the inner ring 12a and the nut 14 so that, when the inner ring 12a of the bearing 12 is fixedly fastened by the nut 14, the spacer 16 may impose a uniform load on the inner ring 12a. As discussed above, with the sealing structures 88 and 89 formed with only the essentially indispensable components, there is no longer necessary to use any seal formed by separate members, and therefore, the widthwise dimension of the bearing 12 can be suppressed. For this reason, no interference between the components of the link mechanism 4 will occur and the operating range expands. Also, since the dimension in the vicinity of the bearing 12 is reduced, the lightweight and compactization of the parallel link mechanism 1 in its entirety can be realized.

Due to the problem associated with, for example, assemblability, it is difficult to form the seal structure at opposite ends of the bearing 12 only with the shaft member 13 and the annular inner face defining portion 87. Therefore, concurrent use with the sealing structure formed with the spacer 16 and the annular inner face defining portion 87 makes it possible to easily form the sealing structures 88 and 89 at the opposite ends of the bearing 12.

More specifically, the seal structure 88 is composed of the gap 90A between the outer peripheral surface of the stepped portion 13c, which is a part of the shaft member 13, and the inner peripheral surface of the stepped portion 87b which is a part of the annular inner face defining portion 87. The stepped portion 13c of the shaft member 13 is utilized for positioning of the inner ring 12a and, on the other hand, the stepped portion 87b of the annular inner face defining portion 87 is utilized for positioning of the outer ring 12b. Since the stepped portions 13c and 87b are spaced a small distance from each other, the sealing structure 88 composed of the gap 90A can be easily constructed with no separate member being installed.

Also, the sealing structure 89 is constructed by the gap 90B between the outer peripheral surface of the collar shaped portion 16a, which is a part of the spacer 16, and the inner peripheral surface of the outer end portion 87d which is a part of the annular inner face defining portion 87. The spacer 16 is utilized for fastening fixture for the inner ring 12a and, on the other hand, the outer end portion 87d of the annular inner face defining portion 87 is utilized for retention of the stop ring 17. When the spacer 16 is provided with the collar shaped portion 16a and the distance between the outer peripheral surface of the collar shaped portion 16a and the inner peripheral surface of the outer end portion 87d of the annular inner face defining portion 87 is made small, the sealing structure 89 composed of the gap 90B can be easily constructed with no separate member being installed.

Figure 21:
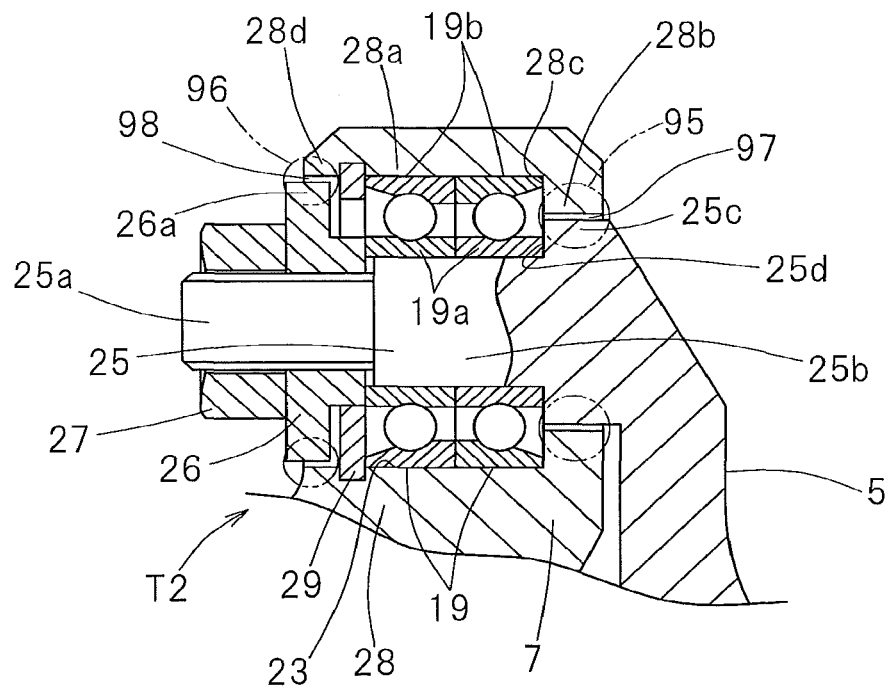
FIG. 21 is a sectional view showing a revolve pairing between the proximal side end link member and an intermediate link member.

FIG. 21 illustrates the revolve pairing portion T2 between the proximal side end link member 5 and the intermediate link member 7. The previously described two bearings 19 are in the form of angular contact ball bearings that are arranged in, for example, back to back relation to each other. A proximal end portion of the shaft portion 25 is provided with a stepped portion 25c having an outer diameter greater than a portion 25b of the shaft portion 25 which is engaged with the inner periphery of an inner ring 19a of the bearing 19. With a stepped face 25d of the stepped portion 25c held in contact with an end face of the inner ring 19a of the proximal end side bearing 19, the inner ring 19a is axially positioned. Also, the inner ring 19a of the distal end side bearing 19 is held in contact with the spacer 26. Accordingly, when the nut 27 is fastened, the inner ring 19a is urged against the stepped face 25d through the spacer 26 to thereby fixedly fasten the inner ring 19a and also to apply the preload to the bearing 19.

A peripheral portion of the communicating hole 23 in the intermediate link member 7 is rendered to be an annular inner face defining portion 28. In the example as shown, although the annular inner face defining portion 28 is provided in a part of the intermediate link member 7, the annular inner face defining portion 28 may be a member separate from the intermediate link member 7. Also, in the example as shown, although the shaft portion 25 is provided integrally with the proximal side end link member 5, the shaft portion 25 may be a member separate from the proximal side end link member 5.

A portion of the annular inner face defining portion 28 is provided with a stepped portion 28b having an inner diameter smaller than a portion of the annular inner face defining portion 28 that is engaged with the outer periphery of an outer ring 19b, that is, an outer ring engaging portion 28a. With the stepped face 28c of the stepped portion 28b held in contact with an end face of the outer ring 19b of the proximal end side bearing 19, the outer ring 19b is axially positioned. Also, the outer ring 19b of the distal end side bearing 19 is non-detachably constrained by a stop ring 29 fitted to the annular inner face defining portion 28.

The outer peripheral surface of the stepped portion 25c of the shaft portion 25 and the inner peripheral surface of the stepped portion 28b of the annular inner face defining portion 28 confront each other in a non-contact fashion through a slight gap 97. Accordingly, while the stepped portion 25c of the shaft portion 25 and the stepped portion 28b of the annular inner face defining portion 28 are mutually rotatable, a sealing structure 95 for regulating the flow of, for example, the lubricant between the interior and the outside of the bearing 19 is constructed. In other words, with the gap 97 narrowed, leakage of the lubricant within the interior of the bearing 19 to the outside and ingress of foreign matter from the outside into the bearing 19 are prevented. The narrower the gap 97, the higher the sealing effect.

A distal end side portion of the spacer 26 is formed with a collar shaped portion 26a extending towards an outer diametric side while detouring the stop ring 29. An outer peripheral surface of this collar shaped portion 26a and a distal end portion 28d, which is a part of the annular inner face defining portion 28, confront each other in a non-contact fashion with a slight gap 98 intervening therebetween. Accordingly, the collar shaped portion 26a of the spacer 26 and the distal end portion 28d of the annular inner face defining portion 28 are mutually rotatable, and a sealing structure 96 having a sealing function in a manner similar to that described hereinbefore is constructed. The narrower the gap 98, the higher the scaling effect.

As discussed above, in the revolve pairing portion T2 (T3) between the proximal side end link member 5 (distal side end link member 6) and the intermediate link member 7, the sealing structure 95 is formed on one axial side of the bearing 19 by the shaft member 25, which is provided in the proximal side end link member 5 (distal side end link member 6), that is one revolve pairing forming member of the revolve pairing portion T2 (T3), and the annular inner face defining portion 28, which is provided in the intermediate link member 7 that is the other revolve pairing forming member, and additionally, the sealing structure 96 is formed on the other axial side of the bearing 19 by the spacer 26, engaged with the outer periphery of the shaft member 25, and the annular inner face defining portion 28.

As is the case with the foregoing construction of FIG. 20, when the sealing structures 95 and 96 are constructed with the use of essentially indispensable components, there is no use of any seal made of a member separate therefrom and the widthwise dimension of the bearing 19 can be suppressed. For this reason, the interference among the components of the link mechanism 4 is no longer occur and the operating range expands. Also, since the dimension around the bearing 19 is reduced, the lightweight and compactization of the parallel link mechanism 1 in its entirety can be realized.

Due to the problem associated with, for example, assemblability, it is difficult to form the seal structure at opposite ends of the bearing 19 only with the shaft member 25 and the annular inner face defining portion 28. Therefore, concurrent use with the sealing structure formed with the spacer 26 and the annular inner face defining portion 28 makes it possible to easily form the sealing structures 95 and 96 at the opposite ends of the bearing 19.

More specifically, the seal structure 95 is composed of the gap 97 between the outer peripheral surface of the stepped portion 25c, which is a part of the shaft member 25, and the inner peripheral surface of the stepped portion 28b which is a part of the annular inner face defining portion 28. The stepped portion 25c of the shaft member 25 is utilized for positioning of the inner ring 19a and, on the other hand, the stepped portion 28b of the annular inner face defining portion 28 is utilized for positioning of the outer ring 19b. Since the stepped portions 25c and 28b are spaced a small distance from each other, the sealing structure 95 composed of the gap 97 can be easily constructed with no separate member being installed.

Also, the sealing structure 96 is constructed by the gap 98 between the outer peripheral surface of the collar shaped portion 26a, which is a part of the spacer 26, and the inner peripheral surface of the outer end portion 28d which is a part of the annular inner face defining portion 28. The spacer 26 is utilized for fastening fixture for the inner ring 19a and, on the other hand, the outer end portion 28d of the annular inner face defining portion 28 is utilized for retention of the stop ring 29. When the spacer 26 is provided with the collar shaped portion 26a and the distance between the outer peripheral surface of the collar shaped portion 26a and the inner peripheral surface of the outer end portion 28d of the annular inner face defining portion 28 is made small, the scaling structure 96 composed of the gap 98 can be easily constructed with no separate member being installed.

Figure 22:
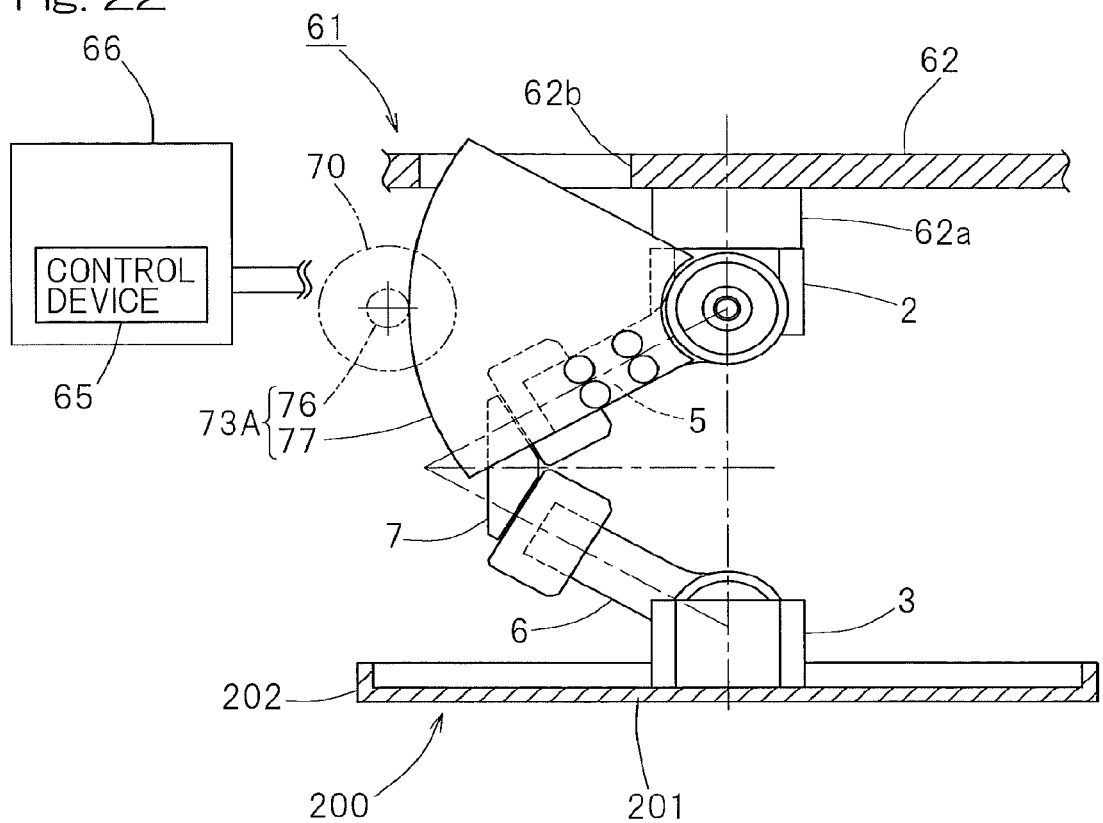
FIG. 22 is a front elevational view showing the link actuation device according to a ninth preferred embodiment of the present invention, with a portion of such link actuation device being omitted.

The ninth preferred embodiment of the present invention shown in FIGS. 22 to 25 is directed to the link actuation device having the parallel link mechanism that is different from that used in the above described first to eighth embodiments. As best shown in FIG. 22, even this link actuation device 61 includes, as with that of the above described link actuation device 51, a base member 62 of a horizontal shape, a parallel link mechanism 1 installed on this base member 62 via a spacer 62a so as to be oriented downwardly, a plurality of actuators 70 for actuating the parallel link mechanism 1, a decelerating unit 73A for transmitting a driving force of each of the actuators 70 to the parallel link mechanism 1, and a control device 65 for controlling each of the actuators 70. It is to be noted that the base member 62 is formed with an opening 62b into which a large gear 77, as will be described later, of the decelerating unit 73A is engaged. Also, the link actuating device 61 includes a lubricant recovery member 200 for receiving the lubricant falling downwardly from the parallel link mechanism 1 and the decelerating unit 73A. Although the lubricant recovery member 200 shown in FIG. 22 is of a structure similar to that shown in and described with reference to FIG. 14, it may of a structure shown in and described with reference to any one of FIGS. 15 and 16.

Figure 23:
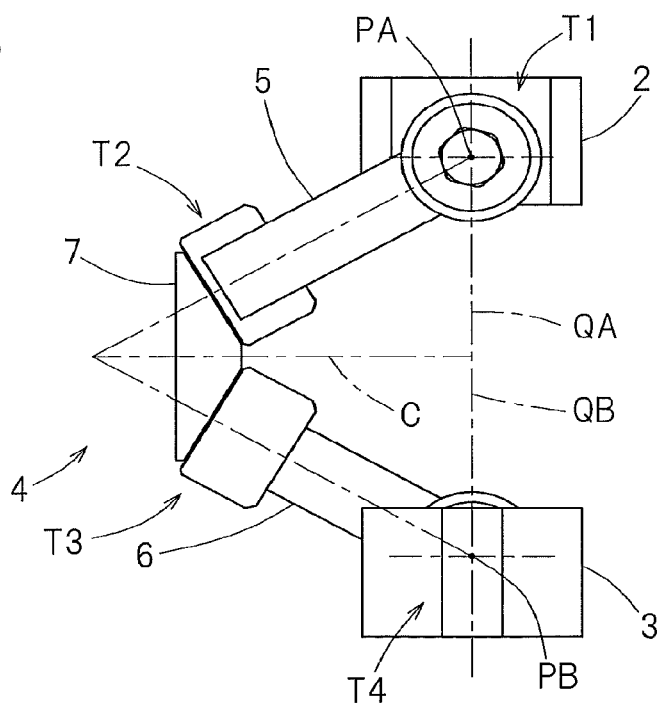
FIG. 23 is a front elevational view showing the parallel link mechanism of the link actuation device in one operative condition, with a portion omitted.

The parallel link mechanism 1 used in this link actuation device 61 is such that the bearings 12 (best shown in FIG. 24) for rotatably supporting the respective proximal side and distal side end link members 5 and 6 relative to the proximal end side link hub 2 and the distal end side link hub 3 are of an outer ring rotating type. Incidentally, as compared with the parallel link mechanism 1 shown in and described with reference to FIGS. 2 and 3, although the shapes of the various portions differ, the basic structure remains the same. Accordingly, so far as structural features that are basically similar in structure to those already described, the description of them will not be reiterated for the sake of brevity, but like reference numerals used therefore are shown. FIG. 23 illustrates the condition in which the center axis QA of the proximal end side link hub 2 and the center axis QB of the distal end side link hub 3 lie on the same line.

Figure 24:
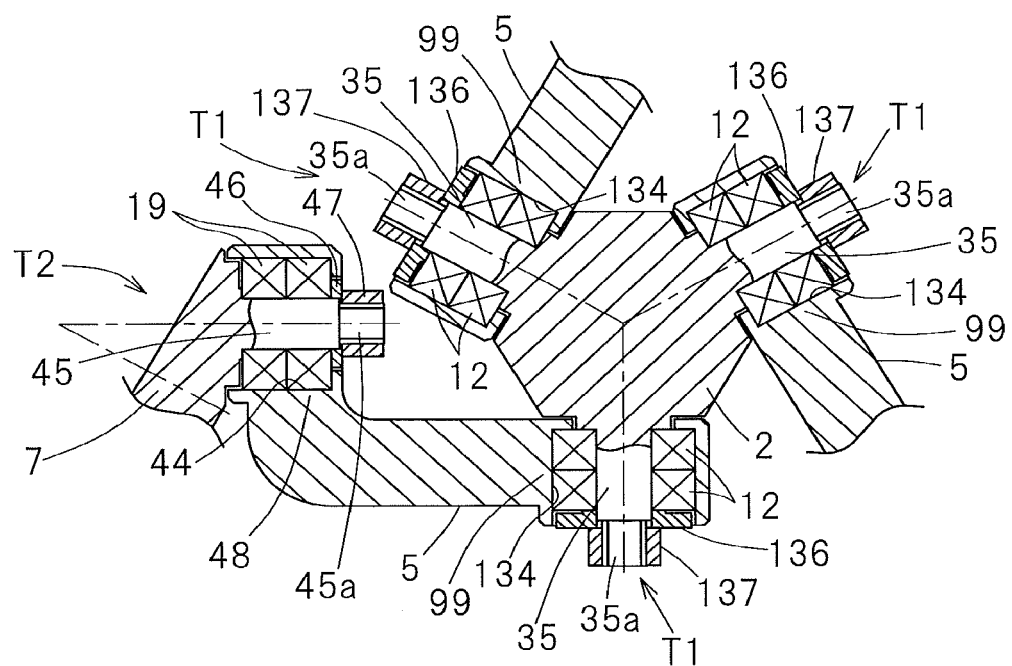
FIG. 24 is a horizontal sectional view of a proximal end side link hub of the parallel link mechanism.

Points that differs from the parallel link mechanism 1 shown in and described with reference to FIGS. 2 and 3 will now be described by way of example of the revolve pairing portion T1 between the proximal end side link hub 2 and the proximal side end link member 5 and the revolve pairing portion T2 between the proximal side end link member 5 and the intermediate link member 7. As shown in FIG. 24, the revolve pairing portion T1 is such that a shaft portion 35 is formed at three circumferential locations of the proximal end side link hub 2 and the proximal side end link member 5 is rotatably supported on an outer periphery of those shaft portions 35 by the two juxtaposed bearings 12. Those two bearings 12 are provided within a communicating hole 134, formed in the proximal side end link member 5, and fixedly fastened by a nut 137 threaded to a distal end threaded portion 35a of the shaft portion 35.

Also, the revolve pairing portion T2 is of a structure in which two bearings 19 are provided in the communicating hole 44 of the proximal side end link member 5 and a shaft portion 45 of the intermediate link member 7 is rotatably supported by those bearings 19. The bearing 19 is fixedly fastened by a nut 47 threaded to a distal end threaded portion 45a of the shaft portion 45.

Figure 25:
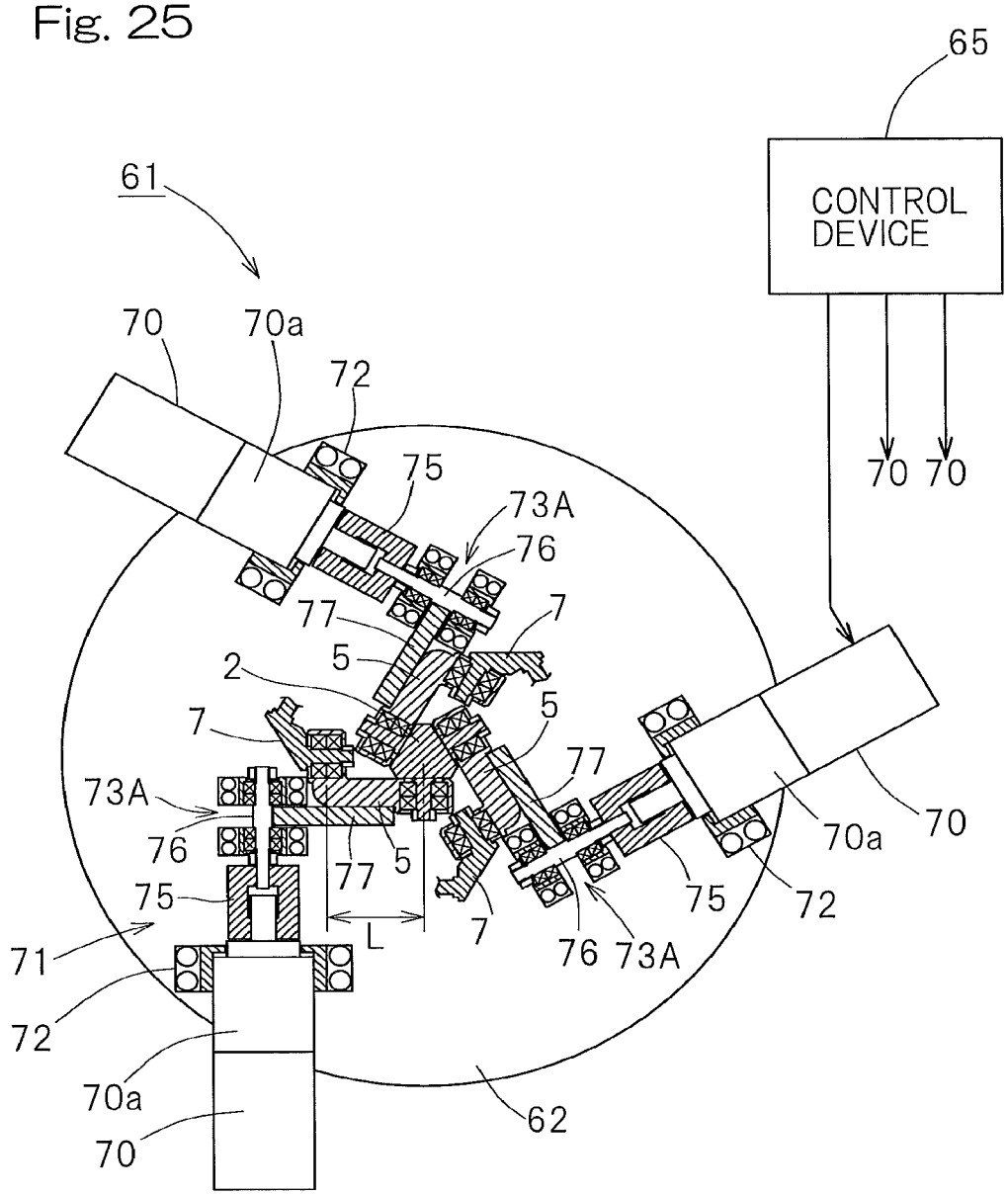
FIG. 25 is a horizontal sectional view of the link actuation device.

As shown in FIG. 25 and FIG. 13, which is a fragmentary enlarged diagram of FIG. 25 and which has been referred to in describing the second preferred embodiment, the actuator 70 of the link actuation device 61 is a rotary actuator, more specifically, a servomotor equipped with the decelerating unit 70a, and is fixed to the base member 62 by means of a motor fixing member 72. The decelerating unit 73A is composed of a gear type decelerating mechanism. In this ninth embodiment, although the actuator 70 and the decelerating unit 73A are provided in all of the three sets of the link mechanisms 4 of the parallel link mechanism 1, the provision in at least two sets out from the three sets of the link mechanisms 4 are sufficient to allow the operation of the parallel link mechanism to be stipulated.

In this ninth embodiment, the lubricant recovery member 200 is employed of the same structure as that shown in and described with reference to FIG. 14. Accordingly, the lubricant falling downwardly from the bearings 12 and 19 of the parallel link mechanism 1 as well as the large and small gears 77 and 76 of the decelerating unit 73A and the bearing 80 can be received by the lubricant recovery member 200 to thereby avoid the falling thereof onto the work to be processed (not shown) therebelow. The lubricant recovery member 200 may be employed of the same structure as that shown in and described with reference to FIGS. 15 and 16. Also, arrangement may be so made that a lubricant recovery member (not shown) for receiving the lubricant falling from the decelerating unit 73A is employed and the bearings 12 and 19 of the parallel link mechanism 1 may be of bearings equipped with seals or of a structure in which the sealing function is imparted to a bearing mounting portion.

Figure 26:
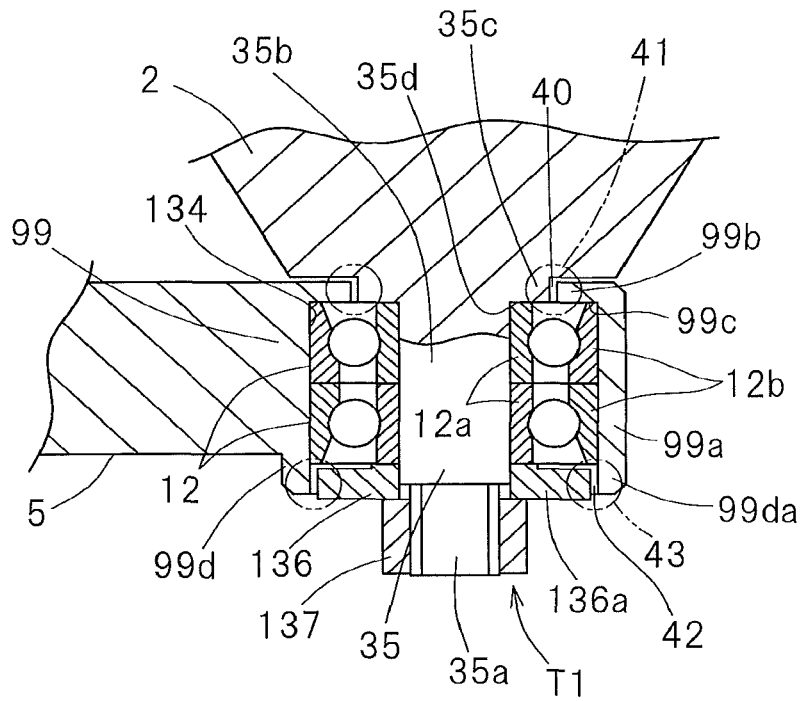
FIG. 26 is a sectional view of the revolute pairing between the proximal end side link hub and the proximal side end link member.

One example of the structure of the bearing mounting portion having the sealing function will now be described. FIG. 26 illustrates the revolve pairing portion T1 between the proximal end side link hub 2 and the proximal side end link member 5. The two bearings 12 referred to above are in the form of angular contact ball bearings which are arranged in, for example, back to back relation to each other. A proximal end portion of the shaft portion 35 is provided with a stepped portion 35c having an outer diameter greater than a portion 35b of the shaft portion 35 that is engaged in the inner periphery of the inner ring 12a of the bearing 12. With a stepped face 35d of this stepped portion 35c held in contact with an end face of the inner ring 12a of the inner bearing 12 on the proximal end side, the inner ring 12a is axially positioned. Also, the inner ring 12a of the bearing 12 on the distal end side is held in contact with a spacer 136. Accordingly, when the fastening nut 137 is fastened, the inner ring 12a is urged against the stepped face 35d through the spacer 136 to thereby fixedly fasten the inner ring 12a and also to apply the preload to the bearing 12.

A portion of the proximal side end link member 5 adjacent the communicating hole 134 referred to previously is rendered to an annular inner face defining portion 99. In the example as shown in FIG. 26, although the annular inner face defining portion 99 is provided in a part of the proximal side end link member 5, the annular inner face defining portion 99 may be a member separate from the proximal end side link member 5. Also, in the example as shown in FIG. 26, although the shaft member 35 is provided integrally with the proximal end side link hub 2, the shaft portion 35 may be a member separate from the proximal end side link hub 2.

A portion of the annular inner face defining portion 99 is provided with a stepped portion 99b having an inner diameter smaller than that of a portion of the annular inner face defining portion 99, which is engaged with an outer periphery of the outer ring 12b, that is, an outer ring engaging portion 99a. With an stepped face 99c of this stepped portion 99b held in contact with an end face of the outer ring 12b of the bearing 12 on the proximal end side, the outer ring 12b is axially positioned. Also, the proximal side end link member 5 is provided with an annular collar shaped portion 99d, which protrudes from its side surface with its proximal end forming a part of the outer ring engaging portion 99a. The collar shaped portion 99d is crimped towards an inner diametric side while the outer ring 12b is engaged with the outer ring engaging portion 99a, and thus, the outer ring 12b is engaged. Alternatively, the proximal end of a distal end portion 99da, which is a portion of the collar shaped portion 99d protruding from the outer ring 12b, is engaged with the end face of the outer ring 12b. By so doing, the outer 12b is axially non-detachably positioned at a location between the stepped portion 99b and a crimped portion.

The outer peripheral surface of the stepped portion 35c of the shaft portion 35 and the inner peripheral surface of the stepped portion 99b of the annular inner face defining portion 99 confront each other in a non-contact fashion with a slight gap 40 intervening therebetween. Accordingly, while the stepped portion 35c of the shaft portion 35 and the stepped portion 99b of the annular inner face defining portion 99 are mutually rotatable, a sealing structure 41 effective to regulate the flow of, for example, the lubricant between the interior and the outside of the bearing 12 is constructed. In other words, by narrowing the gap 40, the possibility of the lubricant within the interior of the bearing 12 to the outside and the ingress of the foreign matter into the interior of the bearing 12 from the outside is avoided. The narrower the gap 40, the higher the sealing effect.

An axial distal end side portion of the spacer 136 is formed with a collar shaped portion 136a extending towards an outer diametric side while avoiding a contact with the outer ring 12a. An outer peripheral surface of this collar shaped portion 136a and an inner peripheral surface of the previously described distal end portion 99da, which is a part of the annular inner face defining portion 99, confront each other in a non-contact fashion with a slight gap 42 intervening therebetween. Accordingly, the collar shaped portion 136a of the spacer 136 and the distal end portion 99a of the annular inner face defining portion 99 are mutually rotatable, and a sealing structure 43 having a sealing function similar to that described hereinbefore is thus constructed. The narrower the gap 42, the higher the sealing effect.

Figure 27:
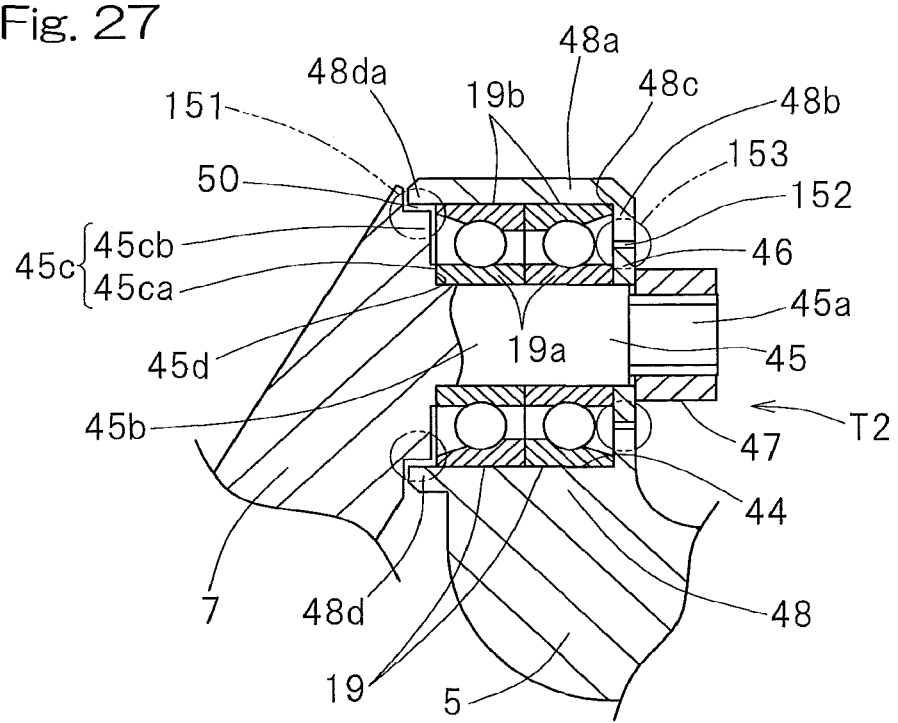
FIG. 27 is a sectional view of the revolute pairing between the proximal side end link member and the intermediate link member.

FIG. 27 illustrates the revolve pairing portion T2 between the proximal side end link member 5 and the intermediate link member 7. The two bearings 19 referred to previously are angular contact ball bearings which are arranged in back to back relation to each other. A proximal end portion of the shaft portion 45 is provided with a stepped portion 45c having an outer diameter greater than a portion 45b of the shaft portion 45 that is engaged with the inner periphery of the inner ring 19a of the bearing 19. This stepped portion 45c has two staged steps 45ca and 45cb, and with a stepped face 45d of a first staged step 45ca held in contact with an end face of the inner ring 19a of the proximal end side bearing 19, the inner ring 19a is axially positioned. The second staged step 45cb may be a separate member from the shaft portion 45. By way of example, the second staged step 45*cb* may be a ring shaped member, inner surface of which may be engaged with an outer peripheral surface of the first staged step 45*ca* for fixture. Also, the inner ring 19*a* of the distal end side bearing 19 is held in contact with the spacer 46. Accordingly, when the nut 47 referred to previously is fastened, the inner ring 19*a* is urged against the stepped face 45*d* through the spacer 46 to thereby fixedly fasten the inner ring 19*a* and also to apply the preload to the bearing 19.

A portion of the proximal side end link member 5 adjacent the communicating hole 44 is rendered to be an annular inner face defining portion 48. In the example as shown in FIG. 27, although the annular inner face defining portion 48 is provided in a part of the proximal side end link member 5, the annular inner face defining portion 48 may be a member separate from the proximal side end link member 5. Also, in the example as shown in FIG. 27, although the shaft member 45 is provided integrally with the intermediate link member 7, the shaft portion 45 may be a member separate from the intermediate link member 7.

A portion of the annular inner face defining portion 48 is provided with a stepped portion 48*b* having an inner diameter smaller than a portion of the annular inner face defining portion 48 engaged with the outer periphery of the outer ring 19*b* of the bearing 19, that is, an outer ring engaging portion 48*a*. With an stepped face 48*c* of this stepped portion 48*b* held in contact with an end face of the outer ring 19*b* of the distal end side bearing 19, the outer ring 19*b* is axially positioned. Also, the proximal side end link member 5 is provided with an annular collar shaped portion 48*d*, which protrudes from its side surface with its proximal end forming a part of the outer ring engaging portion 48*a*. The collar shaped portion 48*d* is crimped towards an inner diametric side while the outer ring 19*b* is engaged with the outer ring engaging portion 48*a*, and thus, the outer ring 19*b* is engaged. Alternatively, the proximal end of a distal end portion 48*da*, which is a portion of the collar shaped portion 48*d* protruding from the outer ring 19*b*, is engaged with the end face of the outer ring 19*b*. By so doing, the outer ring 19*b* is positioned between the stepped portion 48*b* and the crimped portion in an axially non-detachably constrained fashion.

The outer peripheral surface of the stepped portion 45*c* of the shaft portion 45 and the inner peripheral surface of the distal end portion 48*da* of the annular inner face defining portion 48 confront each other in a non-contact fashion with a slight gap 50 intervening therebetween. Accordingly, while the stepped portion 45*c* of the shaft portion 45 and the distal end portion 48*da* of the annular inner face defining portion 48 are mutually rotatable, a seal structure 151 effective to regulate the flow of, for example, of the lubricant or the like between the interior and the outside of the bearing 19 is thus constructed. In other words, with the gap 50 narrowed, the leakage of the lubricant within the interior of the bearing 19 to the outside and the ingress of foreign matter from the outside into the interior of the bearing 19 are avoided. The narrower the gap 50, the higher the sealing effect.

The outer peripheral surface of the spacer 46 and the inner peripheral surface of the stepped portion 48*b* of the annular inner face defining portion 48 confront each other with a slight gap 152 intervening therebetween. Accordingly, the spacer 46 and the stepped portion 48*b* of the annular inner face defining portion 48 are mutually rotatable, and a sealing structure 153, which has a sealing function similar to that described hereinbefore, is thus constructed. The narrower the gap 152, the higher the sealing effect.

As hereinabove described, the description has been made of the revolve pairing portion T1 between the proximal end side link hub 2 and the proximal side end link member 5 and the revolve pairing portion T2 between the proximal side end link member 5 and the intermediate link member 7. While the details are not herein described, the revolve pairing portion T4 between the distal end side link hub 3 and the distal side end link member 6 is of the same structure as that of the revolve pairing portion T1 and the revolve pairing portion T3 between the distal side end link member 6 and the intermediate link member 7 are of the same structure as that of the revolve pairing portion T2. Accordingly, with the structure constructed in which the bearings 12 and 19 are provided in the four revolve pairing portions T1 to T4 in each of the link mechanisms 4, functions and effects similar to those afforded by the previously described embodiment can be obtained.

Figure 28:
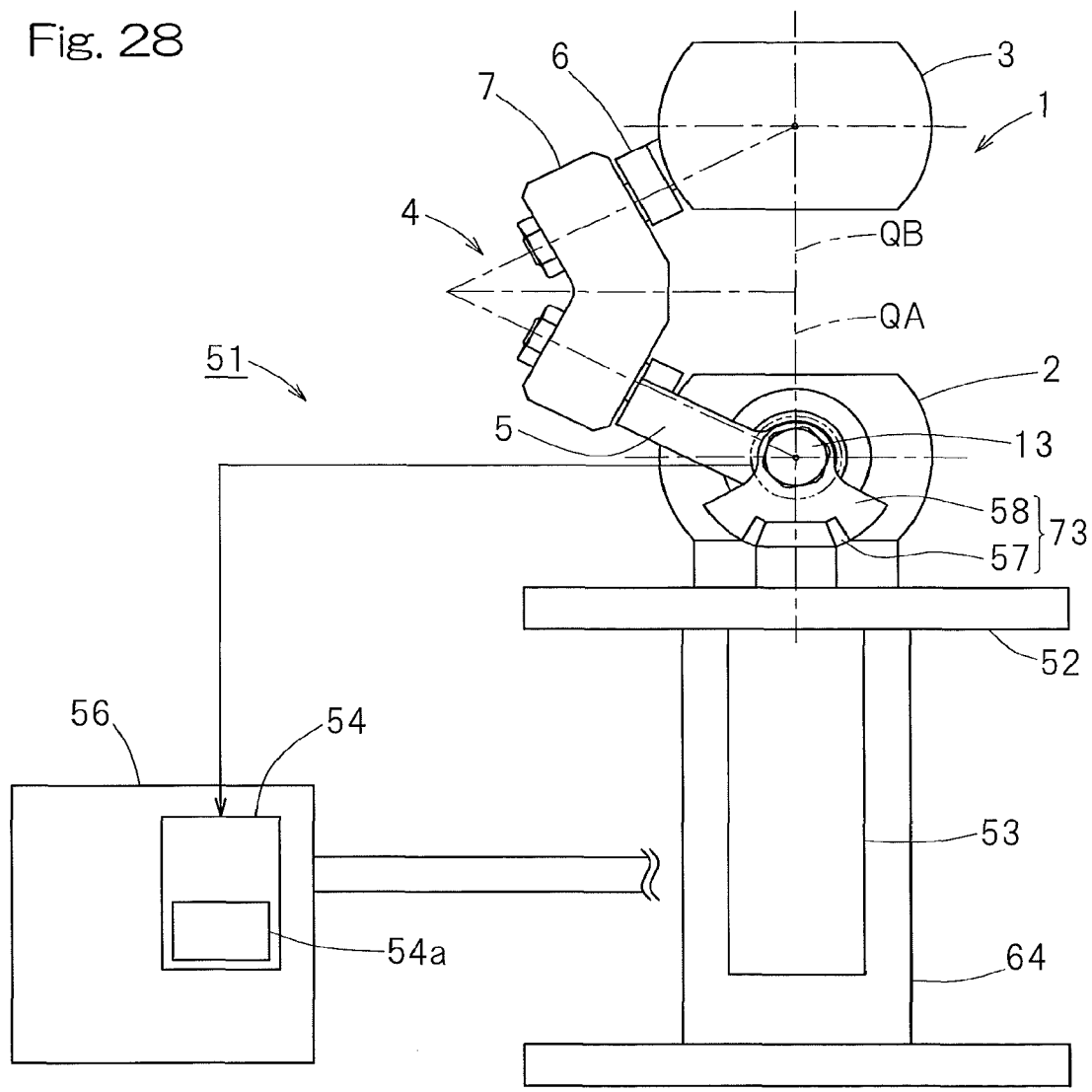
FIG. 28 is a front elevational view of a tenth preferred embodiment of the link actuation device, to which a control method of the present invention is applied, with a portion thereof omitted.
Figure 29:
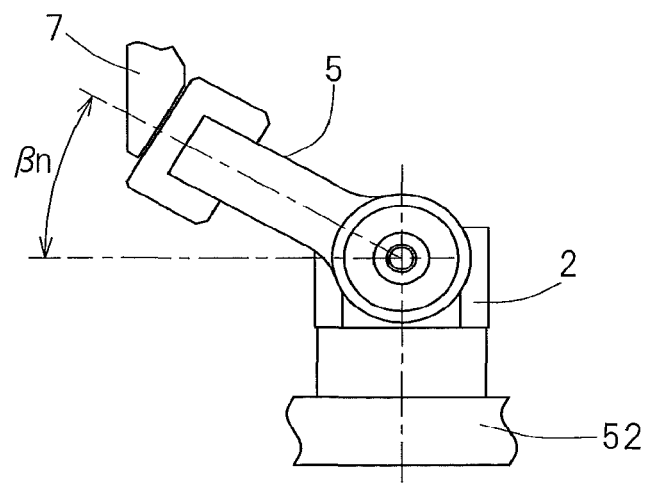
FIG. 29 is a diagram showing the angle of rotation of the proximal side end link member of the link actuation device.

The tenth preferred embodiment of the link actuating device, to which a control method pertaining to the present invention is applied, will now be described with particular reference to FIGS. 28 and 29. As shown in FIG. 28, the link actuation device 51 includes a parallel link mechanism 1, a machine bench 64 for supporting this parallel link mechanism 1, a plurality of actuators 53 (equal in number to the number of the link mechanism 4 as will be described later) for actuating the parallel link mechanism 1, and a control device 54 for controlling those actuators 53. In the instance as shown in FIG. 28, although the control device 54 is provided inside a controller 56, the control device 54 may be provided separate from the controller 56.

Referring specifically to FIG. 28, the machine bench 64 is a vertically elongated member and a proximal end side link hub 2 of the parallel link mechanism 1 is fixed on an upper surface thereof. An outer periphery of an upper portion of the machine bench 64 is provided with a collar shaped base member 52, and the actuator 53 is fitted to this base member 52 so as to suspend downwardly therefrom. The number of the actuator 53 is three that is equal to the number of the link mechanism 4 used. The actuator 53 is a rotary actuator, and includes a bevel gear 57, fitted to an output shaft of the actuator 53, and a sector shaped bevel gear 58, fitted to a shaft member 13 (best shown in FIG. 6) of the proximal end side link hub 2, with the bevel gears 57 and 58 being meshed with each other.

This link actuation device 51 actuates the parallel link mechanism 1 by manipulating the controller 56 to cause each of the actuators 53 to rotatively drive. More specifically, when the actuator 53 is rotatively driven, its rotation is transmitted to the shaft member 13 through a pair of the bevel gears 57 and 58 and, hence, the angle of the proximal side end link member 5 relative to the proximal end side link hub 2 changes. Accordingly, the position and orientation of the distal end side link hub 3 relative to the proximal end side link hub 2 (hereinafter, referred to as "distal end position orientation") is fixed. It is to be noted that although in the instance now under discussion, the bevel gears 57 and 58 are used to change the angle of the proximal side end link member 5, any other mechanism (such as, for example, spur gears or worm mechanisms) may be employed.

The rotative drive of the actuator 53 for actuating the parallel link mechanism 1 is performed under an automatic control by the control device 54 on the basis of a command delivered from a command operating instrument (not shown) provided in the controller 56. The control device 54 is a numerical control computer, and includes a synchronization and orientation control unit 54*a*. The synchronization orientation control unit 54*a* performs such a synchronization control as to cause all of the three actuators 53 to start their operations simultaneously and to terminate their operation simultaneously and such an orientation control as to control the operation of each of the actuators 53 to thereby change the distal end side link hub 3 to an arbitrary orientation.

The orientation control is carried out in the following manner. At the outset, in response to a commanded distal end position orientation, the angle of rotation βn (best shown in FIG. 29) of each of the proximal side end link members 5 is determined. The angle of rotation βn referred to above means the angle of rotation (angle from the horizontal plane) of each proximal side end link member 5 corresponding to the commanded distal end position orientation.

Figure 30:
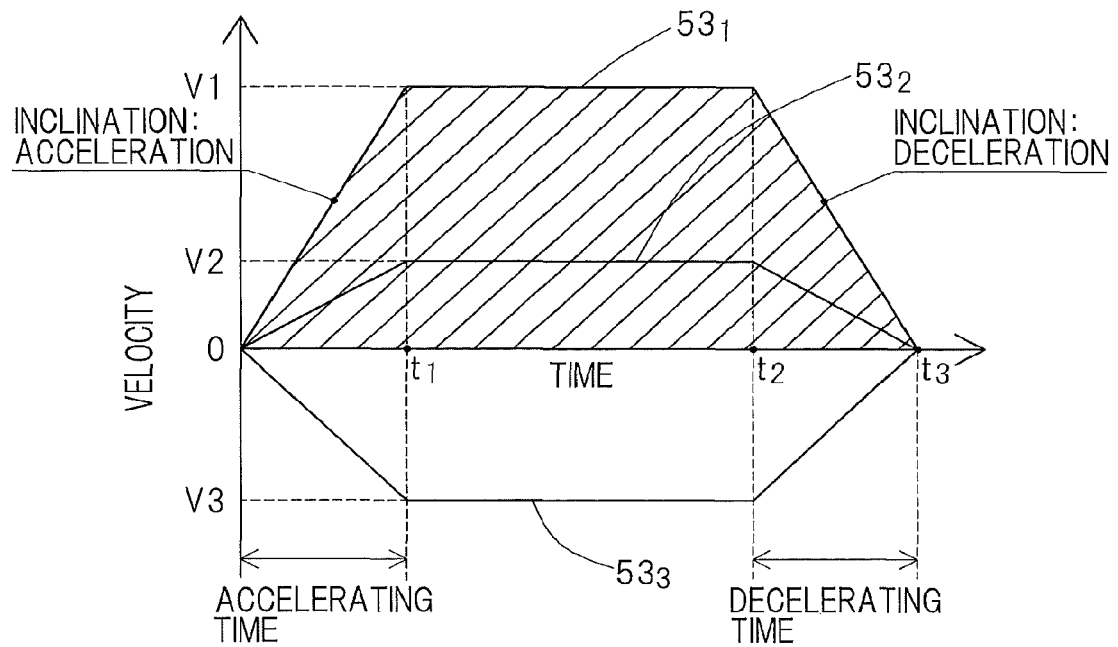
FIG. 30 is a chart showing the relation between the time and speed of a control parameter.

If the angle of rotation βn (β1, β2 and β3) is determined, a control parameter for each actuator 53 ($53_1$, $53_2$ and $53_3$) is to be determined. The control parameter for each actuator 53 ($53_1$, $53_2$ and $53_3$) comes to represent, for example, such a waveform as shown in FIG. 30. In other words, acceleration takes place during a period from the start of rotation to the timing t1, a commanded velocity Vn (V1, V2 and V3) is maintained during a period from the timing T1 to the timing t2, and, thereafter, deceleration takes place so that the rotation is halted at the timing t3. In the case of the actuator $53_1$, the surface area in a region shown by the hatching shows the amount of operation of such actuator $53_1$, that is, the angle of rotation β1 of the proximal side end link member 5. This description equally applies to each of the remaining actuators $53_2$ and $53_3$. As FIG. 30 makes it clear, by the synchronization control, each actuator 53 ($53_1$, $53_2$ and $53_3$) is so controlled as to start the operation simultaneously and then terminate the operation simultaneously with the same length of time of acceleration and the same length of time of deceleration exhibited thereby.

By way of example, the commanded velocity Vn (V1, V2 and V3) referred to above is defined by the ratio of the difference between the current angle of rotation βn (β1, β2 and β3) and the angle of rotation βn' (β1', β2' and β3') of the commanded orientation. If the base velocity that forms a reference for the commanded velocity Vn is expressed by V, the commanded velocity Vn is expressed by the following formula (9):

$$V_n = \frac{V(\beta_n' - \beta_n)}{\sqrt{(\beta_1' - \beta_1)^2 + (\beta_2' - \beta_2)^2 + (\beta_3' - \beta_3)^2}} \quad (n = 1, 2, 3) \quad (9)$$

In this case, the base velocity V becomes a composite velocity of the commanded velocity Vn of each of the actuators 53, and control is possible so that under any circumstances the moving velocity of the proximal side end link member 5 attains a substantially constant value.

Also, the commanded velocity Vn may be calculated with the use of the following relational formula (10) wherein the maximum velocity is expressed by Vmax and the maximum value of the difference (βn'-βn) between the current angle of rotation βn and the angle of rotation βn' of the commanded orientation is expressed by Δβmax:

$$Vn = Vmax(\beta n' - \beta n)/\Delta\beta max; \quad (n=1,2,3) \quad (10)$$

In this case, at least one actuator 53 can be driven at the maximum velocity, and control is possible so that the velocity of rotation of the proximal side end link member 5 is rendered to be maximum.

When the commanded velocity Vn of each of the three actuators 53 is set in the manner described above, the synchronization control of the three actuator 53 is possible.

The base velocity V and the maximum velocity Vmax have to be adjusted by the stabilization time of the distal end side link hub 3. The stabilization time referred to hereinbefore means the length of time from the timing, at which the operation of the actuator 53 terminates, to the timing at which the distal end side link hub 3 comes to completely stand still. The acceleration from the start of rotation of the actuator 53 to the attainment of the commanded velocity Vn and the deceleration from the commanded velocity Vn to the timing at which the rotation comes to stand still are expressed by inclination of a straight line in FIG. 30 and are determined respectively by the length of time of the acceleration and the commanded velocity Vn and by the length of time of the deceleration and the commanded velocity Vn.

The length of time of the acceleration and the length of time of the deceleration (hereinafter referred to as "acceleration and deceleration time") of each actuator 53 is set around one cycle of the resonant frequency possessed by the link actuation device 51. More specifically, it is desirable to set within the range of 0.8 to 1.2 frequency of the resonant frequency possessed by the link actuation device 51. The reason therefor will be discussed below. It is to be noted that the resonant frequency referred to herein means the resonant frequency exhibited when the distal end side link hub 3 has a load mounted thereon.

Figure 31:
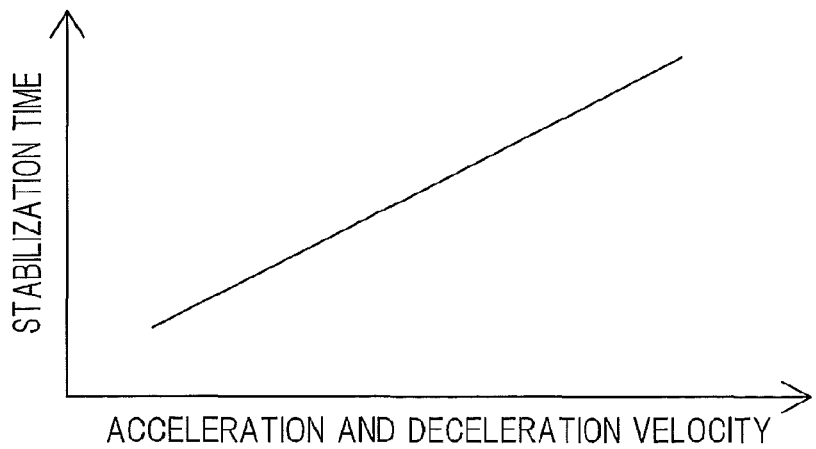
FIG. 31 is a chart showing the relation between the stabilization time and the acceleration and deceleration speed when the acceleration and deceleration times are constant.
Figure 32:
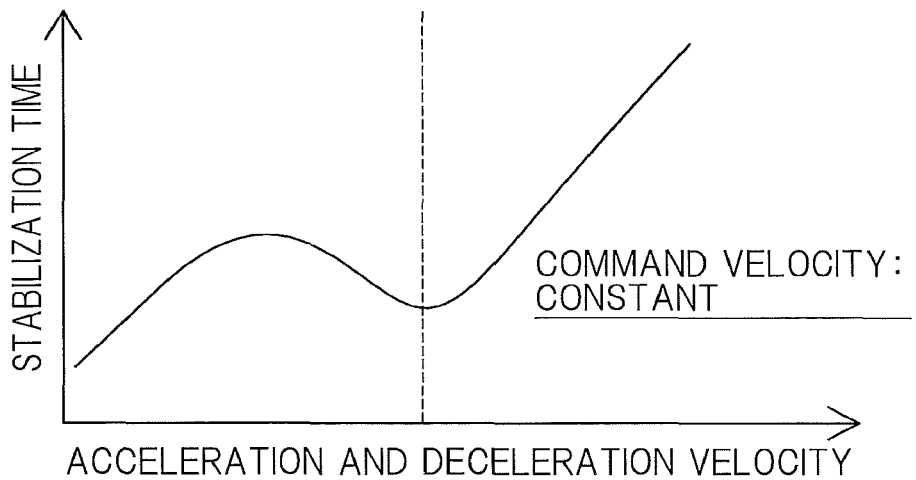
FIG. 32 is a chart showing the relation between the stabilization time and the acceleration and deceleration speed when a command speed is constant.
Figure 33:
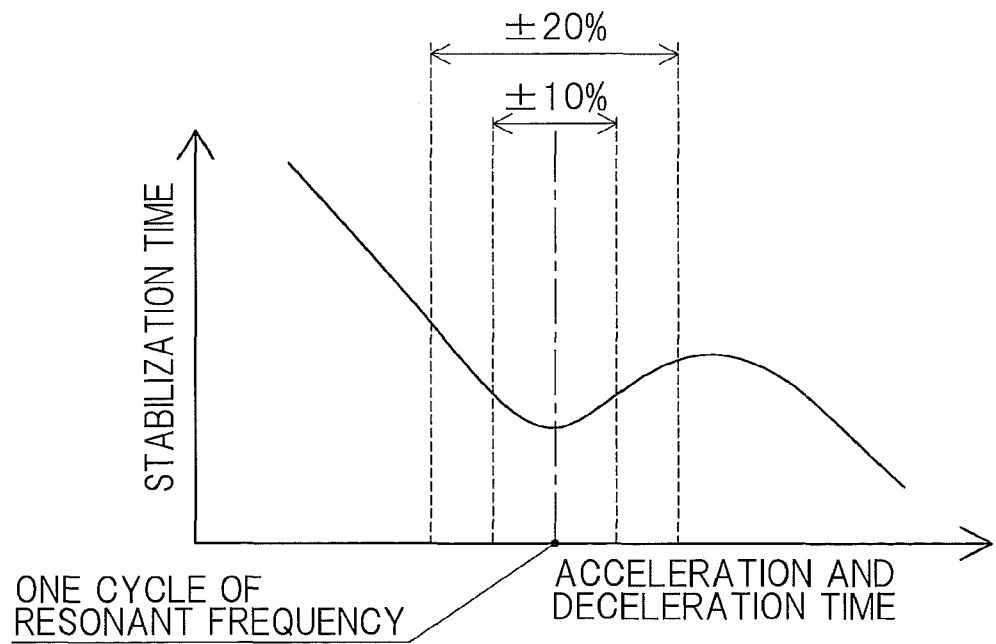
FIG. 33 is a chart showing the relation between the stabilization time and the acceleration and deceleration time when a command speed is constant.

FIG. 31 illustrates a chart showing the relation between the acceleration and deceleration velocity and the stabilization time when the acceleration and deceleration time is fixed and the acceleration and deceleration velocity is changed by the base velocity V (or the commanded velocity Vn). Also, FIG. 32 is a chart showing the relation between the acceleration and deceleration velocity and the stabilization time when the base velocity V (or the commanded velocity Vn) is fixed and the acceleration velocity is changed by the acceleration and deceleration time. Although as shown in FIG. 31 the stabilization time generally decrease with decrease of the acceleration and deceleration velocity, FIG. 32 shows the tendency that the stabilization time decreases before the certain acceleration and deceleration velocity is attained, but, subsequently, the stabilization time becomes fixed or increased. The point of inflection, at which the tendency of the stabilization time changes, appears in the vicinity of one cycle of the resonant frequency possessed by the link actuation device 1 as shown in FIG. 33.

Figure 34:
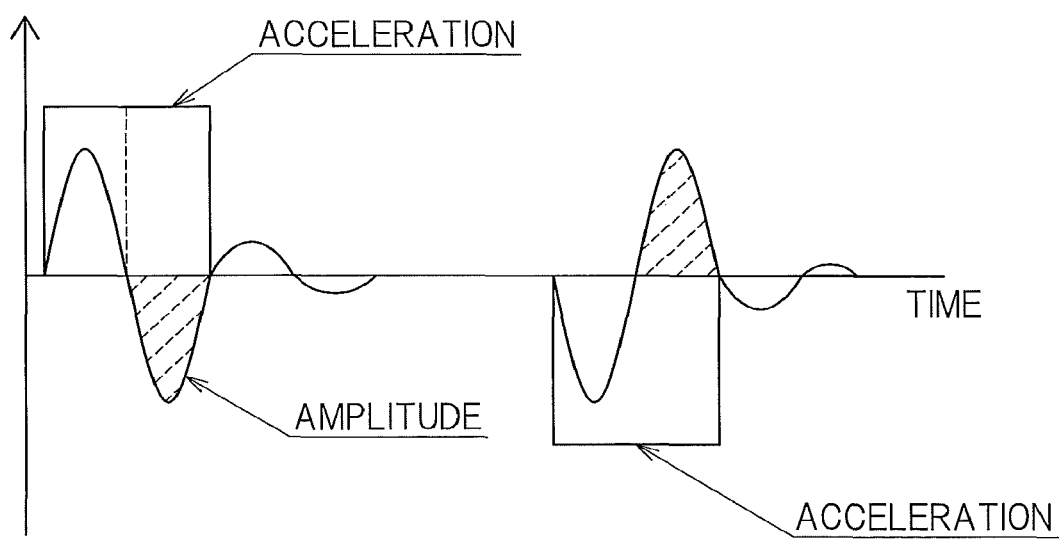
FIG. 34 is a chart showing the amplitude of vibrations of a distal end side link hub when a step acceleration corresponding to one cycle of the resonant frequency is applied.

FIG. 34 illustrates the amplitude of vibrations of the distal end side link hub 3 when a stepwise acceleration, in which acceleration takes place every one cycle of the resonant frequency, takes place. Since the distal end side link hub 3 vibrates in a direction in which the acceleration is counterbalanced after half the cycle, the vibration of the distal end side link hub 3 after the stepwise acceleration appears to become low. For this reason, if the acceleration and deceleration time is set to the neighbor (0.8 to 1.2 cycle), it is possible to reduce the stabilization time. Also, the timing at which the sine wave attains the maximum amplitude is 0.75 cycle and 1.25 cycle. Accordingly, in order to avoid the condition in which vibration takes place at the maximum amplitude after the termination of the acceleration or after the termination of the deceleration, the acceleration and deceleration time is chosen to be 0.8 to 1.2 cycle of the resonant frequency peculiar to the link actuation device.

More preferably, it is recommended to set the acceleration and deceleration time to be within the range of 0.9 to 1.1 cycle (±10%) of the resonant frequency peculiar to the link actuation device 51. If the acceleration and deceleration time is set to be within this range, the amplitude at the time of termination of the acceleration and deceleration becomes lower than ½ of the maximum amplitude of the resonant frequency and, consequently, excess energy becomes low. As a result, the amplitude of the distal end side link hub 3 after the completion of the operation of the actuator becomes low even at the time of the high speed operation, and therefore, it is possible to perform a highly accurate positioning of the distal end side link hub 3 at a high speed, and also the stabilization time can be reduced.

The parallel link mechanism 1 of this link actuation device 51 is of a structure equipped with the three sets of the link mechanism 4 of the triple link chain comprised of the four revolve pairing portions. Accordingly, if at least two sets of the three sets of the link mechanisms 4 are provided with the actuator 53, the distal end position orientation can be fixed. However, this link actuation device 51 is such that the actuator 53 is provided in all of those three sets of the link mechanisms 4, and the rotation of each of the actuators 53 is controlled under a redundancy control. Accordingly, notwithstanding any distal end position orientation, the balance of driving torques of the actuators 53 can be made good and the stabilization time of the distal end side link hub 3 can be reduced. Also, since the control is possible so that rattling motions of the actuator 53 and its peripheral portion and rattling motions of the link mechanism 4 can be so controlled as to be suppressed, the vibration of the distal end side link hub 3 resulting from the rattling motions after the actuator 53 has been halted can be suppressed and the stabilization time is reduced.

Figure 35:
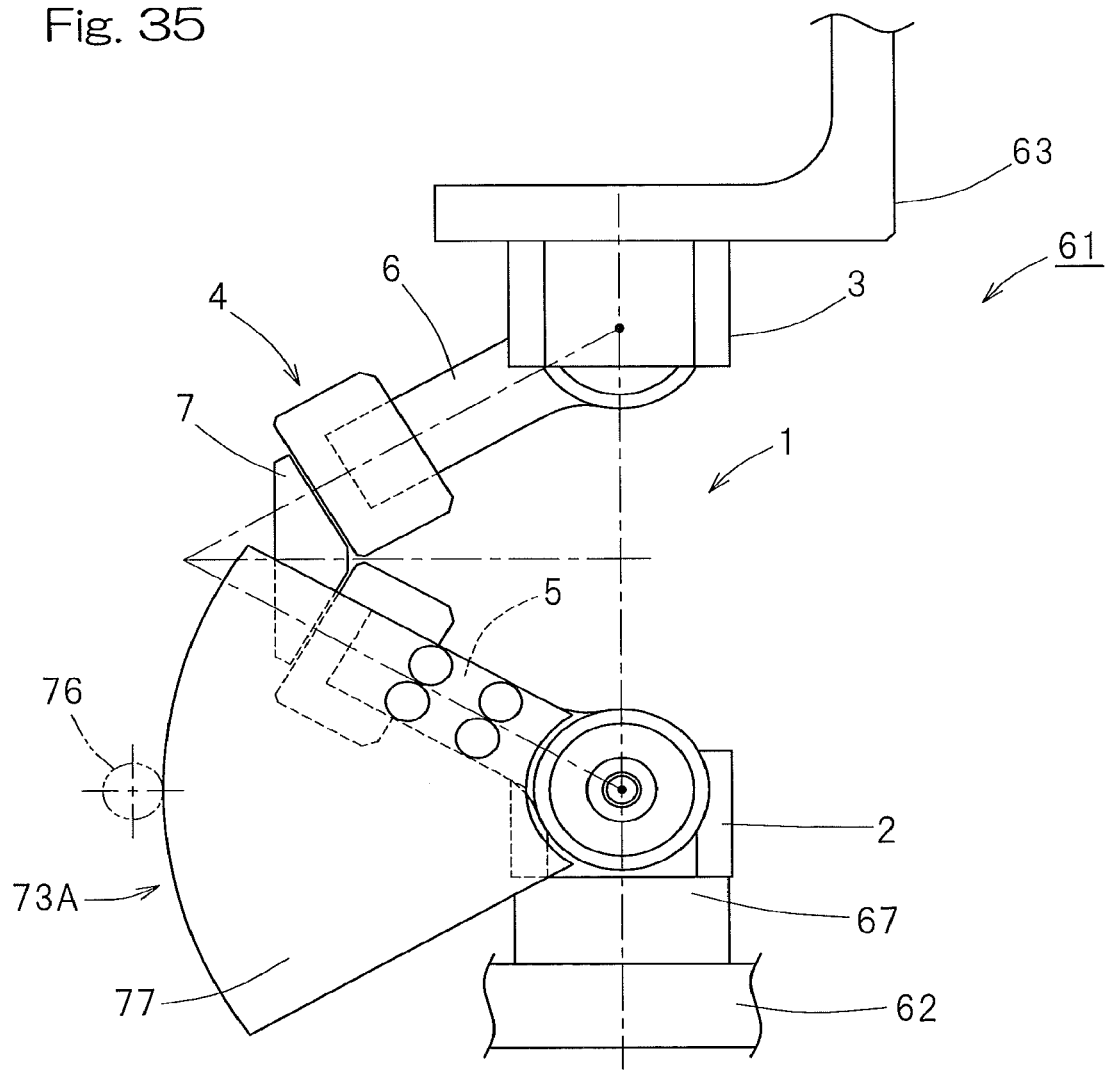
FIG. 35 is a front elevational view showing the link actuation device to which the control method according to an eleventh preferred embodiment of the present invention is applied, with a portion of such link actuation device being omitted.
Figure 36:
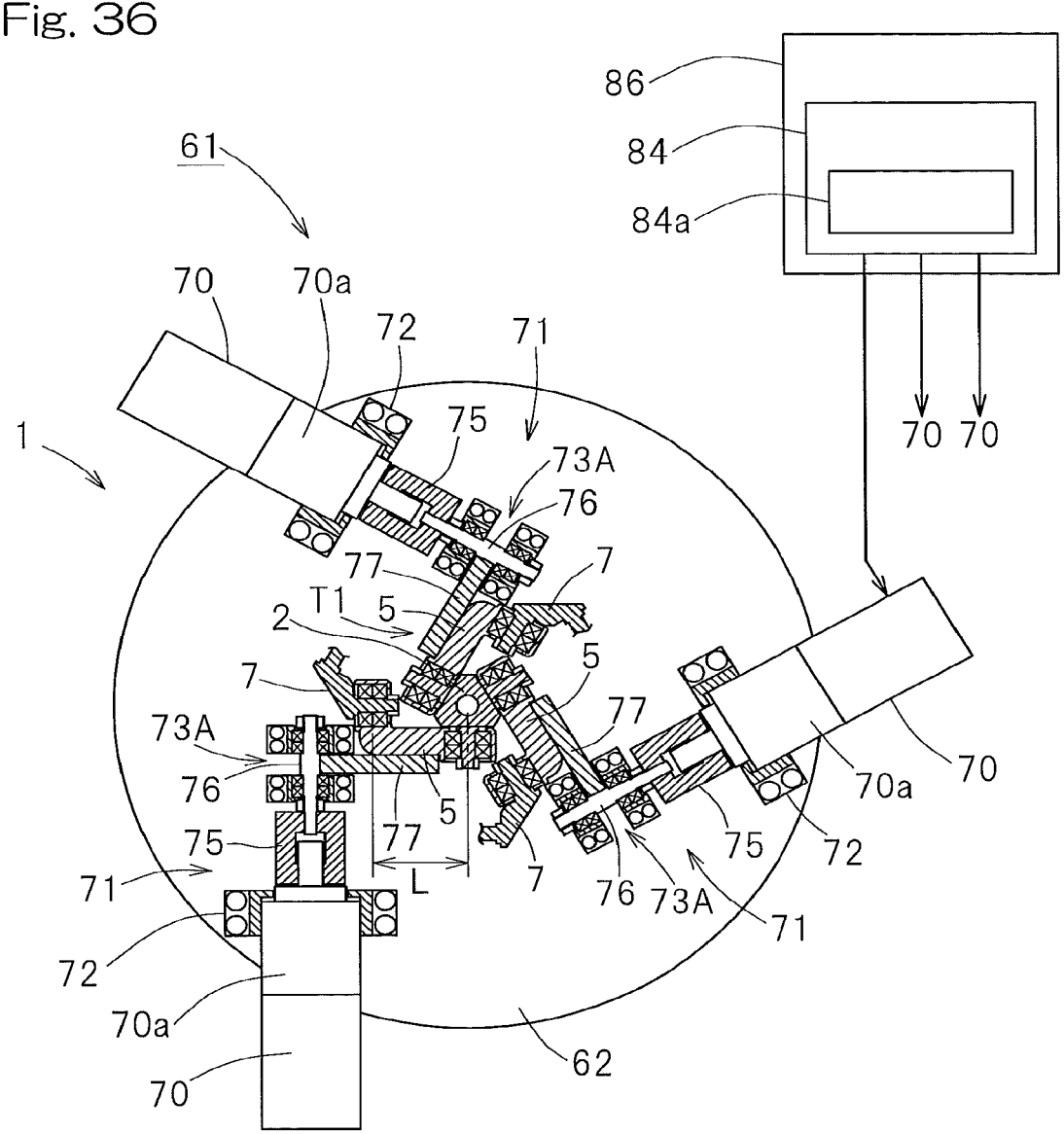
FIG. 36 is a fragmentary sectional view showing the parallel link mechanism of the link actuation device.

FIGS. 35 and 36 illustrate a link actuation device 61 to which the control method according to the eleventh preferred embodiment of the present invention is applied. As shown in FIG. 35, this link actuation device 61 is of a type in which a distal end mounting member 63, to which various equipments are fitted, is connected with a distal end side relative to a proximal end side machine bench 62 through the parallel link mechanism 1 for alteration in orientation. A spacer 67 is intervened between the machine bench 62 and the proximal end side link hub 2 of the parallel link mechanism 1.

As shown in FIG. 36, even this link actuation device 61 is of a structure that allows the control device 84 to perform an automatic control on the basis of a command fed from a command operating instrument (not shown) provided in the controller 86. The control device 84 includes a synchronization and orientation control unit 84a and, by this synchronization orientation control unit 84a, such a synchronization control as to cause all of the three actuators 70 to start their operations simultaneously and to terminate their operation simultaneously and such an orientation control as to control the operation of each of the actuators 70 to thereby change the distal end side link hub 3 to an arbitrary orientation. Accordingly, functions and effects similar to those described hereinbefore can be obtained.

Figure 37:
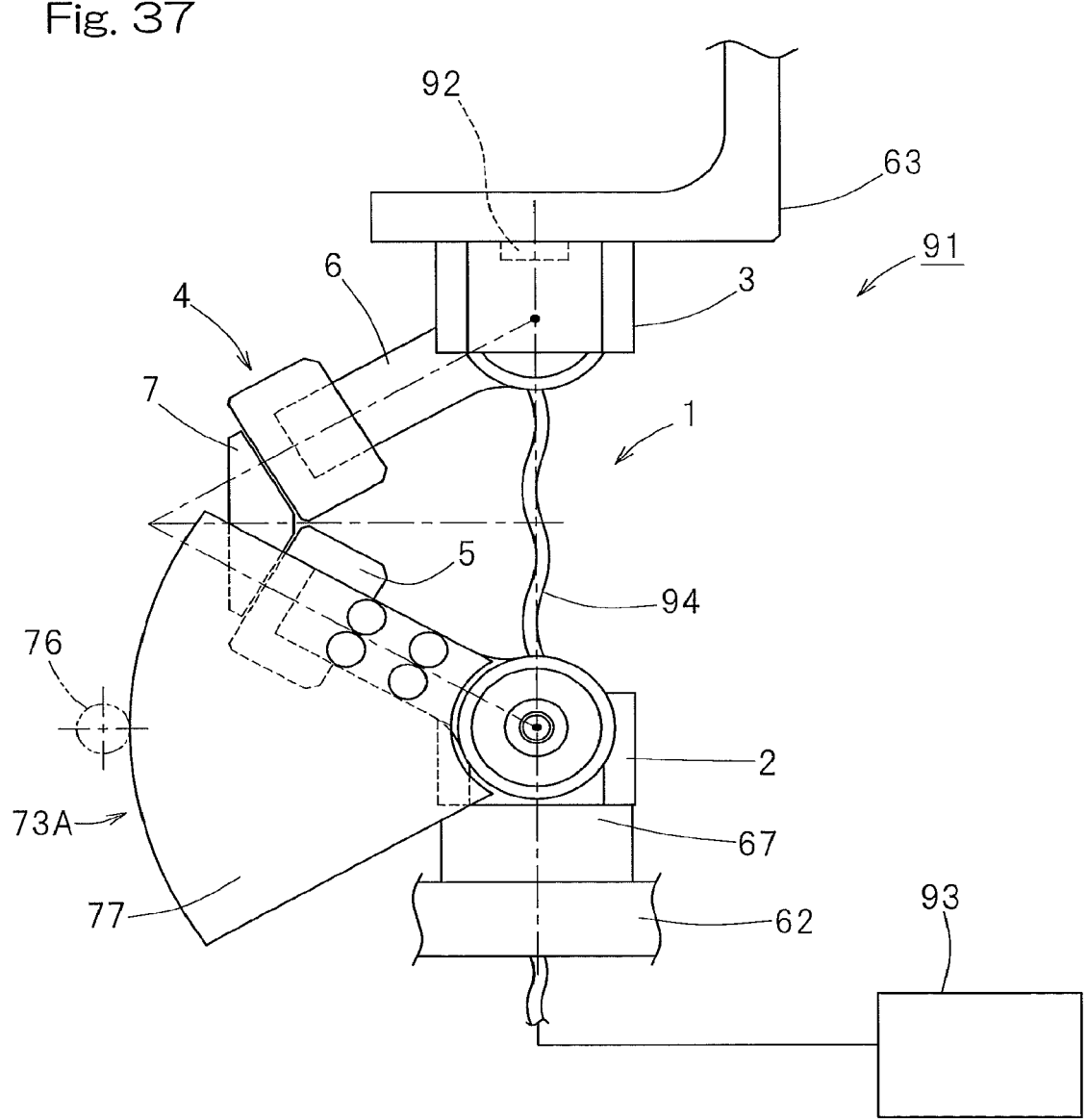
FIG. 37 is a front elevational view showing the link actuation device to which the control method according to a twelfth preferred embodiment of the present invention is applied, with a portion of such link actuation device being omitted.

The twelfth preferred embodiment of the present invention will be hereinafter described with particular reference to FIG. 37. FIG. 37 illustrates the link actuation device for controlling the actuator according to a control method different from the previously described control method. Although this link actuation device 91 includes the parallel link mechanism 1 of the same structure as the previously described link actuation device 61 of the eleventh embodiment, such parallel link mechanism 1 may be of the same structure as that used in the link actuation device 51 of the tenth embodiment. The control method, which will now be described, is, however, equally applicable to the both of the actuation devices referred to above.

In the practice of this control method according to the twelfth embodiment, a resonant frequency detecting sensor 92 for detecting the resonant frequency peculiar to the link actuation device 91 is installed in the distal end side link hub 3. The resonant frequency detecting sensor 92 may be of a type having its output variable with change of the distal end position and may be employed in the form of, for example, an acceleration pickup. The acceleration pickup is compact in size and easy to install. Besides it, a tilt angle sensor may be employed. Also, on the proximal end side of the link actuation device 91, a resonance frequency measuring instrument 93 for calculating the resonant frequency from a signal of the resonant frequency detecting sensor 92 is disposed. For the resonant frequency measuring instrument 93, an FFT analyzer, for example, is used. The acceleration time and the deceleration time can be easily set with the FFT analyzer. The resonant frequency detecting sensor 92 and the resonant frequency measuring instrument 93 are connected together by means of a flexible cable 94.

According to this control method, the resonant frequency is calculated by the resonant frequency measuring instrument 93 from the signal of the resonant frequency detecting sensor 92 and, on the basis of the result of such calculation, a preset value of the acceleration and deceleration time of the actuator (not shown) is changed. Thereby, even though the distal end load and/or the rigidity of the link actuation device 91 change, the acceleration time and the deceleration time can be easily updated. For example, even when the load on the distal end side link hub 3 and/or the mounting position thereof are changed, the acceleration time and the deceleration time can be set to optimum values. For this reason, under any circumstances, the vibration of the distal end side link hub 3 after the actuator has been halted can be minimized, and therefore, the highly accurate positioning operation can be accomplished at high speed.

Updating of the acceleration time and the deceleration time may be carried out subsequent to the start of supply of the electricity, or at intervals of a constant cycle or at a artificially chosen arbitrary timing. Also, during the normal operation, the resonant frequency detecting sensor 92 monitors at all times the resonant frequency, compare with the preset values of the acceleration time and the deceleration time and, in the event of occurrence of any deviation, the preset values of the acceleration time and the deceleration time may be updated automatically.

Any one of the previously described third to ninth embodiments includes the following modes 1 to 10, each of which modes does not require, as a prerequisite therefor, such features that:

the control device 54 for the actuator 53 regulates the distal end orientation by means of the bending angle θ, which is the vertical angle in which the center axis QB of the distal end side link hub 3 is inclined relative to the center axis QA of the proximal end side link hub 2, and the angle of traverse φ, which is the horizontal angle in which the center axis QB of the distal end side link hub 3 is inclined relative to the center axis QA of the proximal end side link hub 2;

the operating device 55 includes:

the orientation designating unit 55a for designating, by means of an artificial manipulation, the distal end orientation that is aimed at, in terms of the coordinate position on the two dimensional orthogonal coordinate system having its point of origin located on the extended axis of the center axis QA of the proximal end side link hub 2 and perpendicular to the extended axis of the center axis, the orientation acquiring unit 55b for acquiring, from the coordinate position designated by the orientation designating unit 55a, the distal end orientation that is expressed by the bending angle θ and the angle of traverse φ which have been calculated; and the orientation information applying unit 55c for applying the information on the distal end orientation, which has been acquired by the orientation acquiring unit 55b, to the control device 54.

[Mode 1]

The link actuation device 51 which includes the distal end side link hub 3, that is connected with the proximal end side link hub 2 for alteration in orientation through the three or more sets of the link mechanisms 4, each of which link mechanisms 4 includes proximal side and distal side end link members connected at one end rotatably with the proximal end side link hub 2 and the distal end side link hub 3, and the intermediate link member 7 having opposite ends connected rotatably with the other ends of the proximal side and distal side end link members, each of which link mechanisms 4 is such that the geometric model of the link mechanism depicted in a line is a parallel link mechanism 1 in which the proximal end side portion and the distal end side portion represent a symmetric shape relative to the intermediate portion of the intermediate link member 7, the actuator 53 drives the two sets of the link mechanisms 4 out of the three sets of the link mechanisms 4 of the parallel link mechanism 1 to arbitrarily change the orientation of the distal end side link hub 3 relative to the proximal end side link hub 2, and the drive transmitting mechanism 73 transmits a driving force of the actuator 53 to the corresponding link mechanism 4;

wherein the distal end side link hub 3 is positioned downwardly of the proximal end side link hub 2, and a lubricant recovery member 200 for receiving the lubricant falling downwardly is provided in at least one of the parallel link mechanism 1 and the drive transmitting mechanism 73.

The parallel link mechanism 1, which is a movable part of the link actuation device, includes the proximal end side link hub 2, the distal end side link hub 3 and the three or more sets of the link mechanisms 4, and is constructed as the double freedom degree mechanism in which the distal end side link hub 3 is movable in two axial directions perpendicular to each other relative to the proximal end link hub 2. In other words, it is a mechanism in which the distal end side link hub 3 is variable in orientation relative to the proximal end side link hub 2 with the double freedom degree of rotation. This double freedom degree mechanism is, although compact in size, effective to secure a large movable range for the distal end side link hub 3 to be movable relative to the proximal end side link hub 2. By way of example, the bending angle θ between the center axis QA of the proximal end side link hub 2 and the center axis QB of the distal end side link hub 3 is about ±90° at maximum and the angle of traverse φ of the distal end side link hub 3 relative to the proximal end side link hub 2 can be set to a value within the range of 0 to 360°.

Due to the provision of the lubricant recovery member 200 in either the parallel link mechanism 1 or the drive transmitting mechanism 73, even when the parallel link mechanism 1 is oriented downwardly so that the distal end side link hub may be positioned beneath the proximal end side link hub 2, the lubricant falling from the parallel link mechanism 1 or the drive transmitting mechanism 73 is received by the lubricant recovery member 200. More specifically, the lubricant recovery member 200 receives the lubricant leaking from the bearings 12 and 19, provided in the parallel link mechanism 1, or the gears 57 and 58, provided in the drive transmitting mechanism 73, and subsequently falling along the parallel link mechanism 1 or falling directly from the bearings 12 and 19 or the gears 57 and 58. For this reason, the undesirable fall of the lubricant onto the work to be processed which is positioned therebelow can be avoided. Since the lubricant recovery member 200 is of a structure so simplified as to merely receive the lubricant falling from the parallel link mechanism 1 or the drive transmitting mechanism 73, it can be manufactured inexpensively. Also, the lubricant recover member 200 suffices to be positioned only at a lower position of the parallel link mechanism 1 or the drive transmitting mechanism 73 and need not to cover the entire parallel link mechanism 1 and, therefore, it is compact in size.

In other words, if the lubricant recovery member 200 is employed, the lubricant in a small quantity is permitted to leak from the bearings 12 and 19 of the parallel link mechanism 1 or the gears 57 and 58 of the drive transmitting mechanism. Therefore, the sealing structure for the bearing mounting portion and the gear mounting portion can be simplified. Accordingly, with the dimension of the bearings and other being minimized, compactization of the mechanism can be stipulated and the high speed positioning of the parallel link mechanism 1 can be enabled. Also, replacement of the lubricant in the bearing mounting portion and/or the gear mounting portion can be accomplished easily and the maintenance is excellent. In addition, it leads to reduction in cost.

[Mode 2]

In the mode 1 described above, the link actuation device 51 in which the lubricant recovery member 200 is a dish-like member having a plate shaped portion 201 and a projecting portion 202 protruding from an outer peripheral edge of the plate shaped portion 201 in one direction intersecting a surface of the plate shaped portion 201, the projecting portion being arranged in the distal end side link hub 3 so as to project towards the proximal end side link hub 2.

[Mode 3]

In the mode 2 described above, the link actuation device 51 in which the projecting portion 202 of the lubricant recovery member 200 is inclined towards the center axis QB of the distal end side link hub 3.

[Mode 4]

In the mode 3 described above, the link actuation device 51 in which when the vertical angle, in which the center axis QB of the distal end side link hub 3 is inclined relative to the center axis QA of the proximal end side link hub 2, is rendered the bending angle θ, the angle of inclination of the projecting portion of the lubricant recovery member 20 is chosen to be greater than the maximum value θmax of the bending angle within the operating range of the parallel link mechanism 1.

[Mode 5]

In the mode 2 described above, the link actuation device 51 in which the lubricant recovery member 200 includes an upper plate 203 connected with a projecting end of the projecting portion 202 and arranged in parallel to the plate shaped portion 201, the upper plate 203 being formed with a throughhole.

[Mode 6]

In the mode 1 described above, the link actuation device 51 which includes the base member 52, having the proximal end side link hub 2 and the actuator 53 installed thereon, and a fixing member 205 supported by the base member 52 so as to lie parallel to the base member 52, the fixing member 205 being formed with a throughhole, in which case the lubricant recovery member 200 includes a plate shaped portion 201 fixed to the distal end side link hub and an expandable connecting portion 207 which covers the entire periphery between the plate shaped portion 201 and the fixing member 205.

[Mode 7]

In the mode 6 described above, the link actuation device 51 in which the connecting portion 207 of the lubricant recovery member 200 is of a bellows shape and is incorporated in the plate shaped portion 201 and the fixing member 205 in a condition compressed smaller than that in a natural state in which no external force acts.

[Mode 8]

In the mode 6 described above, the link actuation device 51 in which the connecting portion 207 of the lubricant recovery member 200 is made of a sheet shaped elastic material.

[Mode 9]

In any one of the modes 6 to 8 described above, the link actuation device 51 in which the fixing member 205 has its outer peripheral portion formed with a projecting portion 206 so as to protrude towards the base member 52.

[Mode 10]

In the mode 1 described above, the link actuation device 51 which includes the base member 52 having the proximal end side link hub 2 and the actuator 53 mounted thereon, wherein the lubricant recovery member 200 is a dish-like member including the plate shaped portion 201 and the projecting portion 206 protruding from the outer peripheral edge of the plate shaped portion 201 in one direction intersecting the surface of the plate shaped portion 201, the plate shaped portion 201 is installed on a fixing portion of the drive transmitting mechanism 73 or the base member 52 with the plate shaped portion 201 covering a region below the drive transmitting mechanism 73 and with the projecting portion projecting towards the base member 52.

Also, each of the foregoing tenth to twelfth embodiments includes the following modes 11 to 23 all of which do not require the previously discussed prerequisite:

[Mode 11]

A method of controlling the operation of the actuator 53 in the link actuation device in which the distal end side link hub 3 is connected with the proximal end side link hub 2 through three or more sets of link mechanisms 4 for alteration in orientation; each of the link mechanisms 4 includes proximal side distal side end link members 5 and 6 which are rotatably connected at one end with the proximal end side link hub 2 and the distal end side link hub 3, respectively, and the intermediate link member 7 having its opposite ends rotatably connected with the other ends of the proximal side and distal side end link members 5 and 6; each of the link mechanisms 4 is such that the geometric model of the link mechanism 4 depicted in line represents a symmetrical shape in which the proximal end side portion and the distal end side portion are symmetrical relative to the center portion of the intermediate link member 7; the two or more sets of the three or more sets of link mechanisms 4 are provided with the actuators 53 for altering the orientation of the distal end side link hub 3 relative to the proximal end side link hub 2;

wherein the operation of each actuator 53 is controlled by the synchronization control for controlling to start the operation of all of the actuators 53 simultaneously and to complete the operation simultaneously, so that the orientation control is performed to change the distal end side link hub 3 to the arbitrary orientation, and by setting the deceleration time of all of the actuators 53 to the value in the vicinity of one cycle of the resonant frequency possessed by the link actuation device, the synchronization control and the orientation control are performed.

By performing the simultaneous control, the operations of all of the actuators 53 terminate simultaneously. Therefore, the balance of the force acting from each of the link mechanisms 4 to the distal end side link hub 3 at the time of completion of the operation is rendered to be good, and the stabilization time of the distal end side link hub 3 becomes short. It is to be noted that the stabilization time means the length of time from the completion of the operation of the actuator 53 to the complete halt of the distal end side link hub 3.

Also, the distal end side link hub 3 vibrates in such a direction as to counterbalance the acceleration during about half the cycle of the resonant frequency. Therefore, if the deceleration time of the actuator 53 is set to a value in the vicinity of one cycle of the resonant frequency peculiar to the link actuation device, the vibration of the distal end side link hub 3 after a stepwise acceleration is rendered to be small in the event of the stepwise acceleration in which acceleration takes place cyclically. As a result thereof, the vibration of the distal end side link hub 3 after the completion of the operation of the actuator 53 is rendered to be small even during the high speed operation and, thus, the distal end side link hub 3 can be positioned at a high speed with a high accuracy. It is to be noted that since change of the position of the distal end side link hub 3 relative to the proximal end side link hub 2 results in change of the orientation at the same time, the positioning operation is synonymous to the orientation altering operation.

[Mode 12]

In the mode 11 described above, the control method in which the deceleration time referred to above is set to a value within the range of 0.8 to 1.2 cycle of the resonant frequency possessed by the link actuation device.

[Mode 13]

In the mode 11 or 12 described above, the control method for the link actuation device 51 in which by setting the acceleration time of all of the actuators 53 to a value in the vicinity of one cycle of the resonant frequency peculiar to the link actuation device 51, the synchronization control and the orientation control are performed.

[Mode 14]

In the mode 13 described above, the control method for the link actuation device 51, in which the acceleration time is set to a value within the range of 0.8 to 1.2 cycles of the resonant frequency peculiar to the link actuation device 51.

[Mode 15]

In any one of the modes 11 to 14 described above, the control method for the link actuation device 51, in which the orientation control is operable to determine the commanded operation amount for each of the actuators 53 from the orientation of the distal end side link hub 3, which is aimed at, and the synchronization control is operable to determine the operating velocity of each of the actuators 53 in reference to the ratio of the commanded operation amounts of all of the actuators 53.

[Mode 16]

In the mode 15 described above, the control method for the link actuation device 51, in which when the angle of rotation of the proximal side end link member 5 relative to the proximal end side link hub 2 is expressed by βn, the angle formed between the connecting end shaft of the intermediate link member 7, rotatably connected with the proximal side end link member 5, and the connecting end shaft of the intermediate link member 7 rotatably connected with the distal side end link member 6 is expressed by γ, the angle of separation in the circumferential direction of each proximal side end link member 5 relative to the proximal side end link member 5 forming a reference is expressed by δ$n$, the vertical angle in which the center axis QB of the distal end side link hub is inclined relative to the center axis QA of the proximal end side link hub is expressed by θ, and the horizontal angle in which the center axis QB of the distal end side link hub is inclined relative to the center axis QA of the proximal end side link hub is expressed by φ, by means of the inverse transformation of the following formula;

cos(θ/2)sin β$n$−sin(θ/2)sin(φ+δ$n$)cos β$n$+sin(γ/2)=0 the angle of rotation, which is aimed at, of the proximal side end link member 5 in the orientation control is determined and, by the difference between the angle of rotation, which is aimed at, and the current angle of rotation of the proximal side end link member, the commanded operation amount of each of the actuators is calculated.

[Mode 17]

In the mode 15 described above, the control method for the link actuation device 51, in which when the angle of rotation of the proximal side end link member 5 relative to the proximal end side link hub 2 is expressed by β$n$, the angle formed between the connecting end shaft of the intermediate link member 7, rotatably connected with the proximal side end link member 5, and the connecting end shaft of the intermediate link member 7, rotatably connected with the distal side end link member 6, is expressed by γ, the angle of separation in the circumferential direction of each proximal side end link member 5 relative to the proximal side end link member 5 forming a reference is expressed by δ$n$, the vertical angle in which the center axis QB of the distal end side link hub is inclined relative to the center axis QA of the proximal end side link hub is expressed by θ, and the horizontal angle in which the center axis QB of the distal end side link hub is inclined relative to the center axis QA of the proximal end side link hub is expressed by φ, by means of the inverse transformation of the following formula;

cos(θ/2)sin β$n$−sin(θ/2)sin(φ+δ$n$)cos β$n$+sin(γ/2)=0 the table, which is descriptive of the relation between the orientation of the distal end side link hub 3 relative to the proximal end side link hub 2 and the angle of rotation of each of the proximal side end link member 5 is formulated and, using this table, the angle of rotation, which is aimed at, of each of the proximal side end link members 5 in the orientation control is determined and, by the difference between the angle of rotation, which is aimed at, and the current angle of rotation of each of the proximal side end link members, the commanded operation amount of each of the actuators is calculated.

[Mode 18]

In any one of the modes 15 to 17 described above, the control method for the link actuation device 51, in which, when the operating velocity of each of the actuators 53 is expressed by V$n$, the base velocity is expressed by V, the current angle of rotation of the proximal side end link member 5 is expressed by β$n$, and the angle of rotation, which is aimed at, of the proximal side end link member 5 in the orientation control is expressed by β'$n$, the operating velocity of each of the actuators 53 is calculated with the use of the following formula:

$$V_n = \frac{V(\beta'_n - \beta_n)}{\sqrt{(\beta'_1 - \beta_1)^2 + (\beta'_2 - \beta_2)^2 + (\beta'_3 - \beta_3)^2}} \quad (n = 1, 2, 3)$$

[Mode 19]

In any one of the modes 15 to 17, the control method for the link actuation device, in which, when the operating velocity of each of the actuators 53 is expressed by V$n$, the maximum velocity is expressed by Vmax, the current angle of rotation of the proximal side end link member 5 is expressed by β$n$, the angle of rotation, which is aimed at, of the proximal side end link member 5 in the orientation control is expressed by β$n$', and the maximum value of (β$n$'−β$n$) is expressed by Δβmax, the operating velocity of each of the actuators 53 is calculated with the use of the following formula:

V$n$=Vmax(β$n$'−β$n$)/Δβmax

[Mode 20]

In any one of the modes 11 to 19 described above, the control method for the link actuation device 51, in which all of the three or more sets of the link mechanisms 4 include the actuator 53 for arbitrarily changing the orientation of the distal end side link hub 3 relative to the proximal end side link hub 2, and each of those actuators 53 is controlled under the redundancy control.

[Mode 21]

In any one of the modes 11 to 20 described above, the control method for the link actuation device 51, in which the resonant frequency detecting sensor 92 for detecting the resonant frequency peculiar to the link actuation device 51 is installed in the distal end side link hub 3 such that, from the signal of the resonant frequency detecting sensor, the resonant frequency is calculated by means of the resonant frequency measuring instrument 93, and from the result of calculation, the preset values of the acceleration time and deceleration time of the actuator 53 are updated.

[Mode 22]

In the mode 21 described above, the control method for the link actuation device 51, in which the acceleration pickup is employed for the resonant frequency detecting sensor 92, and the FFT analyzer is used for the resonant frequency measuring instrument 93.

[Mode 23]

The control device for the link actuation device, in which the distal end side link hub 3 is connected with the proximal end side link hub 2 through the three or more sets of the link mechanisms 4 for alteration in orientation, each of the link mechanisms 4 includes the proximal side and distal side end link members 5 and 6 rotatably connected at one end with the proximal end side link hub 2 and the distal end side link hub 3, respectively, and the intermediate link member 7 connected at its opposite ends with the other ends of the proximal side and distal side end link members 5 and 6, each of the link mechanisms 4 is of a shape in which the geometrical model of the link mechanism 4 expressed in line represents that the proximal end side portion and the distal end side portion are symmetrical with respect to the center portion of the intermediate link member 7, and the actuator 53 for arbitrarily changing the orientation of the distal end side link hub 3 relative to the proximal end side link hub 2 is provided in the two or more sets of the link mechanism 4 out of the three or more sets of the link mechanisms 4, characterized in that the link actuation device 51 includes the synchronization and orientation control unit 54$a$ for executing the synchronization control and the orientation control, which synchronization and orientation control unit 54a is operable to control the operation of each of the actuators 53 by the synchronization control for controlling to start the all of the actuators 53 simultaneously and to complete such operation simultaneously, so that the orientation control is performed to change the distal end side link hub 3 to the arbitrary orientation, and is operable to perform the synchronization control by setting the deceleration time of all of the actuator 53 to the value in the vicinity of one cycle of the resonant frequency peculiar to the link actuation device 51.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Parallel link mechanism
2 . . . Proximal end side link hub
3 . . . Distal end side link hub
4 . . . Link mechanism
5 . . . Proximal side end link member
6 . . . Distal side end link member
7 . . . Intermediate link member
51, 61 . . . Link actuation device
52, 62 . . . Base member
53, 70 . . . Actuator
54, 84 . . . Control device
54a, 84a . . . Synchronization and orientation control unit
55, 85 . . . Operating device
55a . . . Orientation designating unit
55b . . . Orientation acquiring unit
55c . . . Orientation information applying unit
92 . . . Resonant frequency detecting sensor
93 . . . Resonant frequency measuring instrument
100 . . . Orthogonal coordinate system
200, 210 . . . Lubricant recovery member
O . . . Point of origin
QA . . . Center axis of the proximal end side link hub
QA' . . . Extended axis
QB . . . Center axis of the distal end side link hub
θ . . . Bending angle
φ . . . Angle of traverse

What is claimed is:

1. A link actuation device comprising:
a proximal end side link hub;
a distal end side link hub connected with the proximal end side link hub through three or more sets of link mechanisms;
an actuator;
a control device to control the actuator;
an operating device to operate the control device;
wherein each of the link mechanisms includes proximal side and distal side end link members, which are rotatably connected at one end with the proximal end side link hub and the distal end side link hub, respectively, and an intermediate link member having its opposite ends rotatably connected with the other ends of the proximal end side and distal side end link members;

further wherein a geometric model of each of the link mechanisms is a parallel link mechanism in which a proximal end side portion and a distal end side portion represent a symmetric shape relative to an intermediated portion of the intermediate link member, further wherein the actuator is provided in two or more sets of link mechanisms of the three or more sets of the link mechanisms of the parallel link mechanism and is operable to arbitrarily change a distal end orientation, which is an orientation of the distal end side link hub relative to the proximal end side link hub, further wherein the control device is operable to stipulate the distal end orientation in terms of a bending angle, which is a vertical angle in which a center axis of the distal end side link hub is inclined relative to a center axis of the proximal end side link hub, and an angle of traverse which is a horizontal angle in which the center axis of the distal end side link hub is inclined relative to the center axis of the proximal end side link hub, further wherein the operating device comprises:
an orientation designating unit to designate the distal end orientation, which is aimed at a coordinate position of a two dimensional orthogonal coordinate system that intersects an extended axis of the center axis of the proximal end side link hub with a position of origin lying on the extended axis of the center axis;
an orientation acquiring unit to acquire from the coordinate position, designated by the orientation designating unit, the distal end orientation that is expressed by the bending angle and the angle of traverse by means of a calculation; and
an orientation information applying unit to apply information on the distal end orientation, which has been acquired by the orientation acquiring unit, to the control device.

2. The link actuation device as claimed in claim 1, wherein the orientation acquiring unit makes use of a convergence calculation based on the least squares method as the calculation for acquiring the distal end orientation that is expressed by the bending angle and the angle of traverse.

3. The link actuation device as claimed in claim 1, wherein, when the angle of rotation of the proximal side end link member relative to the proximal end side link hub is expressed by βn, the angle formed between a first connecting end shaft of the intermediate link member, rotatably connected with the proximal side end link member, and a second connecting end shaft of the intermediate link member rotatably connected with the distal side end link member is expressed by γ, the angle of separation in a circumferential direction of each proximal side end link member relative to the proximal side end link member forming a reference is expressed by δn, the bending angle is expressed by θ and the angle of traverse is expressed by φ, the control device executes an inverse transformation according to the formula $$\cos(\theta/2)\sin\beta n - \sin(\theta/2)\sin(\phi+\delta n)\cos\beta n + \sin(\gamma/2) = 0$$

to thereby determine the angle of rotation of the proximal side end link member in the distal end orientation, which is aimed at, and calculates a commanded operation amount of each of the actuators from a difference between the angle of rotation, which has been so determined, and the angle of rotation of each of the proximal side end link member in the current distal end orientation.

4. The link actuation device as claimed in claim 1, wherein, when the angle of rotation of the proximal side end link member relative to the proximal end side link hub is expressed by βn, the angle formed between a first connecting end shaft of the intermediate link member, rotatably connected with the proximal side end link member, and a second connecting end shaft of the intermediate link member rotatably connected with the distal side end link member is expressed by γ, the angle of separation in a circumferential direction of each proximal side end link member relative to the proximal side end link member forming a reference is expressed by δn, the bending angle is expressed by θ and the angle of traverse is expressed by φ, the control device executes an inverse transformation according to the formula $$\cos(\theta/2)\sin\beta n - \sin(\theta/2)\sin(\phi+\delta n)\cos\beta n + \sin(\gamma/2) = 0$$

to thereby formulate a table descriptive of relations between the distal end orientation and the angle of rotation of each of the proximal side end link members, and, by use of the table, to determine the angle of rotation of the proximal side end link member in the distal end orientation, which is aimed at, and calculates a commanded operation amount of each of the actuators from a difference between the angle of rotation, which has been so determined, and the angle of rotation of each of the proximal side end link member in the current distal end orientation.

5. The link actuation device as claimed in claim 1, wherein the orientation designating unit executes a designation of the coordinate position on the orthogonal coordinate system by means of a numerical value input.

6. The link actuation device as claimed in claim 5, wherein the orientation designating unit executes a designation of the coordinate position on the orthogonal coordinate system by means of a numerical value input of an absolute coordinate relative to a predetermined reference or by means of a numerical value input of the difference between the current coordinate position and a coordinate position which is aimed at.

7. The link actuation device as claimed in claim 1, wherein the orientation designating unit designates a coordinate position on the orthogonal coordinate system by means of an operating amount determined in dependence on an operating time or an operating number.

8. The link actuation device as claimed in claim 1, further comprising:
a decelerating unit to transmit a driving force of the actuator to a corresponding link mechanism, the distal end side link hub being positioned below the proximal end side link hub; and
a lubricant recovery member, provided in the parallel link mechanism or the decelerating unit, to receive a lubricant falling downwardly from at least one of the parallel link mechanism and the decelerating unit.

9. The link actuation device as claimed in claim 8, wherein the lubricant recovery member is a dish-like member comprising:
a plate shaped portion; and
a projecting portion projecting from an outer peripheral edge of the plate shaped portion in one direction intersecting a surface of the plate shaped portion, the projecting portion being arranged in the distal end side link hub so as to project towards the proximal end side link hub.

10. The link actuation device as claimed in claim 9, wherein the projecting portion of the lubricant recovery member is inclined towards a center axis of the distal end side link hub.

11. The link actuation device as claimed in claim 10, wherein when a vertical angle, in which the center axis of the distal end side link hub is inclined relative to a center axis of the proximal end side link hub, is rendered a bending angle, the angle of inclination of the projecting portion of the lubricant recovery member is chosen to be greater than a maximum value of the bending angle within an operating range of the parallel link mechanism.

12. The link actuation device as claimed in claim 9, wherein the lubricant recovery member comprises an upper plate connected with a projecting end of the projecting portion and arranged in parallel relation to the plate shaped portion, the upper plate being formed with a throughhole.

13. The link actuation device as claimed in claim 8, further comprising:
a base member having the proximal end side link hub and the actuator mounted thereon; and
a fixing member supported by the base member and arranged in parallel relation to the base member, the fixing member being provided with a throughhole,
wherein the lubricant recovery member comprises:
a plate shaped portion fixed to the distal end side link hub; and
an expandable connecting portion which covers an entire periphery between the plate shaped portion and the fixing member and which connects them together.

14. The link actuation device as claimed in claim 13, wherein the connecting portion of the lubricant recovery member has a bellows shape and is incorporated in the plate shaped portion and the fixing member in a condition compressed smaller than when in a natural state in which no external force acts on the connecting portion.

15. The link actuation device as claimed in claim 13, wherein the connecting portion of the lubricant recovery member is made of a sheet shaped elastic material.

16. The link actuation device as claimed in claim 13, wherein the fixing member has its outer peripheral portion formed with a projecting portion protruding towards the base member.

17. The link actuation device as claimed in claim 8, further comprising a base member having the proximal end side link hub and the actuator mounted thereon;
wherein the lubricant recovery member is a dish-like member including a plate shaped portion and a projecting portion projecting from an outer peripheral edge of the plate shaped portion in one direction intersecting a surface of the plate shaped portion, and
further wherein the plate shaped portion is installed on the parallel link mechanism via the base member with the plate shaped portion covering an area below the decelerating unit and with the projecting portion projecting towards the base member.

18. A control method for controlling a link actuation device having a proximal end side link hub, a distal end side link hub connected with the proximal end side link hub through three or more sets of link mechanisms, and actuators to control the link mechanisms, each of the link mechanisms including proximal side and distal side end link members which are rotatably connected at one end with the proximal end side link hub and the distal end side link hub, respectively, and an intermediate link member having its opposite ends rotatably connected with the other ends of the proximal end side and distal side end link members, the control method comprising:
    controlling starting operation of all of the actuators simultaneously and completing the starting operation simultaneously;
    controlling the operation of each of the actuators so that an orientation control is performed to change the distal end side link hub to an arbitrary orientation;
    setting a deceleration time of all of the actuators to a value in the vicinity of one cycle of a resonant frequency peculiar to the link actuation device; and
    performing synchronization control and orientation control of the actuators.

19. The control method for the link actuation device as claimed in claim 18, wherein the deceleration time is set to a value within the range of 0.8 to 1.2 cycle of the resonant frequency peculiar to the link actuation device.

20. The control method for the link actuation device as claimed in claim 18, further comprising setting an acceleration time of all of the actuators to a value in the vicinity of one cycle of the resonant frequency peculiar to the link actuation device.

21. The control method for the link actuation device as claimed in claim 20, wherein the acceleration time is set to a value within the range of 0.8 to 1.2 cycle of the resonant frequency peculiar to the link actuation device.

22. The control method for the link actuation device as claimed in claim 18, wherein the orientation control is operable to determine the commanded operation amount for each of the actuators from the orientation of the distal end side link hub, which is aimed at, and
    the synchronization control is operable to determine the operating velocity of each of the actuators in reference to a ratio of the commanded operation amounts of all of the actuators.

23. The control method for the link actuation device as claimed in claim 22, wherein, when the angle of rotation of the proximal side end link member relative to the proximal end side link hub is expressed by $\beta n$, the angle formed between a first connecting end shaft of the intermediate link member, rotatably connected with the proximal side end link member, and a second connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, an inverse transformation is executed according to the formula $$\cos(\theta/2)\sin \beta n - \sin(\theta/2)\sin(\phi+\delta n)\cos \beta n + \sin(\gamma/2) = 0$$

where the angle of rotation, which is aimed at, of each of the proximal side end link members in the orientation control is determined, and the commanded operation amount of each of the actuators is calculated from a difference between the angle of rotation, which is aimed at, and the current angle of rotation of each of the proximal side end link member.

24. The control method for the link actuation device as claimed in claim 22, wherein, when the angle of rotation of the proximal side end link member relative to the proximal end side link hub is expressed by $\beta n$, the angle formed between a first connecting end shaft of the intermediate link member, rotatably connected with the proximal side end link member, and a second connecting end shaft of the intermediate link member rotatably connected with the distal side end link member is expressed by $\gamma$, the angle of separation in a circumferential direction of each proximal side end link member relative to the proximal side end link member forming a reference is expressed by $\delta n$, the bending angle is expressed by $\theta$ and the angle of traverse is expressed by $\phi$, an inverse transformation is executed according to the formula $$\cos(\theta/2)\sin \beta n - \sin(\theta/2)\sin(\phi+\delta n)\cos \beta n + \sin(\gamma/2) = 0$$

where a table descriptive of relations between the distal end orientation and the angle of rotation of each of the proximal side end link members is formulated, and, by use of the table, the angle of rotation, which is aimed at, each of the proximal side end link member in the orientation control is determined, and the commanded operation amount of each of the actuators is calculated from a difference between the angle of rotation, which is aimed at, and the current angle of rotation of each of the proximal side end link member.

25. The control method for the link actuation device as claimed in claim 22, wherein the operating velocity of each of the actuators is calculated according to the formula $$V_n = \frac{V(\beta'_n - \beta_n)}{\sqrt{(\beta'_1 - \beta_1)^2 + (\beta'_2 - \beta_2)^2 + (\beta'_3 - \beta_3)^2}} \quad (n = 1, 2, 3)$$

where the operating velocity is expressed by Vn, the base velocity is expressed by V, the current angle of rotation of the proximal side end link member is expressed by $\beta n$, and the angle of rotation, which is aimed at, of the proximal side end link member in the orientation control is expressed by $\beta n'$.

26. The control method for the link actuation device as claimed in claim 22, wherein the operating velocity of each of the actuators is calculated according to the formula $$Vn = V\max(\beta n' - \beta n)/\Delta\beta\max$$

where the operating velocity is expressed by Vn, the maximum velocity is expressed by Vmax, the current angle of rotation of the proximal side end link member is expressed by $\beta n$, the angle of rotation, which is aimed at, of the proximal side end link member in the orientation control is expressed by $\beta n'$ and the maximum value of ($\beta n'$-62 n) is expressed by $\Delta\beta\max$.

27. The control method for the actuation device as claimed in claim 18, wherein all of the three or more sets of the link mechanisms include one of the actuators to arbitrarily change the orientation of the distal end side link hub relative to the proximal end side link hub, and each of those actuators is controlled under a redundancy control.

28. The control method for the actuation device as claimed in claim 18, wherein a resonant frequency detecting sensor to detect the resonant frequency peculiar to the link actuation device is provided in the distal end side link hub,
    from a signal of the resonant frequency detecting sensor, the resonant frequency is calculated by use of a resonant frequency measuring instrument, and
    from the result of such calculation, respective preset values of the acceleration time and the deceleration time in the actuator are updated.

29. The control method for the link actuation device as claimed in claim 28, wherein the resonant frequency detecting sensor is employed in the form of an acceleration pickup, and the resonant frequency measuring instrument is employed in the form of an FFT analyzer.

30. The link actuation device as claimed in claim 1, wherein the control device further comprises a synchronization and orientation control unit, wherein the synchronization and orientation control unit is operable to control the operation of each of the actuators by means of a synchronization control for controlling to start the operation of all of the actuators simultaneously and to complete such operation simultaneously, so that an orientation control is performed to change the distal end side link hub to an arbitrary orientation, and further wherein the synchronization and orientation control unit is operable to perform the synchronization control and the orientation control by setting a deceleration time of all of the actuators to a value in the vicinity of one cycle of a resonant frequency peculiar to the link actuation device.

* * * * *

UNITED STATES PATENT AND TRADEMARK OFFICE
CERTIFICATE OF CORRECTION

PATENT NO. : 9,522,469 B2
APPLICATION NO. : 14/385931
DATED : December 20, 2016
INVENTOR(S) : Hiroshi Isobe et al.

Page 1 of 1

It is certified that error appears in the above-identified patent and that said Letters Patent is hereby corrected as shown below:

In the Claims

Column 54, Line 48, Claim 26:
Delete "($\beta$n' - 62 n)" and insert -- ($\beta$n' - $\beta$n) --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*